(12) United States Patent
Janas

(10) Patent No.: US 11,514,228 B2
(45) Date of Patent: Nov. 29, 2022

(54) GUIDES ON A CONTENT GENERATION SYSTEM

(71) Applicant: Microsoft Technology Licensing, LLC, Redmond, WA (US)

(72) Inventor: Lauren Michelle Janas, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1128 days.

(21) Appl. No.: 14/286,709

(22) Filed: May 23, 2014

(65) Prior Publication Data

US 2015/0339267 A1    Nov. 26, 2015

(51) Int. Cl.
| G06F 40/103 | (2020.01) |
| G06F 3/0481 | (2022.01) |
| G06F 3/04842 | (2022.01) |
| G06F 3/04845 | (2022.01) |

(52) U.S. Cl.
CPC .......... *G06F 40/103* (2020.01); *G06F 3/0481* (2013.01); *G06F 3/04842* (2013.01); *G06F 3/04845* (2013.01)

(58) Field of Classification Search
CPC .... G06F 9/4443; G06F 40/103; G06F 3/0481; G06F 3/04842; G06F 3/04845; G09G 5/14; G09G 2340/02; G09G 2340/12
USPC ......................................................... 715/781
See application file for complete search history.

(56) References Cited

U.S. PATENT DOCUMENTS

| 5,490,241 A * | 2/1996 | Mallgren ............ G06F 3/04842 345/419 |
| 5,581,670 A * | 12/1996 | Bier ...................... G06F 3/0481 345/629 |
| 6,065,021 A | 5/2000 | George |
| 6,091,395 A | 7/2000 | Destefano et al. |
| 8,209,630 B2 | 6/2012 | Thimbleby et al. |
| 8,667,406 B1 | 3/2014 | Thakur et al. |
| 8,683,363 B2 * | 3/2014 | Reid ...................... G06F 3/0486 345/156 |
| 8,698,762 B2 | 4/2014 | Wagner et al. |
| 8,713,430 B2 * | 4/2014 | Tonisson ............... G06F 17/248 715/244 |
| 9,026,928 B2 * | 5/2015 | Ferry ........................ G06F 8/38 715/765 |
| 9,324,188 B1 * | 4/2016 | Fram ...................... G06T 19/00 |

(Continued)

FOREIGN PATENT DOCUMENTS

| CN | 103440318 A | 12/2013 |
| JP | H103371 A | 1/1938 |

(Continued)

OTHER PUBLICATIONS

International Preliminary report on Patentability for International Patent Application No. PCT/US2015/031863, dated May 6, 2016, date of filing: May 21, 2015, 12 pages.

(Continued)

*Primary Examiner* — Tadesse Hailu
(74) *Attorney, Agent, or Firm* — Christopher J. Volkmann; Kelly, Holt & Christenson, PLLC

(57) ABSTRACT

User inputs are received on a visual display, when a user is generating visual content. The user inputs trigger guide functionality, and guides are displayed to guide the user in creating the visual content.

15 Claims, 55 Drawing Sheets

(56) References Cited

U.S. PATENT DOCUMENTS

| | | | |
|---|---|---|---|
| 9,345,957 | B2 | 5/2016 | Geisner et al. |
| 2002/0073123 | A1 | 6/2002 | Tsai |
| 2004/0239691 | A1 | 12/2004 | Sprang et al. |
| 2005/0068290 | A1 | 3/2005 | Jaeger |
| 2005/0094206 | A1* | 5/2005 | Tonisson ............... G06F 40/103 358/1.18 |
| 2005/0108620 | A1* | 5/2005 | Allyn ................. G06F 3/04842 715/255 |
| 2009/0141966 | A1* | 6/2009 | Chen .................... G06T 7/0028 382/154 |
| 2010/0281361 | A1 | 11/2010 | Marchesotti |
| 2011/0074710 | A1* | 3/2011 | Weeldreyer .......... G06F 3/0481 345/173 |
| 2011/0246916 | A1 | 10/2011 | Leskelä et al. |
| 2013/0106917 | A1* | 5/2013 | Altin .................. G06F 3/04812 345/677 |
| 2013/0332869 | A1 | 12/2013 | Ferry et al. |
| 2015/0145784 | A1* | 5/2015 | Dowd .................. G06F 3/0488 345/173 |

FOREIGN PATENT DOCUMENTS

| | | | | |
|---|---|---|---|---|
| JP | 2009266009 | A | * 11/2009 | ............. G06F 17/21 |
| JP | 2009266009 | A | 11/2009 | |
| RU | 2383919 | C2 | 3/2010 | |
| RU | 2493581 | C2 | 9/2013 | |

OTHER PUBLICATIONS

"PowerPoint Ninja Toolbox: Drawing Guides", Published on: Dec. 28, 2008, Available at: http://www.powerpointninja.com/toolbox/powerpoint-ninja-toolbox-drawing-guides/.

"Fireworks / Change the Canvas", Published on: Sep. 10, 2010, Available at: http://help.adobe.com/en_US/fireworks/cs/using/WS4c25cfbb1410b0021e63e3d1152b00cace-7fda.html#WSEC03DOB7-D242-43f5-940F-7C5BBF705390.

Reputo, Ego Eram, "Photo Alignment & Cropping Guide", Published on: Sep. 2, 2011, Available at: http://forums.getpaint.net/index.php?/topic/22568-photo-alignment-cropping-guide/.

"PowerPoint Secrets", Published on: May 15, 2013, Available at: http://pptcrafter.wordpress.com/2013/05/15/powerpoint-secrets-alignment/.

Cohen, Sandee, "Align and Space Objects with InDesign's Smart Guides", Published on: Dec. 28, 2011, Available at: http://www.creativepro.com/article/align-and-space-objects-indesigns-smart-guides.

"Word 2013", Published on: Aug. 18, 2013, Available at: http://www.sjfc.edu/dotAsset/fd1fd137-ee22-4b79-83ca-6e596a29c2d7.pdf.

"Aligning Graphics", Published on: Jun. 8, 2011, Available at http://help.adobe.com/en_US/flashcatalyst/cs/using/WS4bebcd66a74275c3-615b0b3f12e114e73ea-8000.htm.

"Easy way to make smooth connection in Adobe Illustrator CS6" Published on: Jun. 14, 2013, Available at: http://graphicdesign.stackexchange.eom/questions/16007/easy-way-to-make-smooth-connection-in-adobe-illustrator-cs6.

International Search Report and Written Opinion for International Application No. PCT/US2015/031863, dated Dec. 1, 2015, date of filing: May 21, 2015, 15 pages.

"Invitation to Pay Additional Fees Issued in PCT Application No. PCT/US2015/031863", Mailed Date: Aug. 17, 2015, 16 Pages.

"First Office Action and Search-Report Issued in Chinese Patent Application No. 201580026876.6", dated Nov. 28, 2018, 11 Pages.

"Office Action issued in Mexican Patent Application No. MX/a/2016/015069", dated Jun. 21, 2018. 8 Pages.

Takahashi, Reo, "Adobe InDesign CS4, Master Book for Mac & Windows", Published by Mainichi Communications Inc., Mar. 19, 2009, pp. 231.

Ikuta, el al., "InDesign CSS, Reverse Look-up Design Dictionary—Plus", Published by Shoeisha Co., Ltd, Nov. 12, 2012, pp. 179.

"Office Action Issued in Mexican Patent Application No. Mx/a/2016/015089", dated Mar. 7, 2019, 08 Pages.

"Office Action issued in Russian Patent Application No. 2016145606", dated Jan. 18, 2019, 6 Pages. (W/O English translation).

"Office Action Issued in Japanese Patent Application No. 2016-559638", dated Feb. 1, 2019, 9 Pages.

"Office Action Issued in Australian Patent Application No. 2015264151", dated Oct. 24, 2019, 2 Pages.

"Office Action Issued in Brazilian Patent Application No. BR112016026079-1", dated Apr. 29, 2020, 5 Pages.

"Office Action Issued in Korean Patent Application No. 10-2016-7034755", dated May 20, 2021, 10 Pages.

"Office Action Issued in Indian Patent Application No. 201647039538", dated Oct. 17, 2020, 9 Pages.

"Office Action Issued in Canadian Patent Application No. 2947891", dated Jun. 9, 2021, 3 Pages.

"Office Action Issued in Australian Patent Application No. 2015264151", dated Jan. 24, 2020, 3 Pages.

* cited by examiner

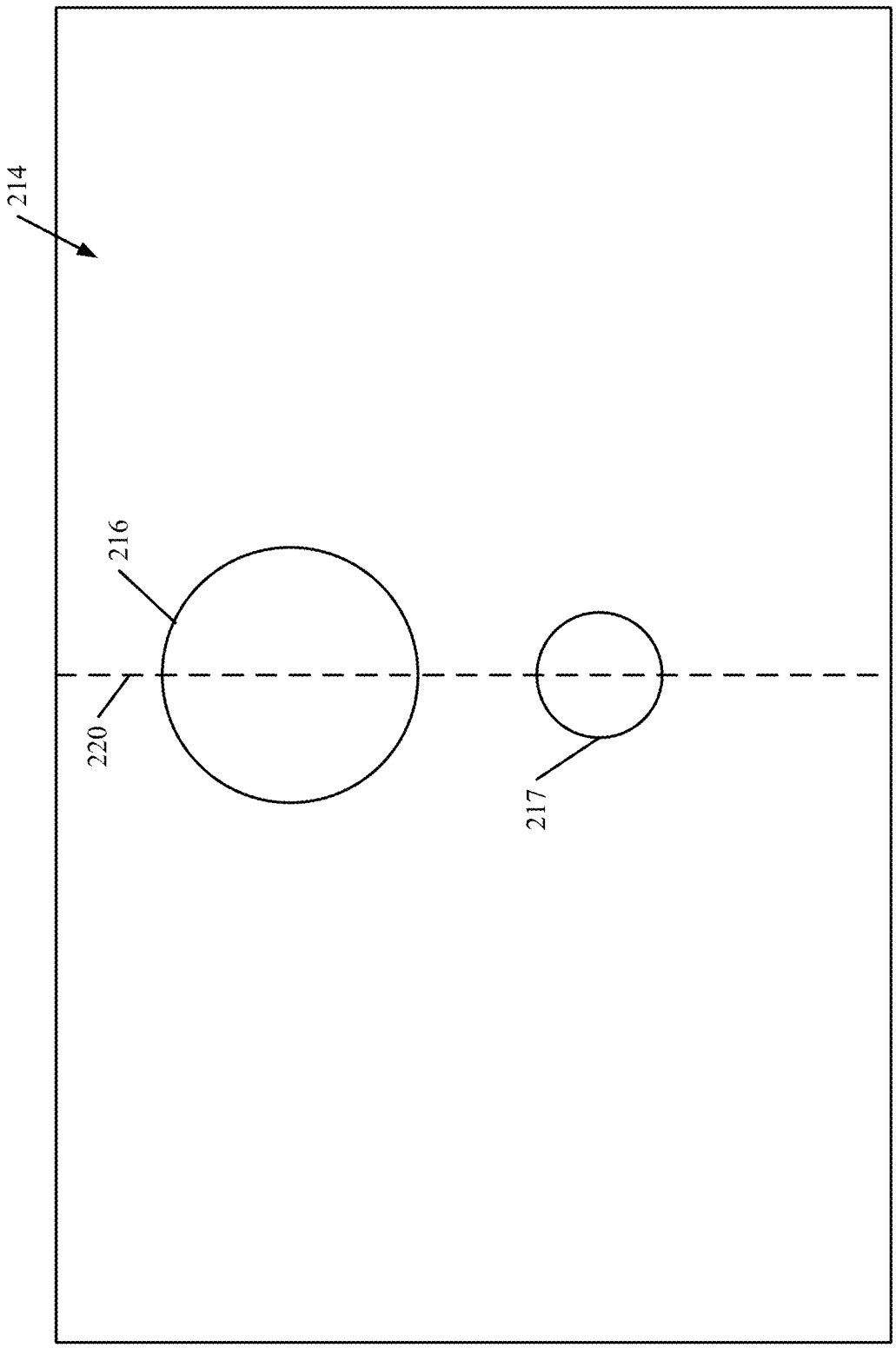

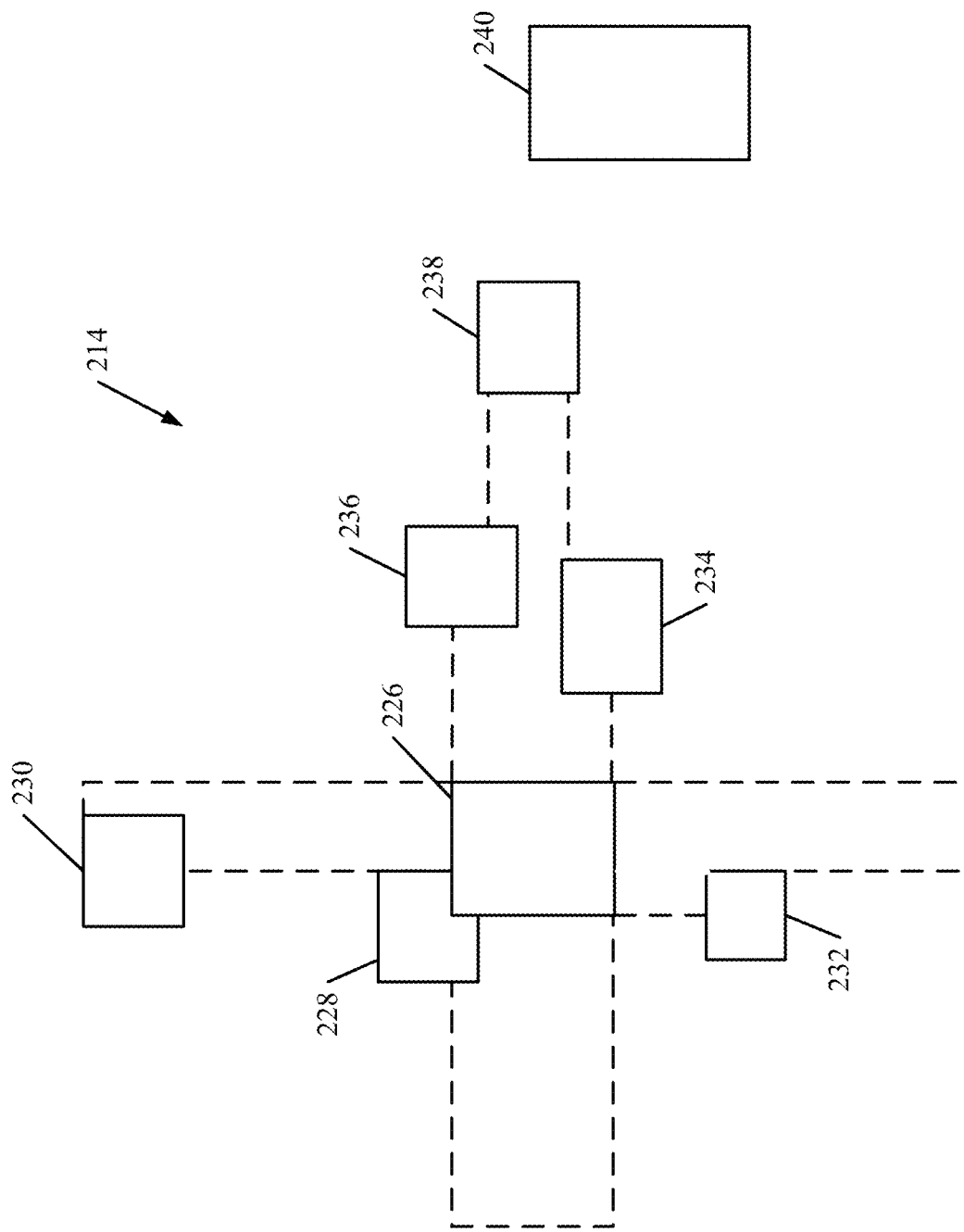

GUIDES ON A CONTENT GENERATION SYSTEM

BACKGROUND

Computer systems are currently in wide use. Some computer systems help users generate content.

For example, some presentation applications include functionality that assists users in generating slide presentations. In addition, word processing applications allow users to insert not only text, but objects, such as tables, images, etc., into documents. A wide variety of other computer systems allow users to create content as well.

In creating content, especially where the content is to be presented to an audience, users often wish to generate content with an overall consistency. For instance, when a user is generating a slide presentation, the user may wish to have objects on one slide be generally aligned with objects on a subsequent slide. Also, users may wish to know when objects are aligned with one another even on the same slide.

Currently, some presentation computer systems (or applications) display guides that indicate to a user when objects are aligned on a slide during drag and resize events. For instance, when a user drags an object around the user interface display, indicators are displayed when the edges of that object align with the edges of another object on the slide, or when three or more shapes are equidistant from one another. Some functionality is also provided in order to snap objects into alignment, once they are within a threshold distance of alignment.

The discussion above is merely provided for general background information and is not intended to be used as an aid in determining the scope of the claimed subject matter.

SUMMARY

User inputs are received on a visual display, when a user is generating visual content. The user inputs trigger guide functionality, and guides are displayed to guide the user in creating the visual content.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
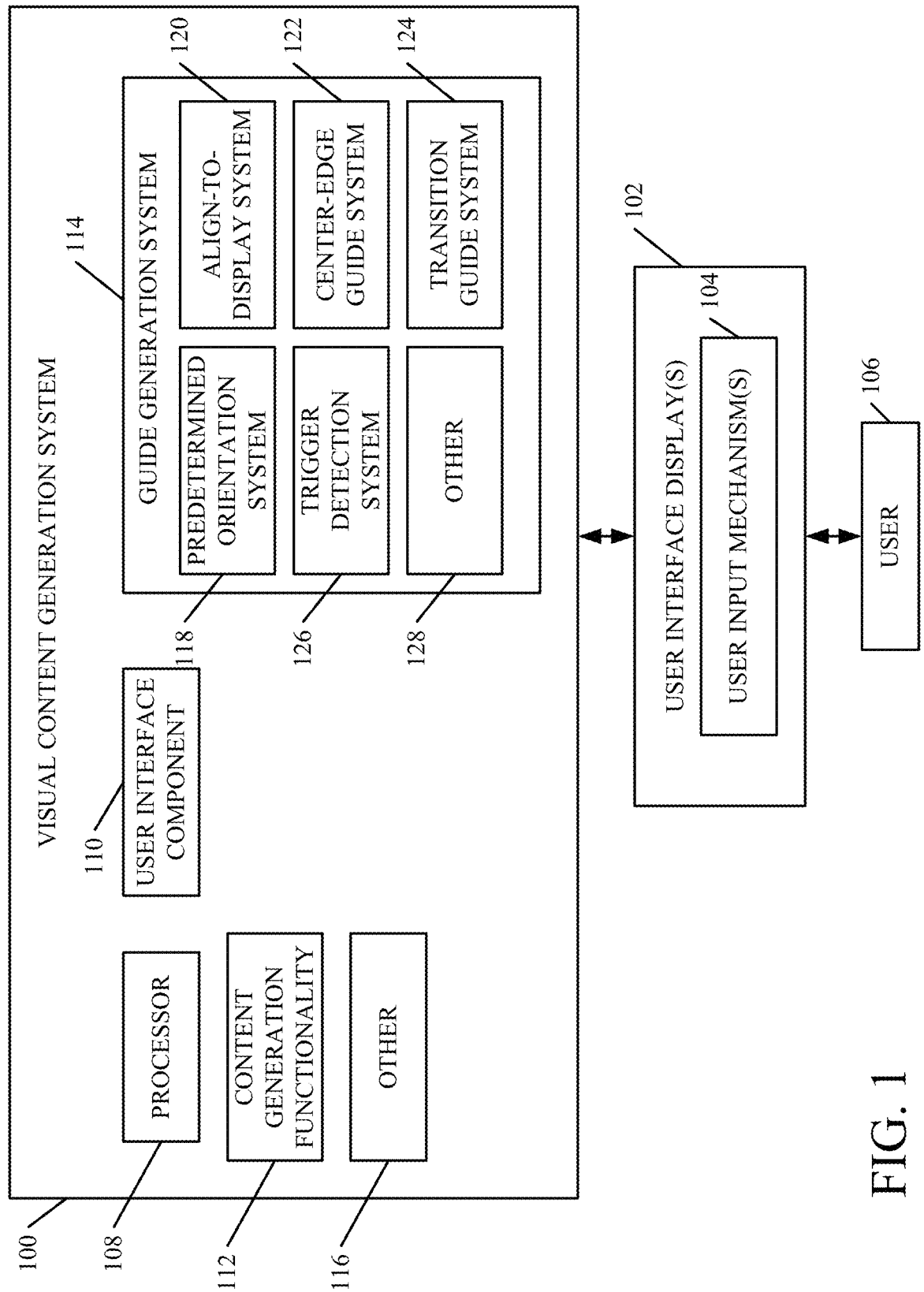
FIG. 1 is a block diagram of one embodiment of a visual content generation system.

FIG. 1 is a block diagram of one embodiment of a visual content generation system 100. System 100 is shown generating user interface displays 102 with user input mechanisms 104 for interaction by user 106. User 106 illustratively interacts with user input mechanisms 104 in order to control and manipulate system 100, in order to generate and edit visual content.

Visual content generation system 100 will be described in the present discussion as a slide presentation system. However, it will be noted that this is only one embodiment of a visual content generation system and a wide variety of others could be used as well. For instance, it could be a word processing system, a report generation system, or any of a wide variety of other visual content generation systems.

System 100 illustratively includes processor 108, user interface component 110, content generation functionality 112, guide generation system 114, and it can include other items 116 as well. Guide generation system 114, itself, illustratively includes predetermined orientation system 118, align-to-display system 120, center-edge guide system 122, transition guide system 124, trigger detection system 126, and it can include other items 128 as well.

Before describing the operation of visual content generation system 100, and more specifically guide generation system 114, in detail, a brief overview will be provided. Content generation functionality 112 is illustratively functionality that allows user 106 to generate content, and edit or delete content, using system 100. For instance, where system 100 is a slide presentation system, functionality 112 allows user 106 to create, edit or delete slides in a slide presentation. User interface component 112 generates user interface displays with user input mechanisms 104. It does so either by itself, or under control of other items in system 100. Guide generation system 114 generates visual guides for user 106, in creating content. Predetermined orientation system 118 displays guides that allow user 106 to see whether objects are in a predetermined orientation (such as whether lines are horizontal or vertical, etc.). Align-to-display system 120 displays guides that allow user 106 to align visual objects relative to the user interface display on which they are displayed (such as relative to the slide on which they are displayed). Center-edge guide system 122 displays guides that allow user 106 to easily align the center of one object on the user interface display with the edge of another object. Transition guide system 124 generates guides that allow user 106 to align objects on multiple different slides. Trigger detection system 126 detects when the user 106 has taken an action that triggers one of systems 118-124.

Figure 2:
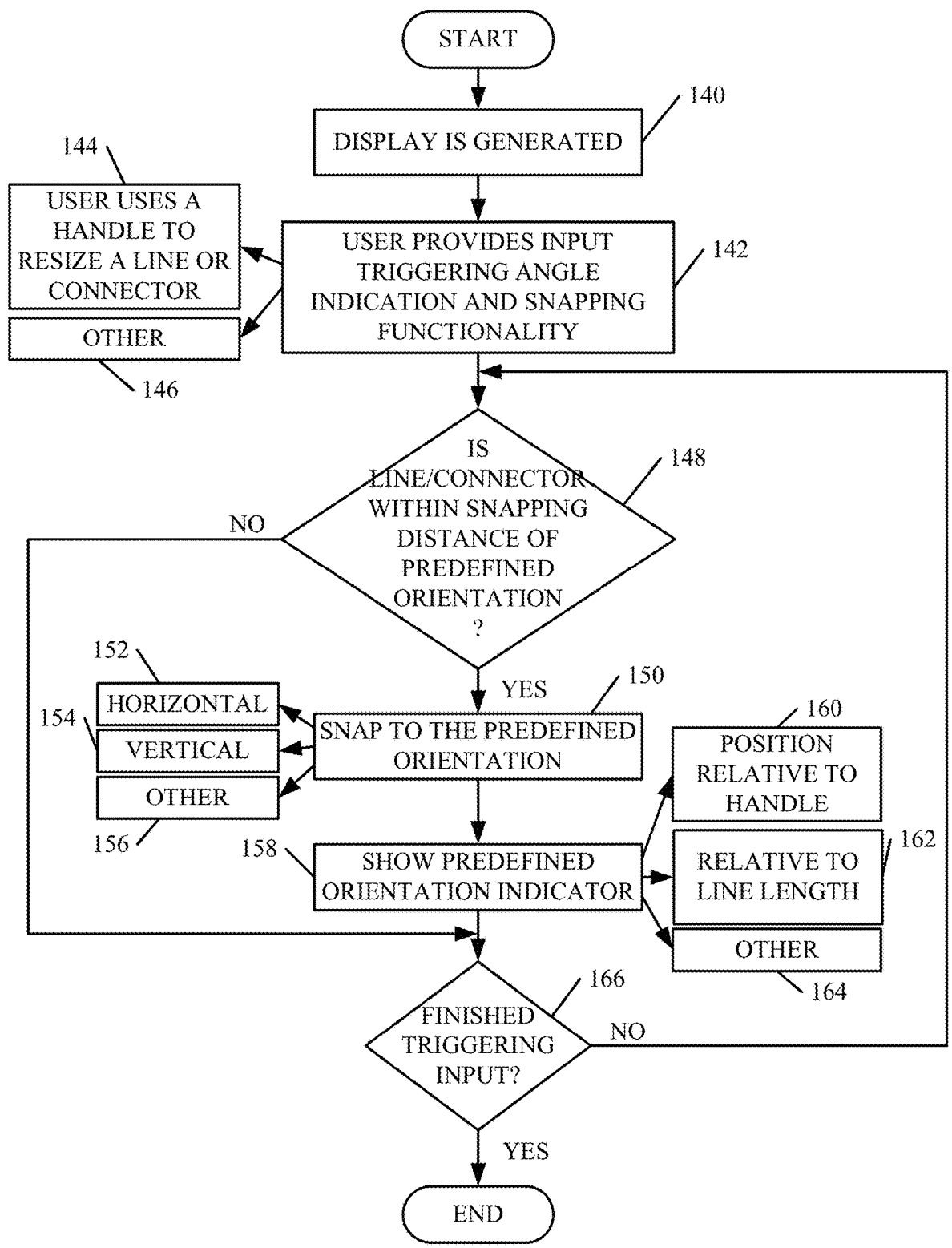
FIG. 2 is a flow diagram illustrating one embodiment of the operation of the system shown in FIG. 1 in performing right angle guide and snapping functionality.

FIG. 2 is a flow diagram illustrating one embodiment of the operation of predetermined orientation system 118, in more detail. In the embodiment discussed in FIG. 2, predetermined orientation system 118 generates guides that help the user 106 place objects in a predetermined orientation. For the example discussed, the predetermined orientation will be horizontal and vertical orientations. Therefore, for instance, FIG. 2 describes how system 118 guides user 106 in generating horizontal and vertical lines. It will be appreciated, however, that it can guide user 106 with respect to other objects that have an elongate axis. It can also guide user 106 with respect to positioning the elongate axis of an object in the other predetermined orientations as well, such as 45° angle orientations or others.

In any case, FIG. 2 assumes that user 106 has created some type of content on a display (such as a slide). This is indicated by block 140 in FIG. 2. Trigger detection system 126 then detects that the user has provided an input triggering angle indication and snapping functionality implemented by system 118. Detecting the trigger is indicated by block 142 in FIG. 2. The triggers can be a wide variety of different triggers. For instance, in one embodiment, if the user 106 uses a handle to resize a line or connector, this can trigger the angle indication and snapping functionality in system 118. This trigger is indicated by block 144. The triggers can include other user inputs as well, and this is indicated by block 146.

Assuming that the user has provided a triggering input, then predetermined orientation system 118 determines whether the line or connector that the user is resizing is within a snapping distance of a predefined orientation. This is indicated by block 148 in FIG. 2. By way of example, if the user is moving a handle of a line so that the line is within a predetermined distance of being either horizontal or vertical, then system 118 snaps the line being resized to that predetermined orientation. This is indicated by block 150. Snapping to a horizontal orientation is indicated by block 152. Snapping to a vertical orientation is indicated by block 154, and snapping to another predefined orientation is indicated by block 156.

System 118 will also then show a predefined orientation indicator, indicating that the line that is being resized by the user is either vertical or horizontal. This is indicated by block 158 in FIG. 2. The predefined orientation indicator, in one embodiment, is positioned at a predetermined spot relative to the handle being manipulated by the user. This is indicated by block 160. It can also be positioned relative to the length of the line being resized by the user. This is indicated by block 162. It can be positioned in other ways as well, and this is indicated by block 164.

As long as the user continues with the triggering input, processing continues back at block 148. However, when the user 106 finishes with the triggering input, then processing of system 118 is completed. This is indicated by block 166.

Figure 2A:
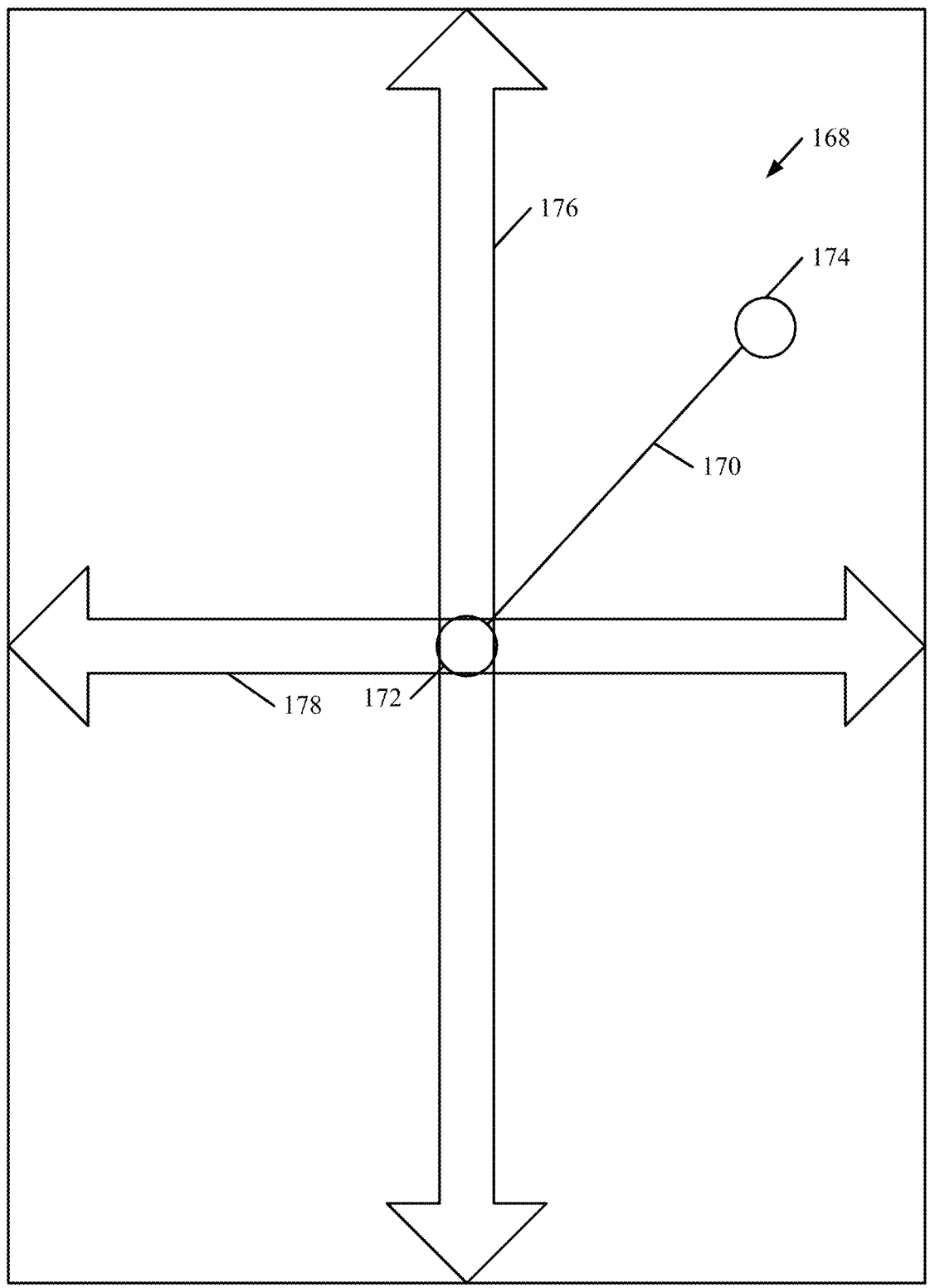
FIGS. 2A-2F illustrate examples of right angle and guide functionality.

A number of examples will now be discussed. FIG. 2A shows a user interface display 168 that has a connector or line 170. Line 170 has two handles, at its opposite ends, designated 172 and 174, respectively. In one embodiment, the user is moving handle 174 to move or resize line 170. Arrow 176 has a width that defines a snapping region for the predefined, vertical orientation. Therefore, if user 106 moves handle 174 into the snapping region defined by arrow 176, then system 118 snaps line 170 to the vertical orientation. Arrow 178 does the same thing for the horizontal orientation. Therefore, if the user 106 moves handle 174 into the region defined by arrow 178, then system 118 snaps the line to the horizontal orientation.

Figure 2B:
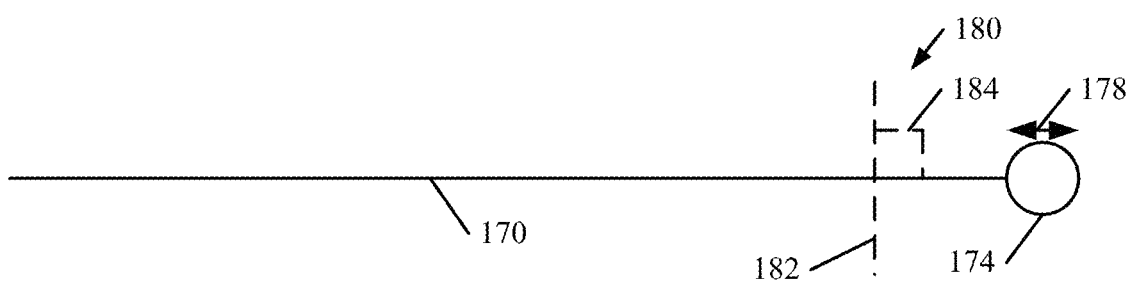

Once line 170 is in a predefined orientation (e.g., horizontal or vertical), system 118 generates a predefined orientation indicator. One example of this is shown in FIG. 2B. It can be seen in FIG. 2B that the user has moved the handle into the range defined by arrow 178 so that system 118 has snapped line 170 to the horizontal orientation. It thus displays predetermined orientation indicator 180. In the embodiment shown in FIG. 2B, indicator 180 includes a perpendicular axis indicator 182 and right angle indicator 184. Thus, indicator 180 shows that line 170 is now perpendicular to the vertical axis 182. In one embodiment, indicator 180 is positioned proximate handle 174, but spaced therefrom, so the user can see indicator 180 but it is unlikely to be obscured by the user's finger while drawing the line, if the user is manipulating handle 174 with his or her finger.

Figure 2C:
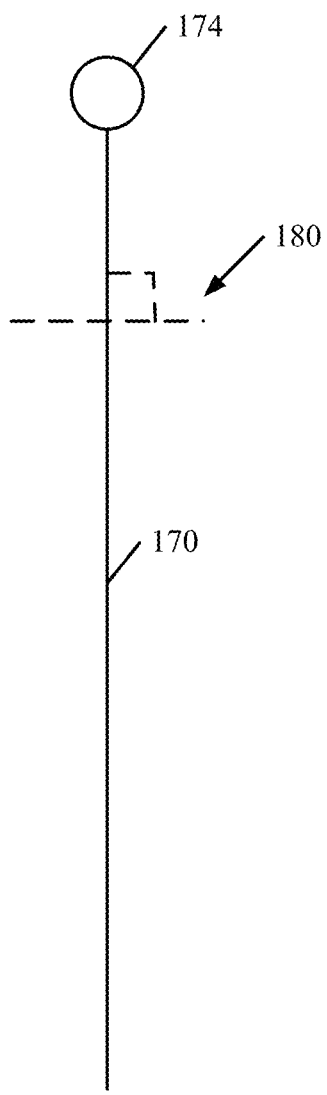
Figure 2D:
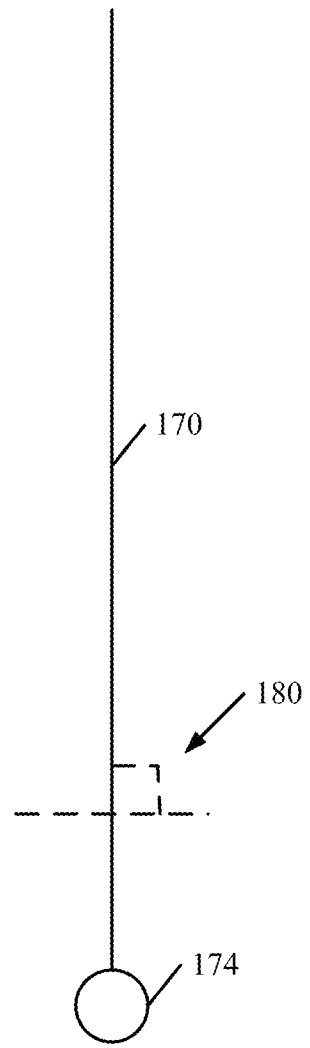

FIGS. 2C and 2D show two additional embodiments where the user is manipulating handle 174 on the opposite end of line 170. FIGS. 2C and 2D show that system 118 has snapped the line to the vertical orientation and displayed indicator 180 accordingly.

Figure 2E:
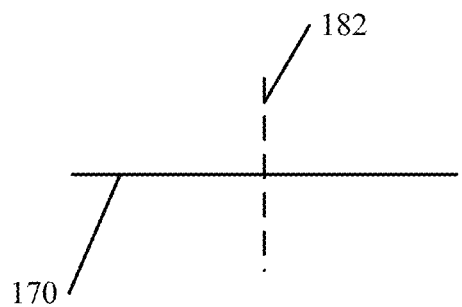
Figure 2F:
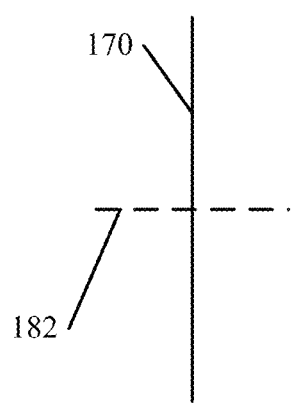

It may happen that line 170 is too short to conveniently display the entire indicator 180. In that case, only a portion of the indicator may be displayed. FIGS. 2E and 2F, for instance, show embodiments where line 170 is relatively short. In that case, system 118 may choose to only display a portion of indicator 180, such as the perpendicular axis 182. In one embodiment, the perpendicular axis is centered along the relatively short line 170, regardless of where user 106 is resizing the line 170. Of course, the examples shown in FIGS. 2A-2F are only examples, and other indicators and functionality can be provided as well.

Figure 3:
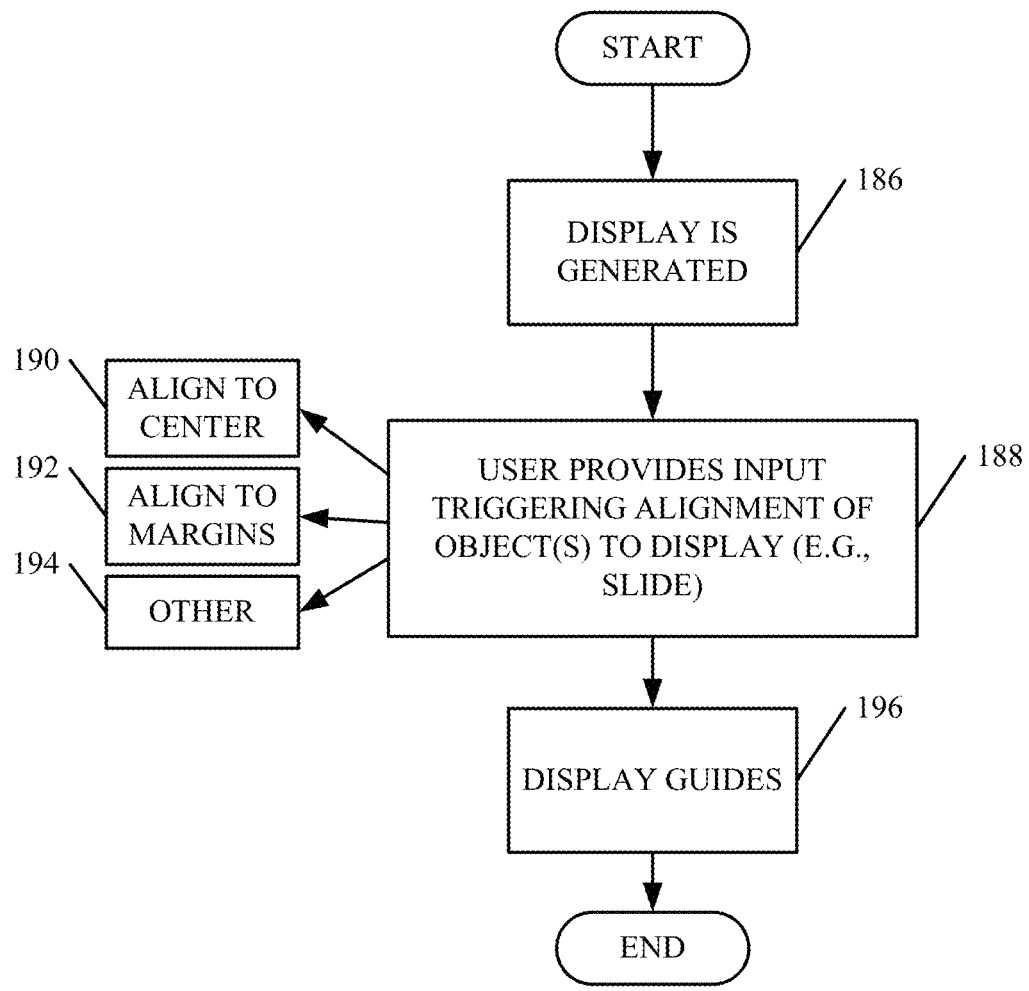
FIG. 3 is a flow diagram illustrating one embodiment of the operation of the system shown in FIG. 1 in aligning an object to a display (such as a slide).

FIG. 3 is a flow diagram illustrating one embodiment of the operation of align-to-guide system 120. System 120 generates guides that assist user 106 in aligning objects to various portions of the user interface display (such as to various portions of the slide). Thus, it is first assumed that a display of some object is generated. This is indicated by block 186 in FIG. 3.

Trigger detection system 126 then detects an input that triggers the alignment of objects to the display. This is indicated by block 188. In one embodiment, system 120 provides guides that assist user 106 in aligning objects to the center of the display. This is indicated by block 190. In another embodiment, system 120 generates guides that assist user 106 in aligning objects to margins of the display. This is indicated by block 192. System 120 can generate guides that assist user 106 in aligning to other portions of the slide as well, and this is indicated by block 194.

Once trigger detection system 126 detects the user input trigger, system 120 displays the guides. This is indicated by block 196.

Figure 4:
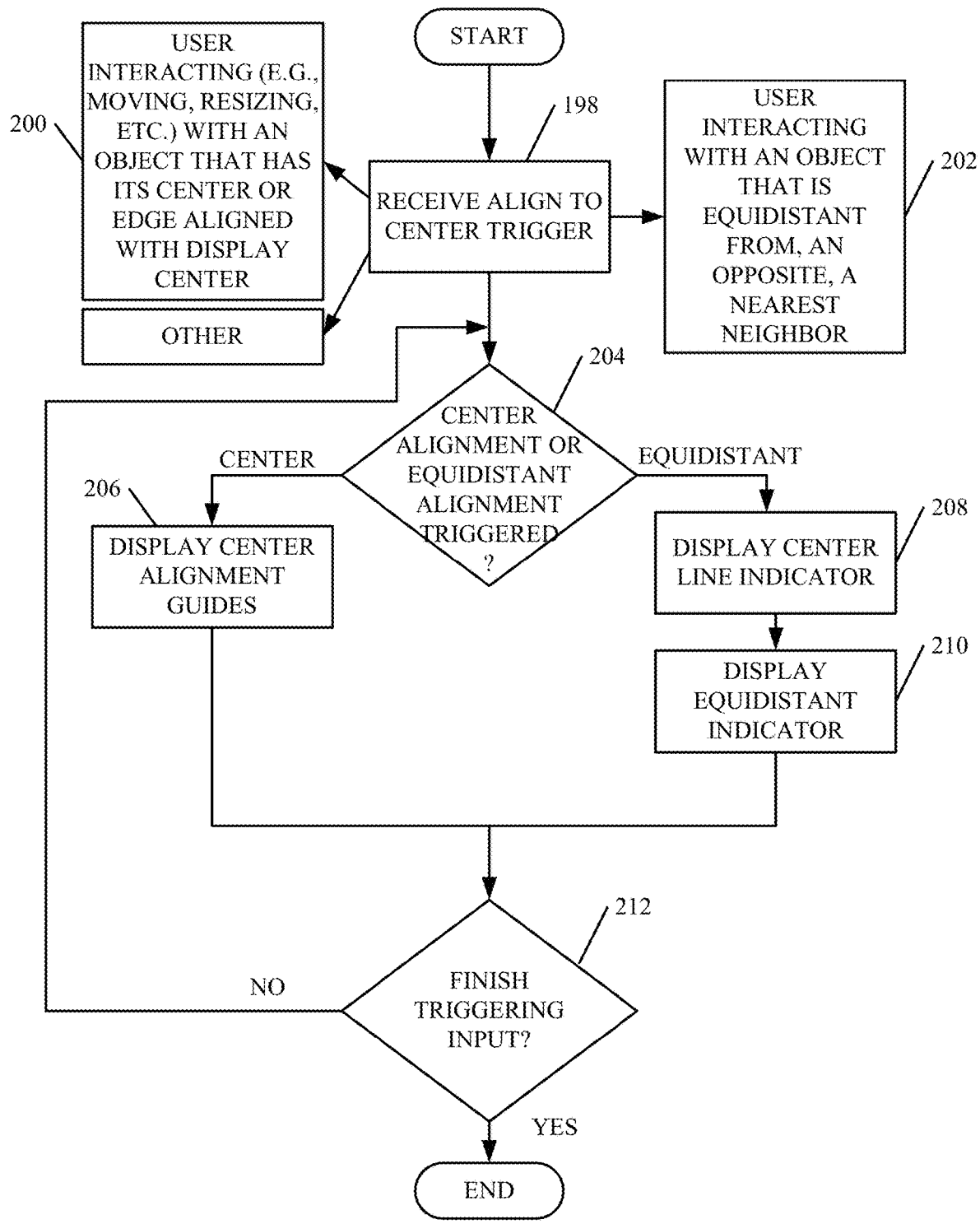
FIG. 4 is a flow diagram illustrating one embodiment of the operation of the system shown in FIG. 1 in aligning an object to a center of a display (such as a slide).

FIG. 4 is a flow diagram illustrating one embodiment of the operation of system 120 in generating guides that allow user 106 to align objects relative to the center of the display, in more detail. Trigger detection system 126 first receives a user input trigger that triggers system 120 to display guides to align an object to the center of the display. Receiving this type of trigger is indicated by block 198 in FIG. 4. The trigger can take a wide variety of different forms.

In one embodiment, for instance, if the trigger includes the user interacting with (such as moving, resizing, etc.) an object that has its center or its edge aligned with the center of the display. This is indicated by block 200. In another embodiment, the trigger includes the user interacting with an object that is equidistant from, and opposite, a nearest neighbor object. This is indicated by block 202.

If the trigger is that the object has its center or edge aligned with the display center, then system 120 generates center alignment guides. This is indicated by blocks 204 and 206. On the other hand, if the trigger is that the user is interacting with an object that is equidistant, and opposite, a nearest neighbor, then system 120 displays a center line indicator and an equidistant indicator. This is indicated by blocks 204, 208 and 210. This operation continues as long as the user is providing the triggering input. This is indicated by block 212.

Figure 4A:
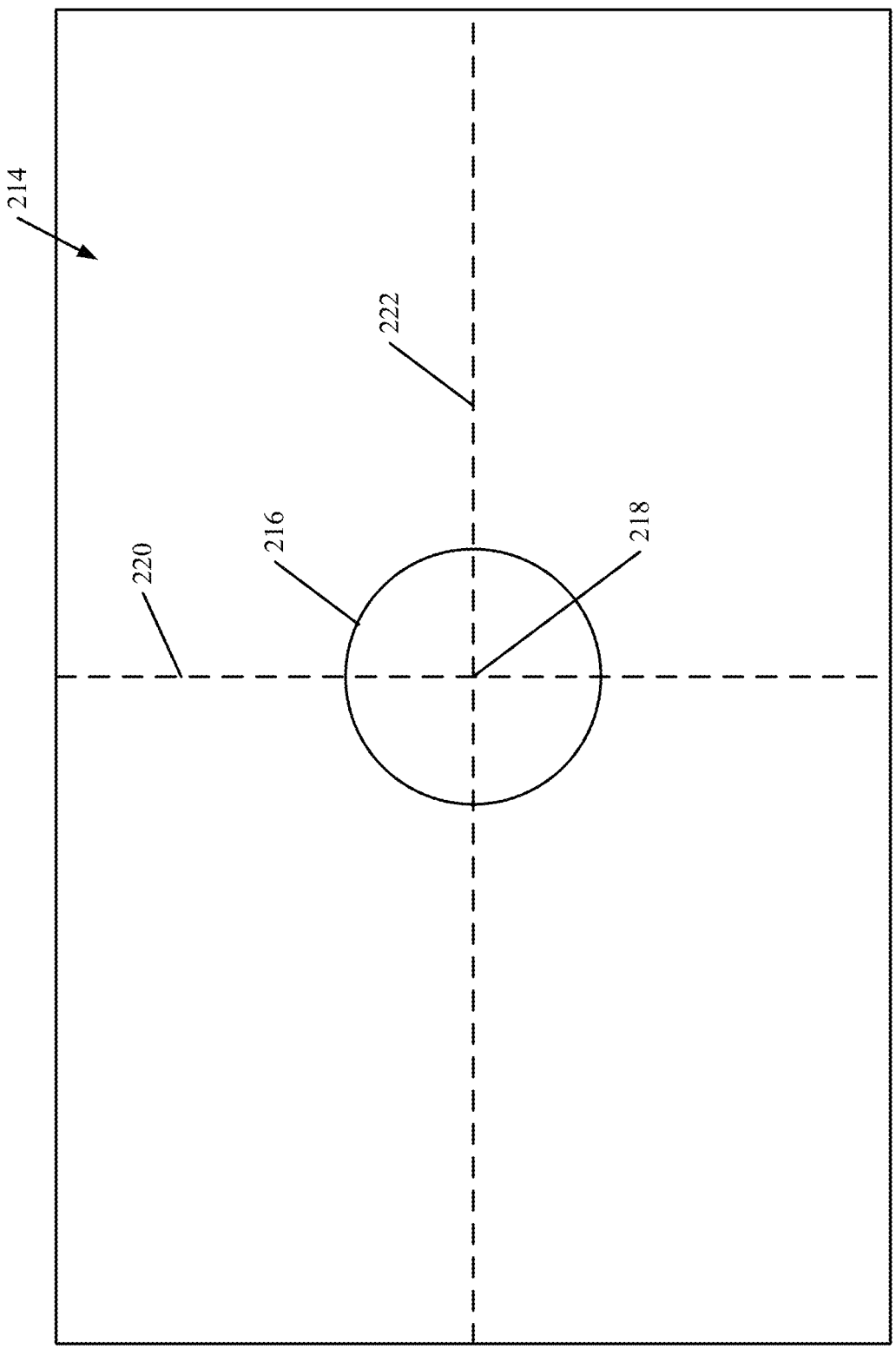
FIGS. 4A-4O show examples of aligning to the center of a display.
Figure 4B:
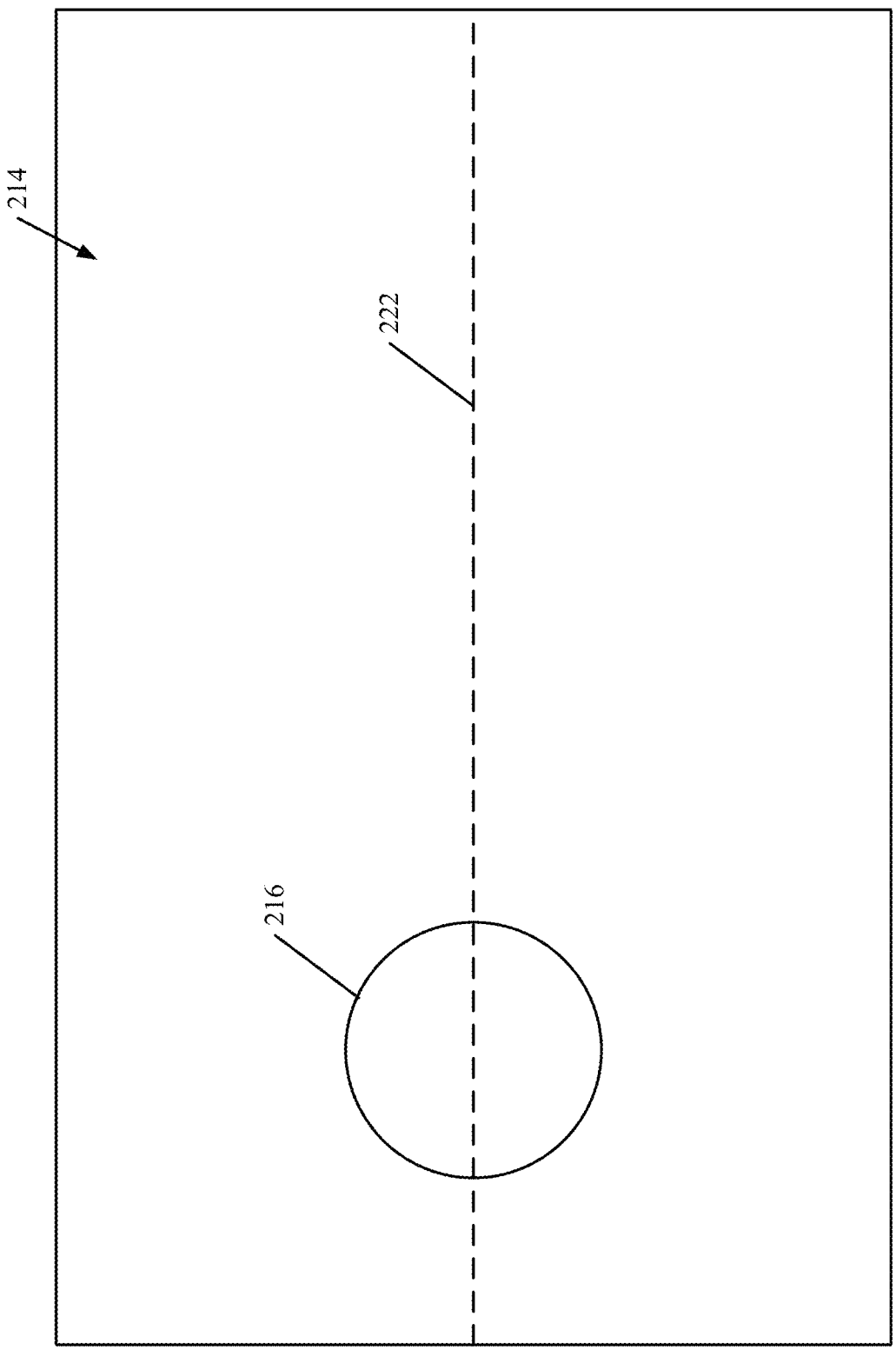
Figure 4C:
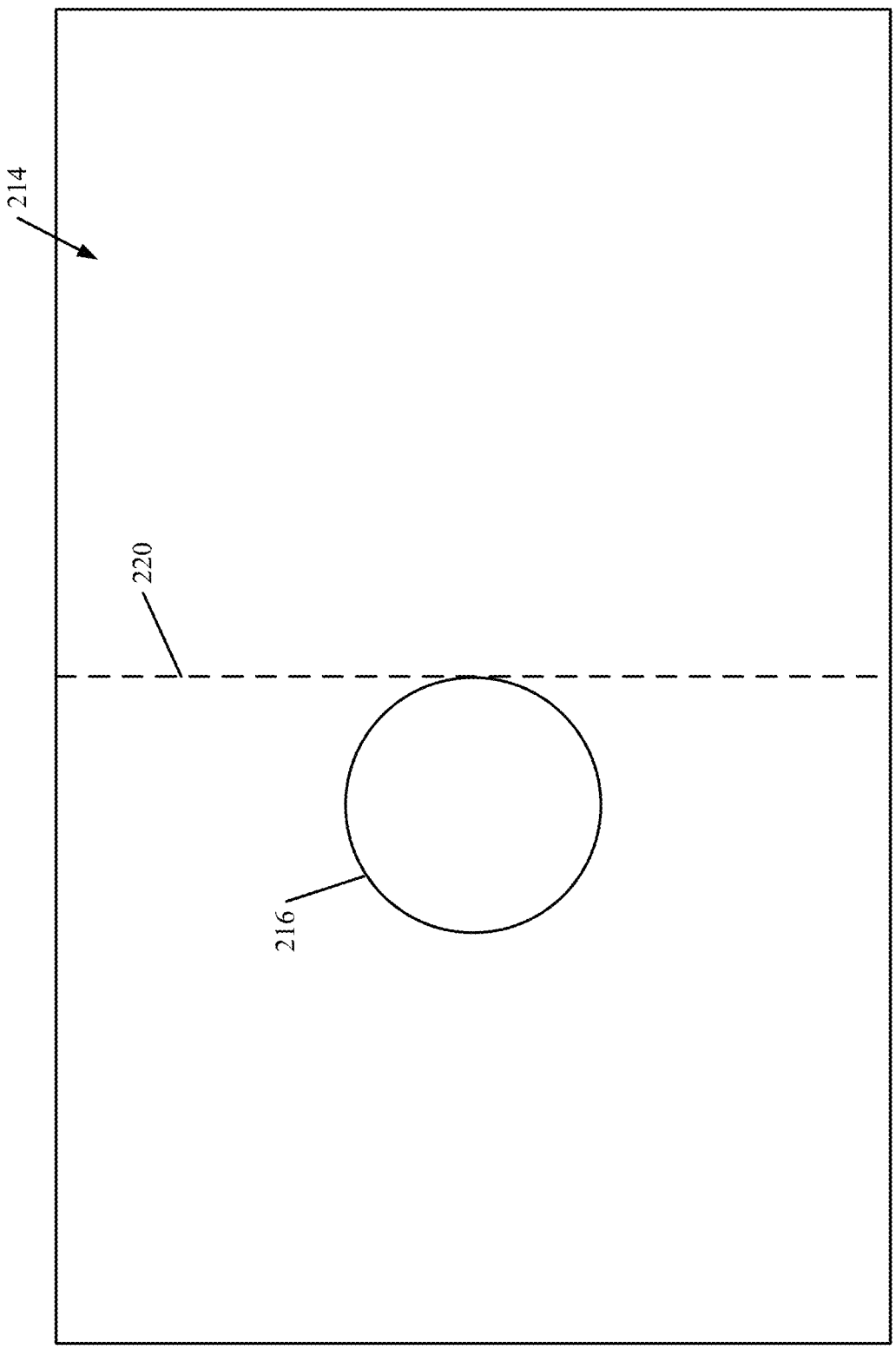
Figure 4D:
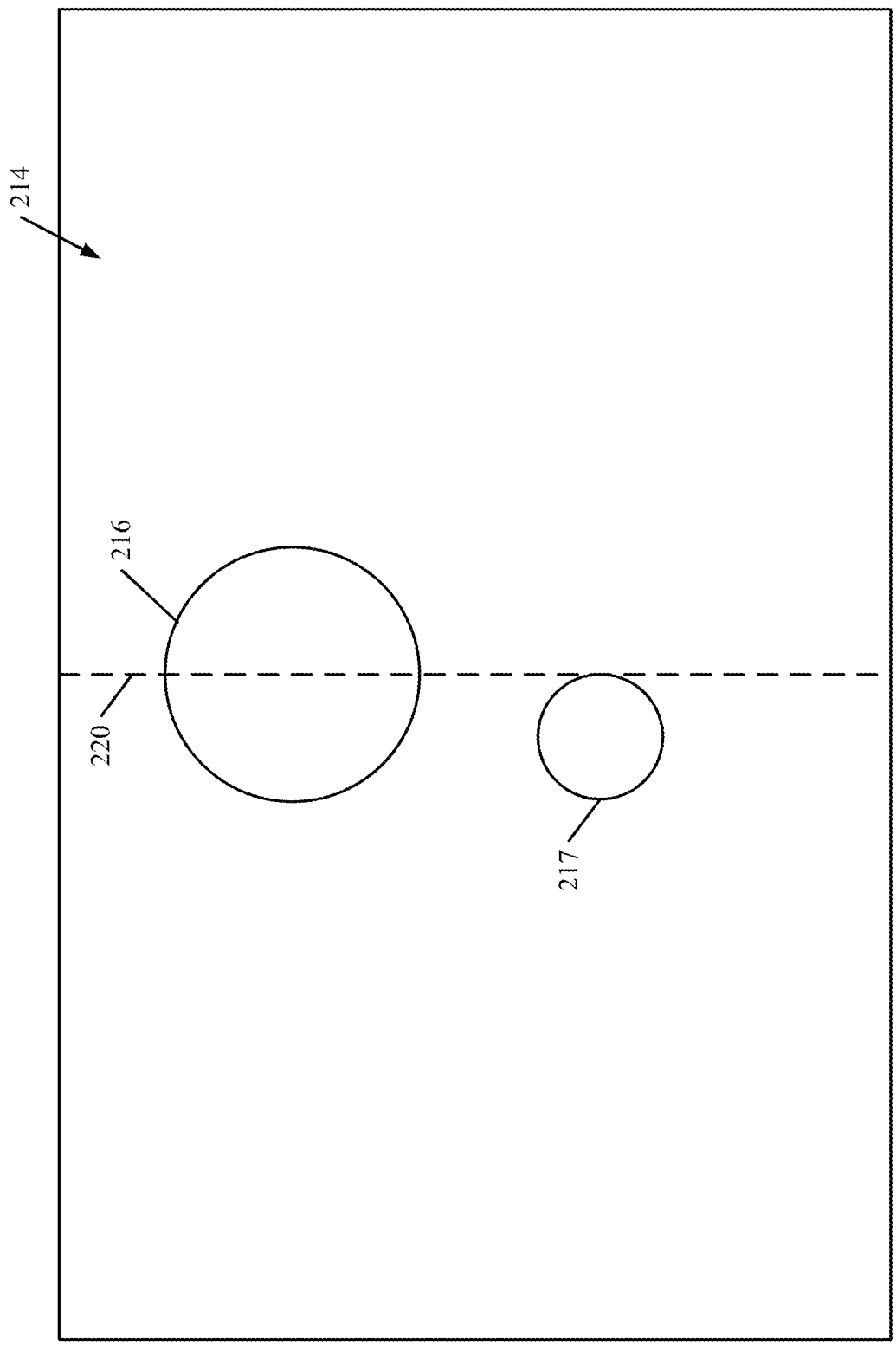
Figure 4G:
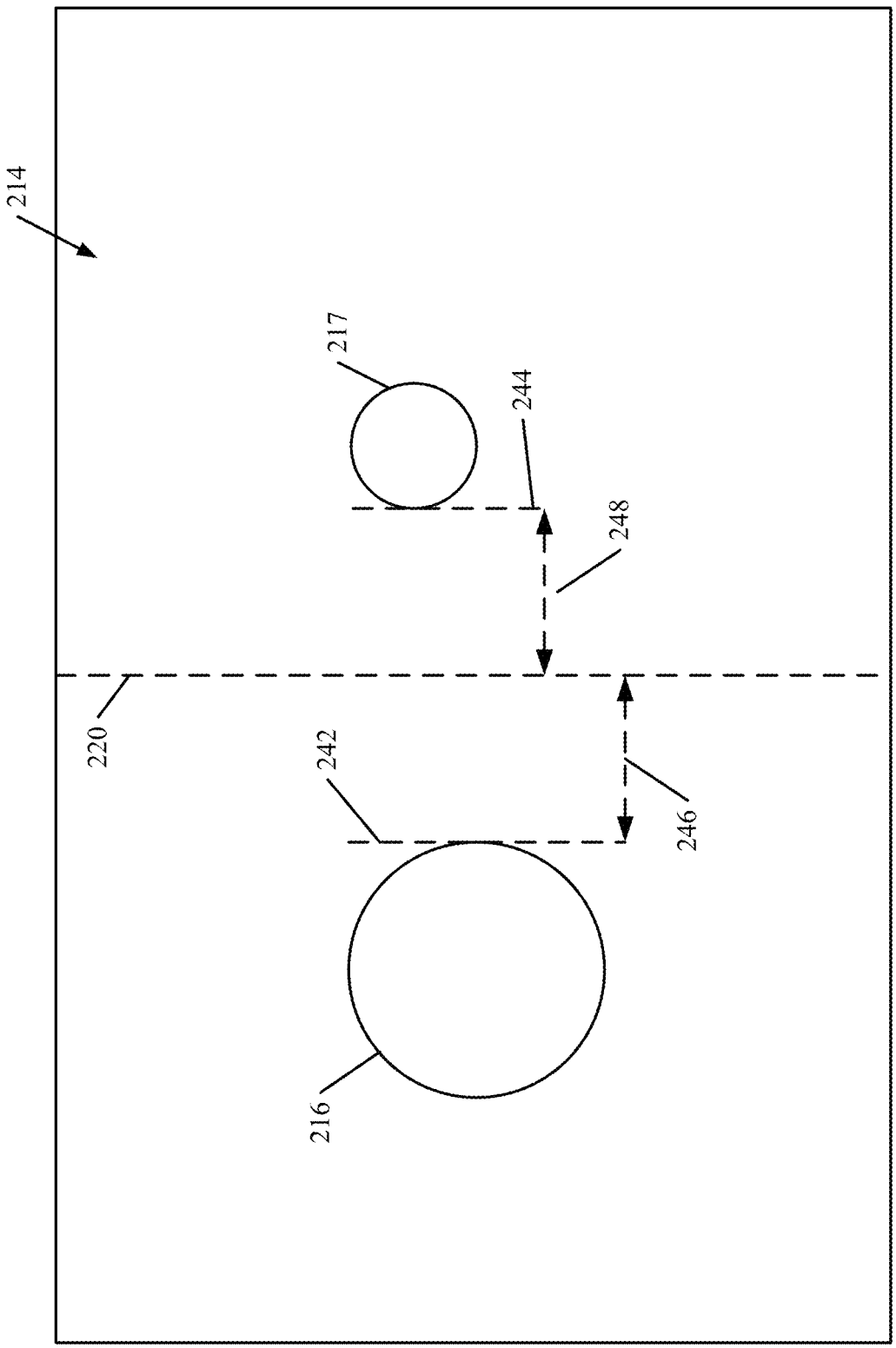
Figure 4H:
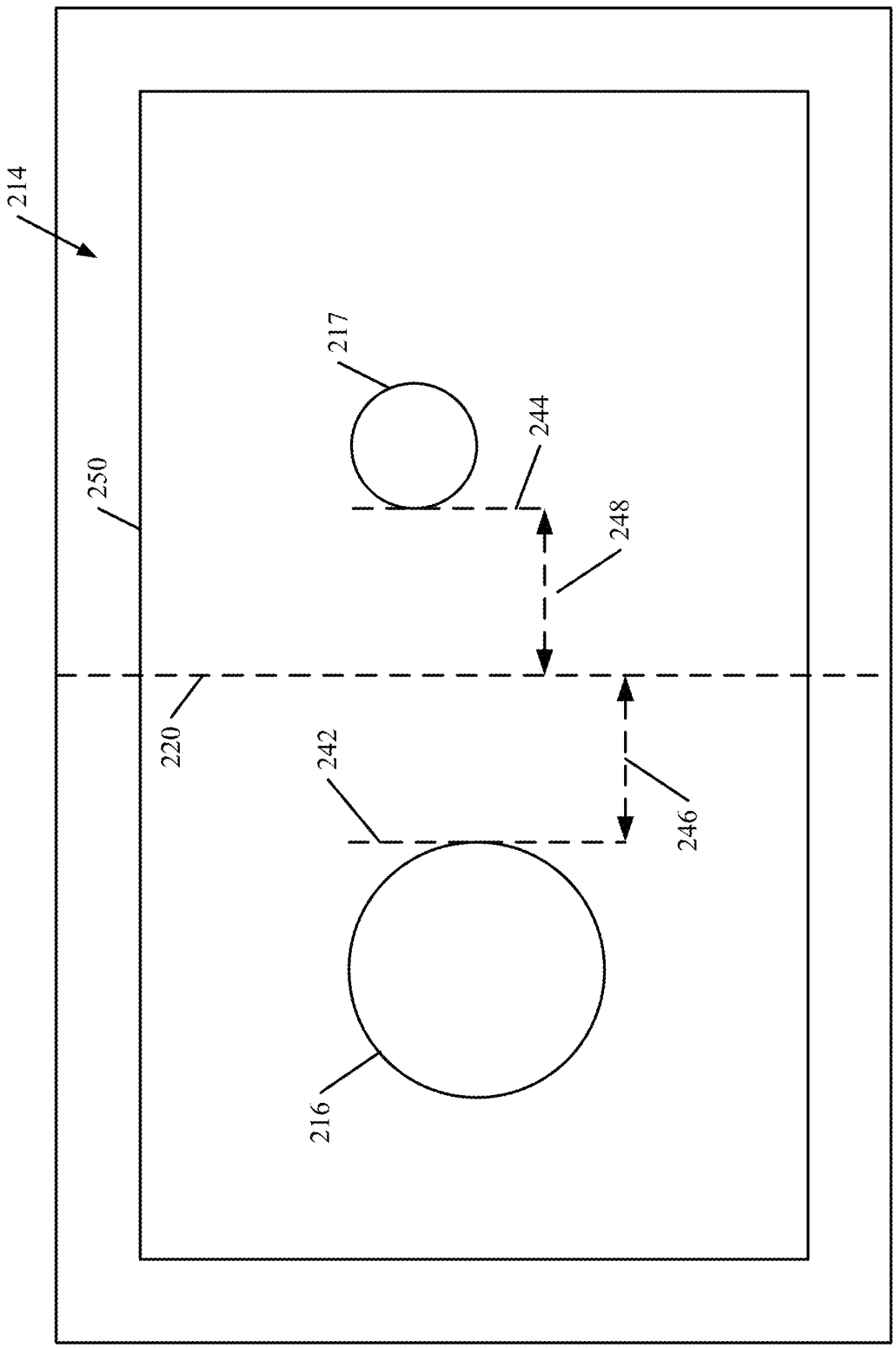
Figure 4I:
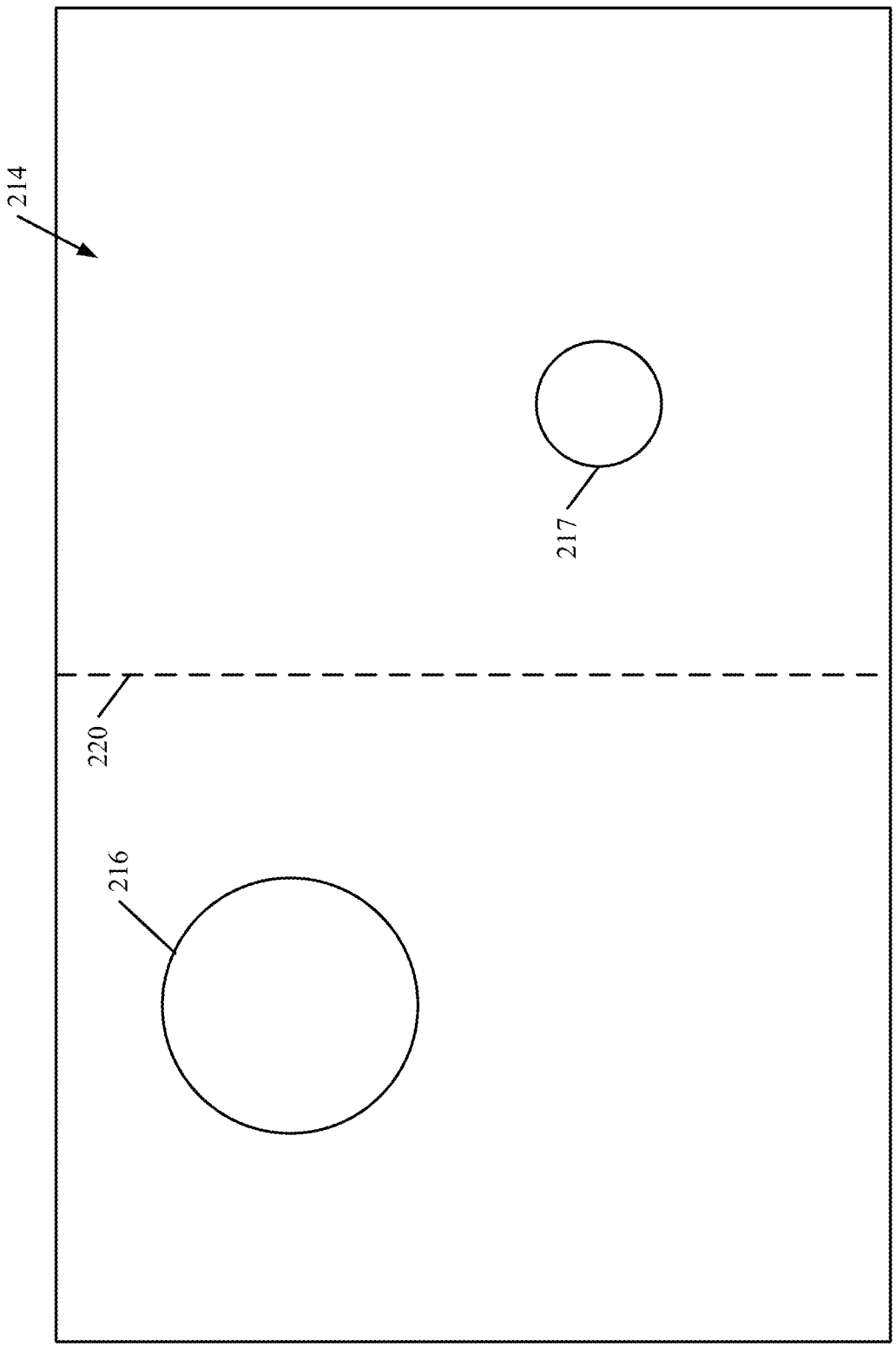
Figure 4J:
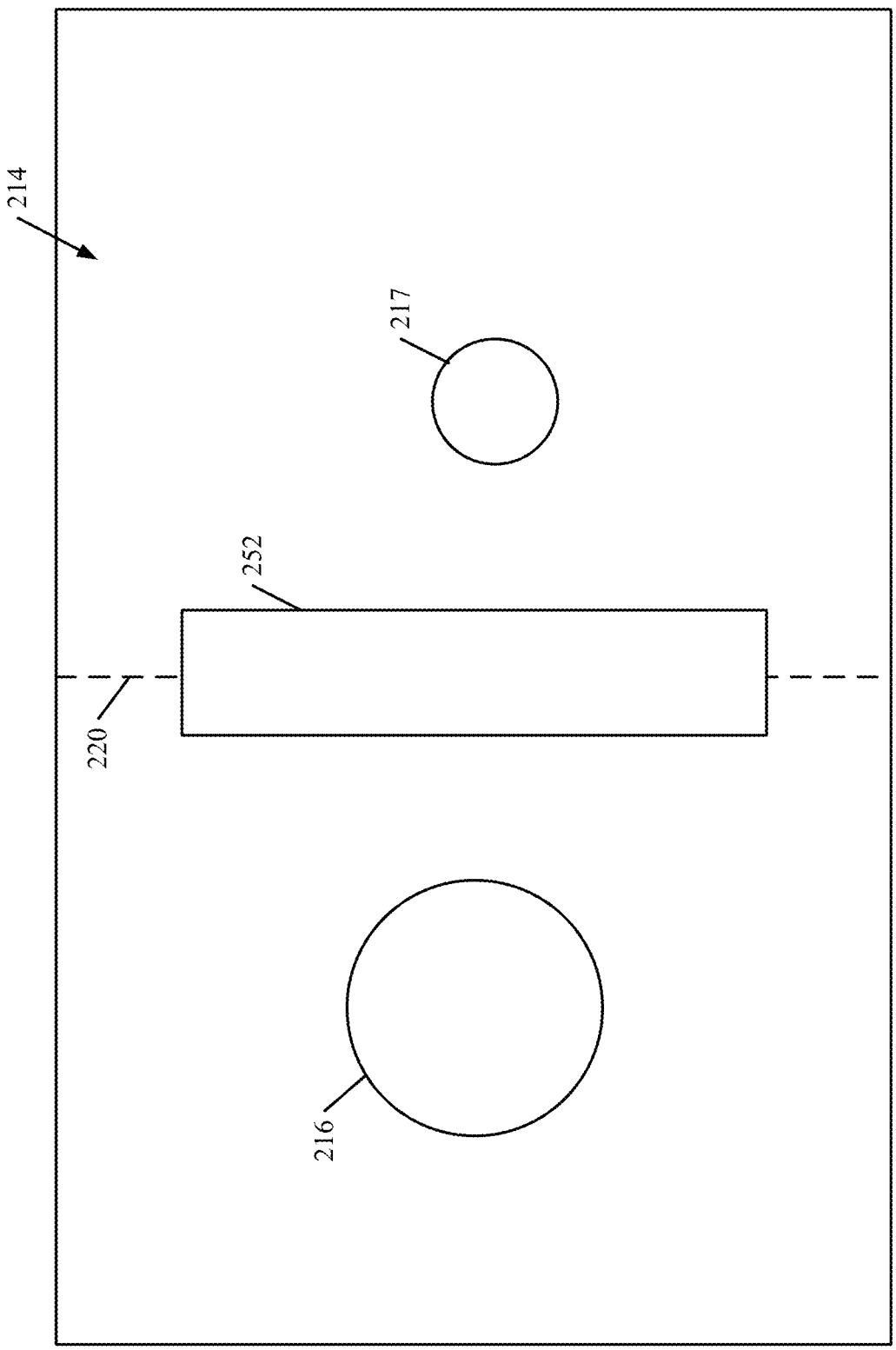
Figure 4K:
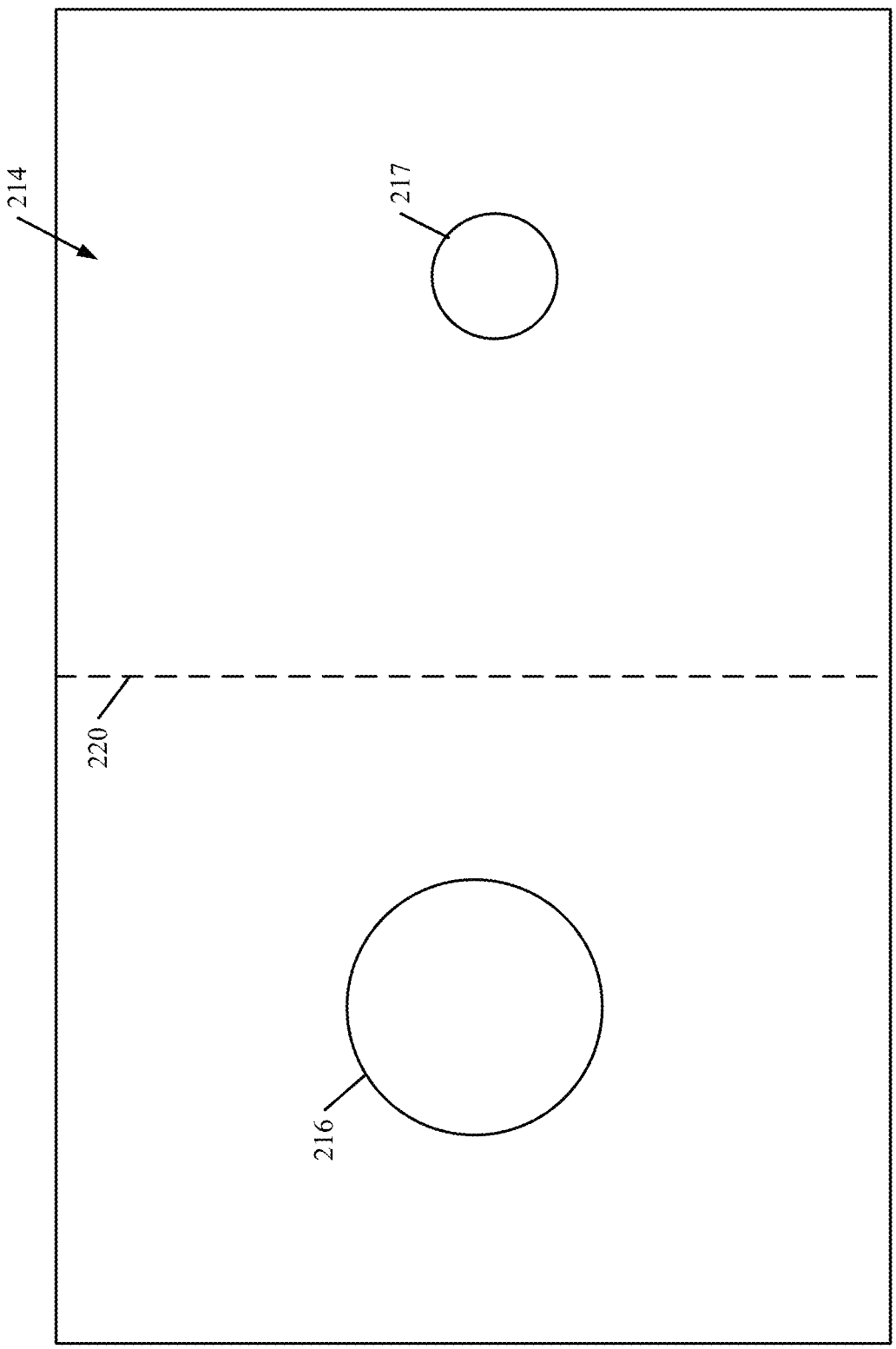
Figure 4L:
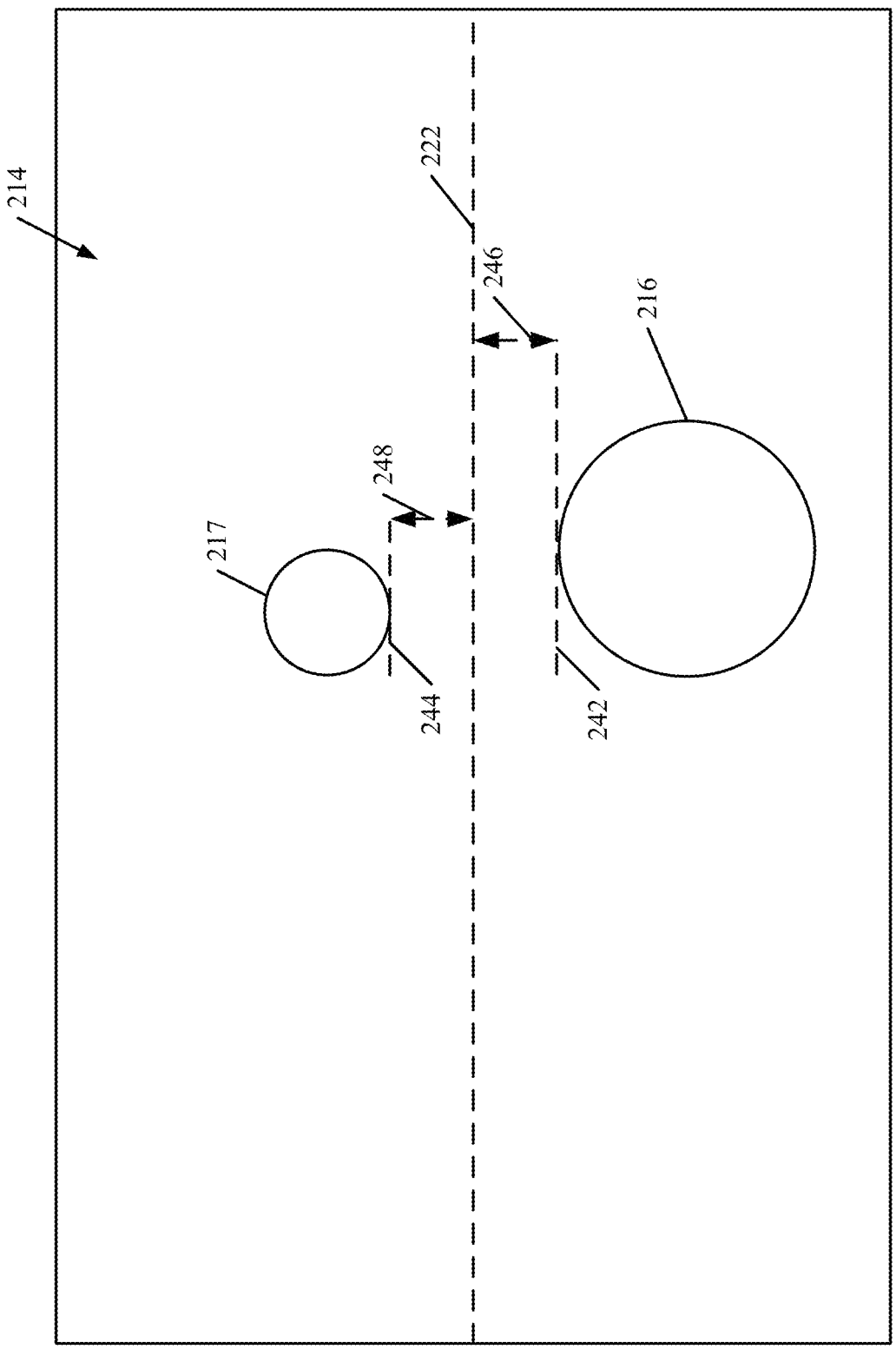
Figure 4M:
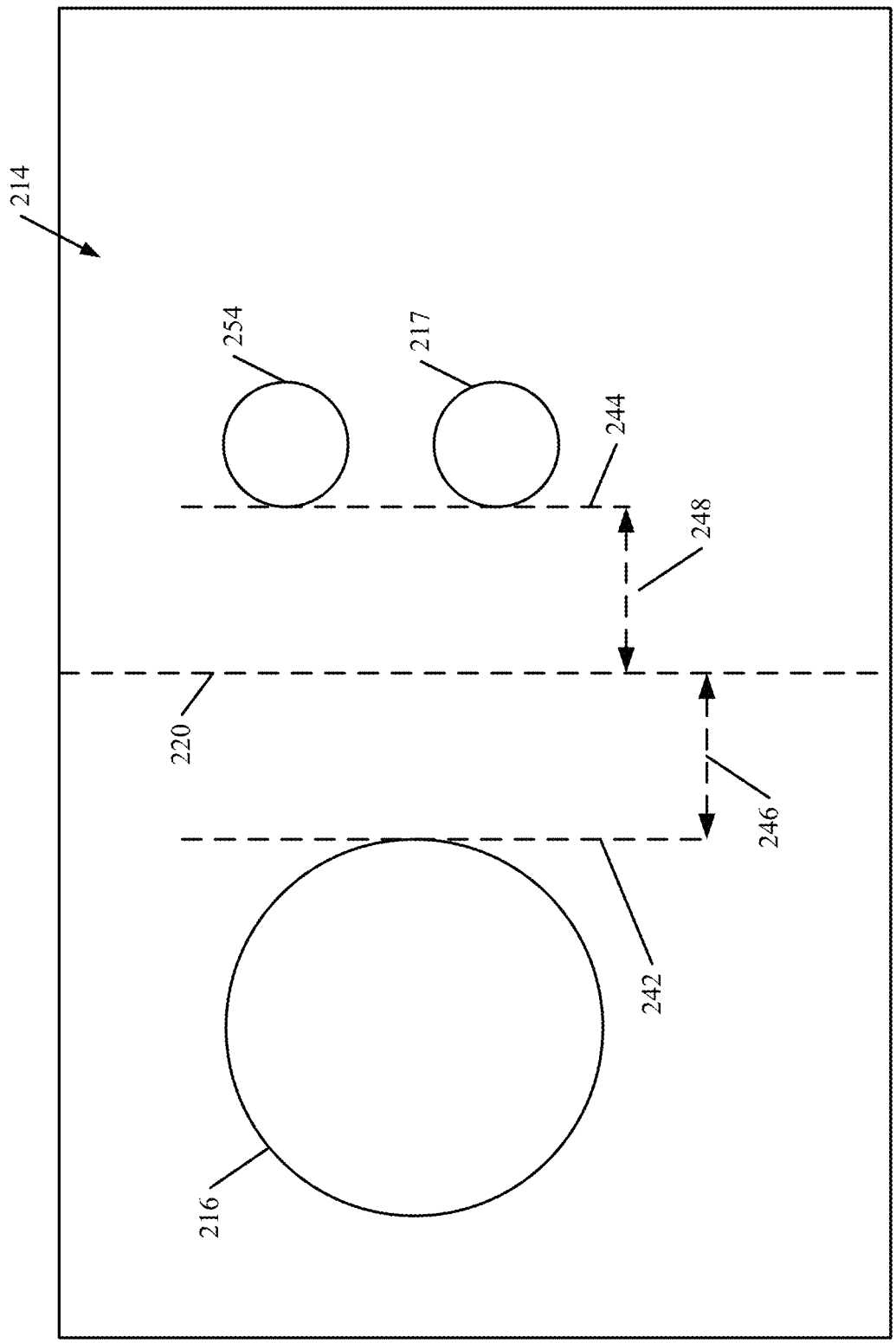
Figure 4N:
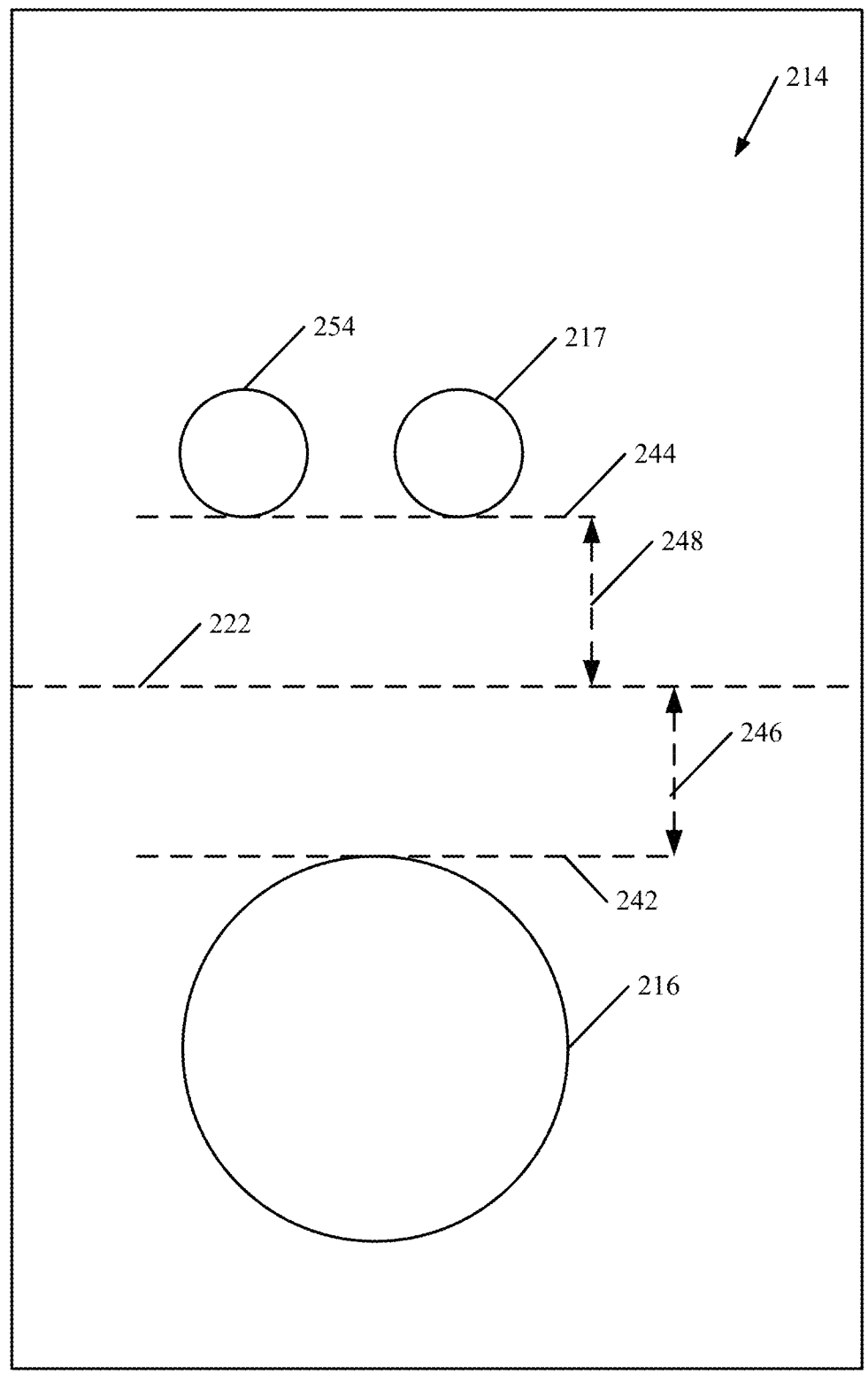
Figure 4O:
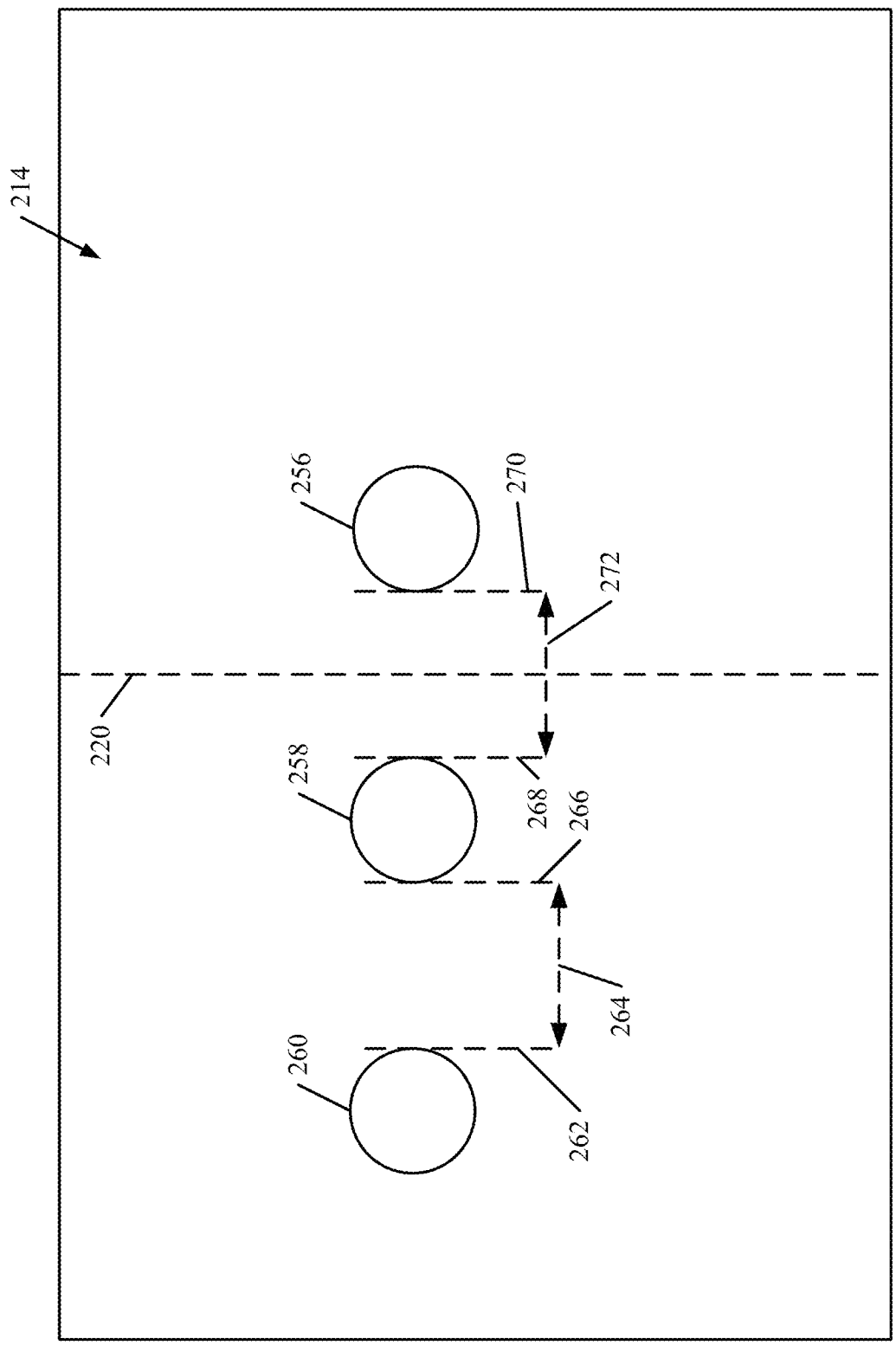

FIGS. 4A-4O show a number of different examples. In these Figures, a user interface display (e.g., slide) 214 shows that the user has created an object 216, and is interacting with that object, such as moving it, resizing it, etc. It can be seen in FIG. 4A that the user has moved object 216 so that its center is aligned with the center 218 of the user interface display (e.g., the slide). In that case, system 120 generates guides 220 and 222. In one embodiment, guides 220 and 222 extend to the edges of a bounding box of the object or to the edges of the slide, whichever is longer. Of course, this is only one example.

FIG. 4B is another example where the user has moved object 216 so that its center is aligned with the vertical center of slide 214. However, the object is not aligned with the horizontal center of slide 214. In that case, system 120 only generates the horizontal guide 222 showing that the center of object 216 is aligned with the vertical center of slide 214.

FIG. 4C shows another embodiment of slide 214. In the embodiment shown in FIG. 4C, the user has moved object 216 so that its edge is aligned with the horizontal center of slide 214. Thus, system 120 generates the vertical guide 220 to indicate this.

FIG. 4D shows an embodiment of slide 214 in which multiple objects are aligned. It can be seen that object 216 has its center aligned with the horizontal center of slide 214, and object 217 has its edge aligned with the center of slide 214. Thus, system 120 generates guide 220 to indicate this. FIG. 4E is similar to FIG. 4D except that both objects 216 and 217 have their centers aligned with the horizontal center of slide 214. Thus, guide 220 is drawn by system 120.

FIGS. 4F-4P show examples where system 120 generates guides showing that objects are equidistant from some portion of slide 214. First, however, recall that one trigger for generating such guides is that the user is interacting with an object that is equidistant from, and opposite, a nearest neighbor, relative to some portion of slide 214. One way of identifying a nearest neighbor is to assume that an object is projecting light along its profile in all four directions from the object (e.g., North, South, East and West). Any shape that would receive its light is considered to be one of its nearest neighbors. For example, FIG. 4F shows slide 214 with objects 226-240. It is assumed that the object for which nearest neighbors are to be located is object 226. The dashed lines emanating from object 226 represent the light being emitted in all four directions across the profile of object 226. It can be seen that all of the objects 228-238 have some of the light impinging upon them. That is, all of them have a surface that is exposed, in an unobstructed way, to a surface of object 226. However, object 240 is not arranged in this way relative to object 226. Therefore, all of objects 228-238 are considered to be a nearest neighbor of object 226, but object 240 is not. Of course, this is only one example of how to determine a nearest neighbor for purposes of triggering functionality of system 120.

With this understanding, FIG. 4G shows one embodiment of user interface display 214 where objects 216 and 217 are equidistant from, and are on opposite sides of, the horizontal center of slide 214, as represented by guide 220. System 120 also thus displays two additional guidelines 242 and 244 as well as distance arrows 246 and 248.

FIG. 4H is similar to FIG. 4G, and similar items are similarly numbered. However, FIG. 4H shows that system 120 generates the guides even though objects 216 and 217 are within another object 250.

FIGS. 4I-4K are examples of instances in which system 120 does not generate the equidistance guides. It will be noted that, in each of these figures, the vertical guide 220 is shown for the sake of explanation only, although it is not displayed by system 120. In FIG. 4I, the equidistant guides are not displayed because the shapes are not nearest neighbors. That is, the light emanating from object 216 in all four directions (e.g., North, South, East and West) would not impinge upon object 217. In FIG. 4J, the shapes again are not nearest neighbors, because object 217 no longer has an exterior surface exposed to an exterior surface of object 216 (due to object 252). In FIG. 4K, the equidistant guides are not generated because objects 216 and 217 are not equidistant from the center line.

FIG. 4L shows an example where objects 216 and 217 are nearest neighbors, and they are equally spaced from, and on opposite side of, the vertical center of slide 214, as represented by guide 222. It can be seen that the equidistant indicators are similar to those shown in FIG. 4G, except that they are displayed relative to line 222 instead of line 220.

FIGS. 4M-4O show examples of equidistant spacing for multiple alignments. It can seem, for instance in FIG. 4M, that objects 216, 217 and 254 all fulfill the equal spacing and nearest neighbor triggers. Therefore, system 120 draws the equidistant guides, but extends guide 244 so that it touches the edge of both objects 217 and 254.

FIG. 4N is similar to FIG. 4M and similar items are similarly numbered. However, FIG. 4N shows that the objects 216, 217 and 254 are equidistant from the vertical center of slide 214, as represented by guide 222. Therefore, the equidistant guides are displayed accordingly.

FIG. 4O shows an example where the guide generated by system 120 may conflict with the guides generated by another system. For instance, it may be that guide generation system 114 includes an equispacing guide that displays to user 106 when objects are equally spaced from one another, regardless of where they are on slide 214. However, there may also be a scenario where two objects are equally spaced from the center line as well. In the embodiment shown in FIG. 4O, for instance, assume that the user is interacting with object 256. It can be seen that objects 256 and 258 are nearest neighbors and are equidistant from, and opposite one another relative to, the horizontal center of slide 214, represented by guide 220. However, objects 256, 258 and 260 are also equidistant from one another. In that case, system 120 may display only a subset of the equidistant guides discussed above. For instance, guide generation system 114 may generate a set of equispacing guides 262, 264, 266, 268, 270 and 272 that indicate to user 106 that objects 256, 258 and 260 are equally spaced from one another. It may also, however, generate guide 220 to indicate that objects 256 and 258 are also equidistant from the horizontal center of slide 214. Of course, this is only one example, and other ways of resolving conflicts between conflicting guides or multiple guides can be used as well.

The conflict resolution can be performed using a predetermined priority, using conflict resolution rules, heuristically, or in other ways.

Figure 5:
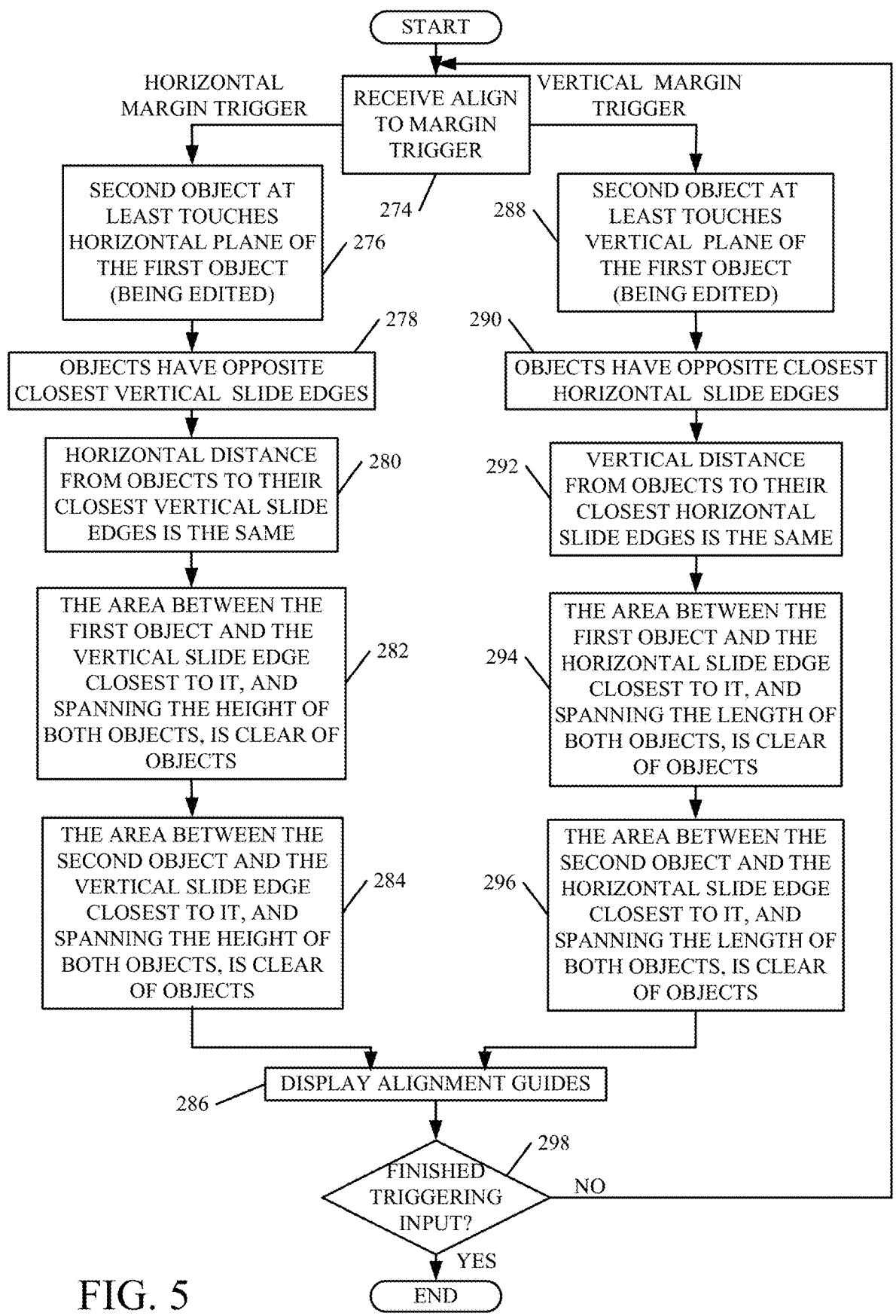
FIG. 5 is a flow diagram illustrating one embodiment of the system shown in FIG. 1 in aligning one or more objects to margins of a display (such as a slide).

FIG. 5 is a flow diagram illustrating one embodiment of the operation of align-to-display system 120 where the system shows guides for aligning objects to the margins of slide 214, instead of to its center. In the embodiment shown in FIG. 5, trigger detection system 126 first receives a user input trigger triggering system 120 to display guides that show user 106 that the objects are aligned relative to the margins of the slide. This is indicated by block 274 in FIG. 5.

As one example, assume that the user is interacting with a first object. Trigger detection system 126 then detects that a second object at least touches the horizontal plane of the first object, and that the two objects have opposite closest vertical slide edges and that the horizontal distance from the objects to their closest vertical slide edges is the same. This is indicated by blocks 276, 278, and 280. In the embodiment shown in FIG. 5, it is also assumed that trigger detection system 126 detects that the area between the first object and the vertical slide edge closest to it, and spanning the height of both objects, is clear of other objects. This is indicated by block 282. It is further assumed that trigger detection system 126 detects that the area between the second object and the vertical slide edge closest to it, and spanning the height of both objects, is clear of objects. This is indicated by block 284. If each of these is true, then system 120 displays the alignment guides for aligning objects to the margin of the slide. This is indicated by block 286. A number of examples of aligning to the horizontal margins of slide 214 are discussed in greater detail below.

At block 274 in FIG. 5, it may also be that trigger detection system 126 has detected that the user input is triggering the display of vertical margin alignment guides. For instance, trigger detection system 126 may detect that the second object at least touches a vertical plane of the first object. This is indicated by block 288. It may also detect that the objects have opposite closest horizontal slide edges and that the distance from the objects to their closest horizontal slide edges is the same. This is indicated by blocks 290 and 292. Further, system 126 may detect that the area between the first object and the horizontal slide edge closest to it, and spanning the height of both objects, is clear of other objects. This is indicated by block 294. Detection system 126 may also detect that the area between the second object and the horizontal slide edge closest to it, and spanning the height of both objects, is also clear of other objects. This is indicated by block 296.

If all of those are true, then system 120 displays the alignment guides for aligning the objects relative to the horizontal slide edges. This processing continues until the user is no longer providing the triggering input. This is indicated by block 298. A number of examples of aligning to the horizontal slide edges are discussed below.

Figure 5A:
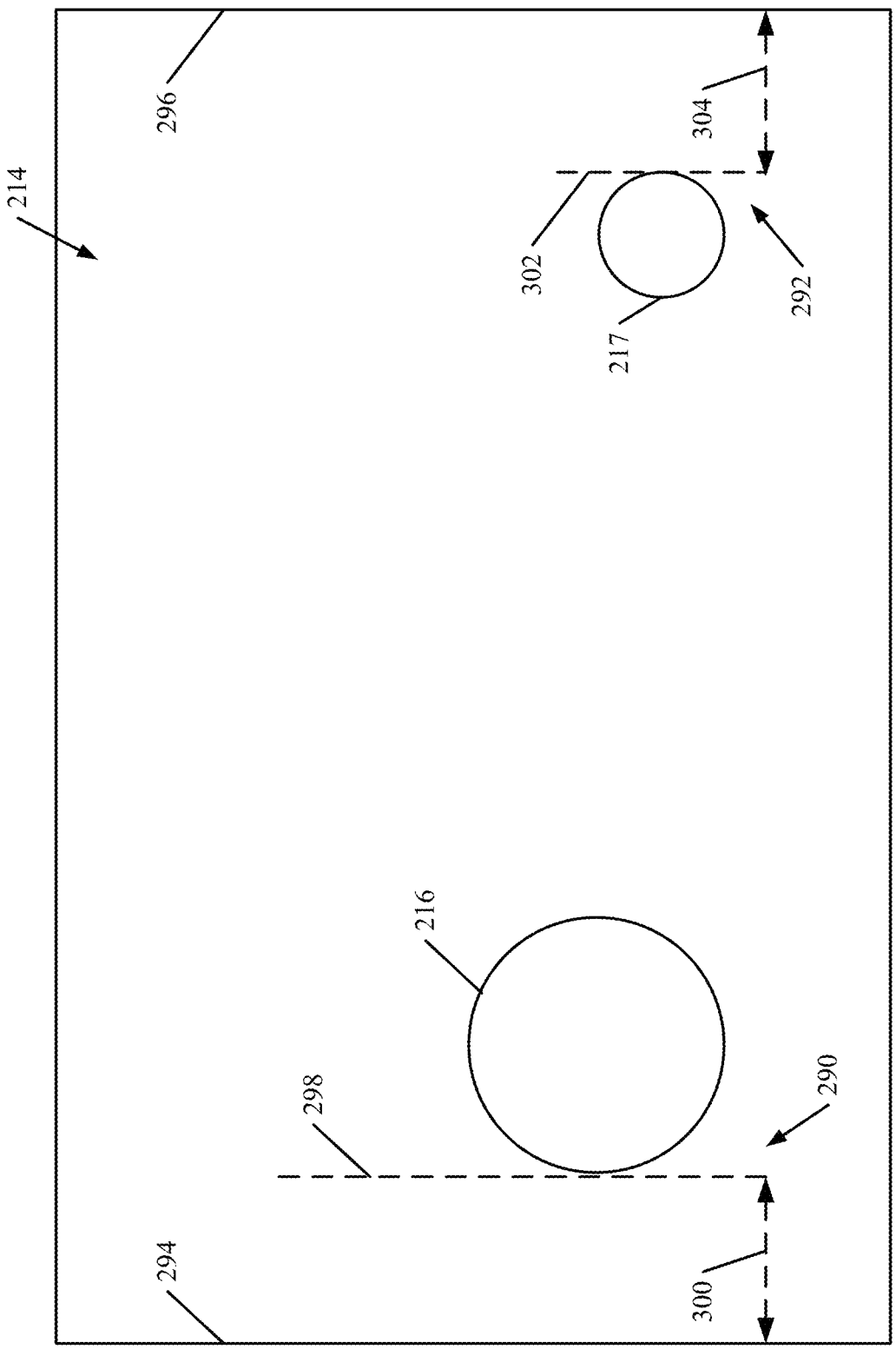
FIGS. 5A-5P show examples of aligning one or more objects to margins of a display.

FIG. 5A shows an example where vertical margin alignment guides 290 and 292 are displayed. It can be seen that vertical alignment guides 290 and 292 indicate that objects 216 and 217 are equally spaced from the vertical margins (or edges) 294 and 296 of slide 214. Guide 290 includes a vertical guide 298 that is perpendicular to slide edge 294, as well as arrow 300 that is perpendicular to guide 298. Guide 292 includes vertical guide 302 and arrow 304.

Figure 5B:
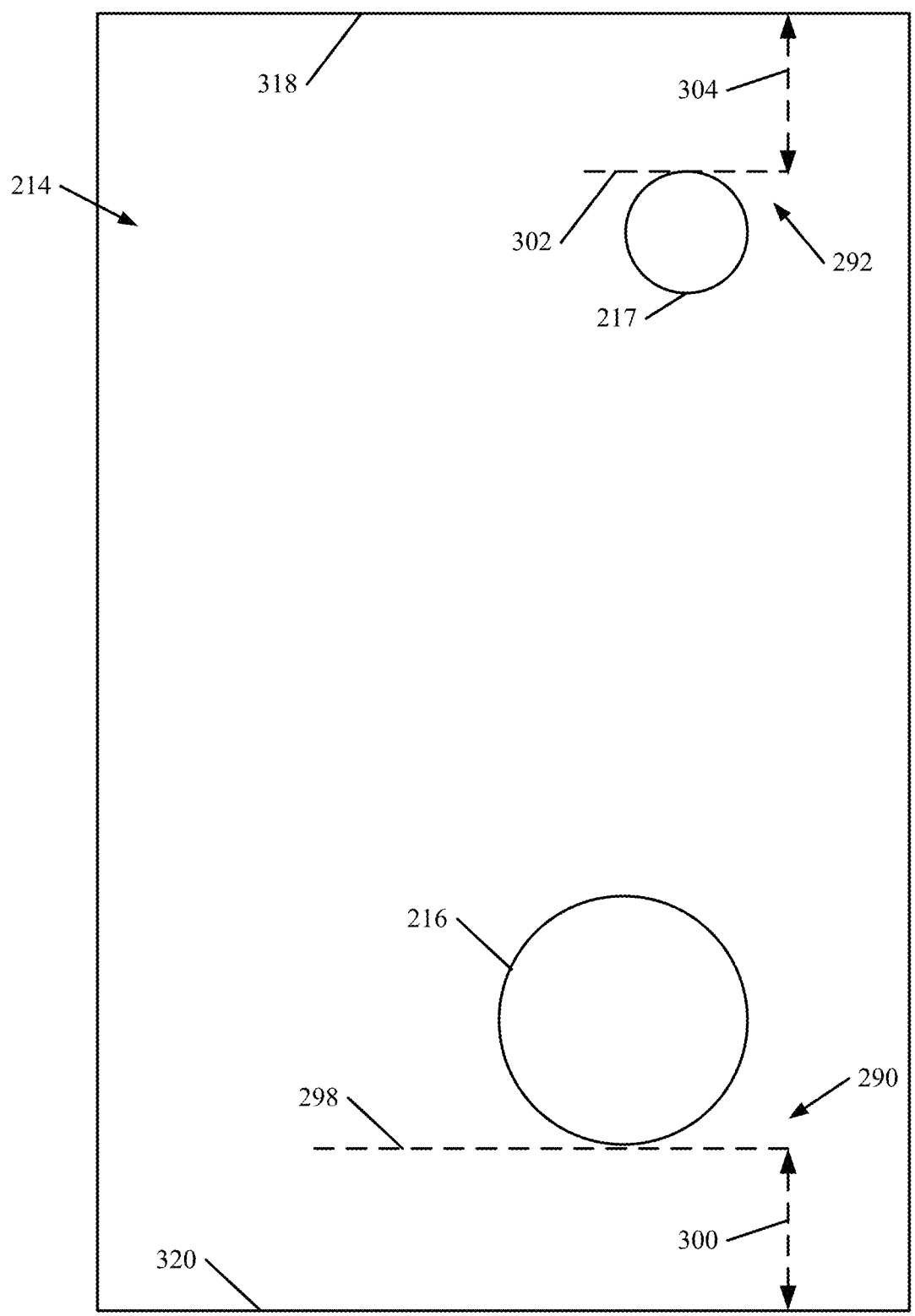
Figure 5C:
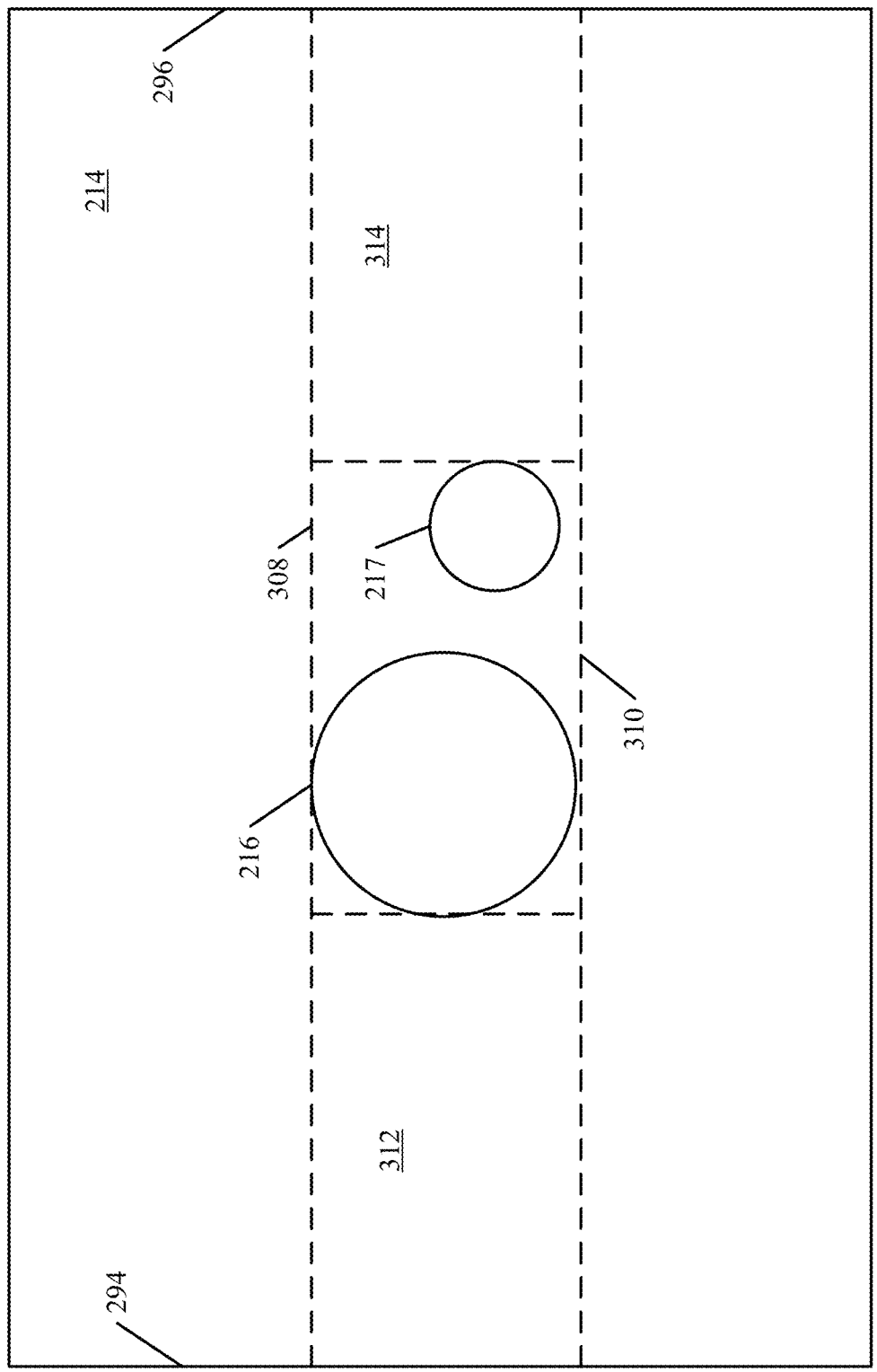
Figure 5D:
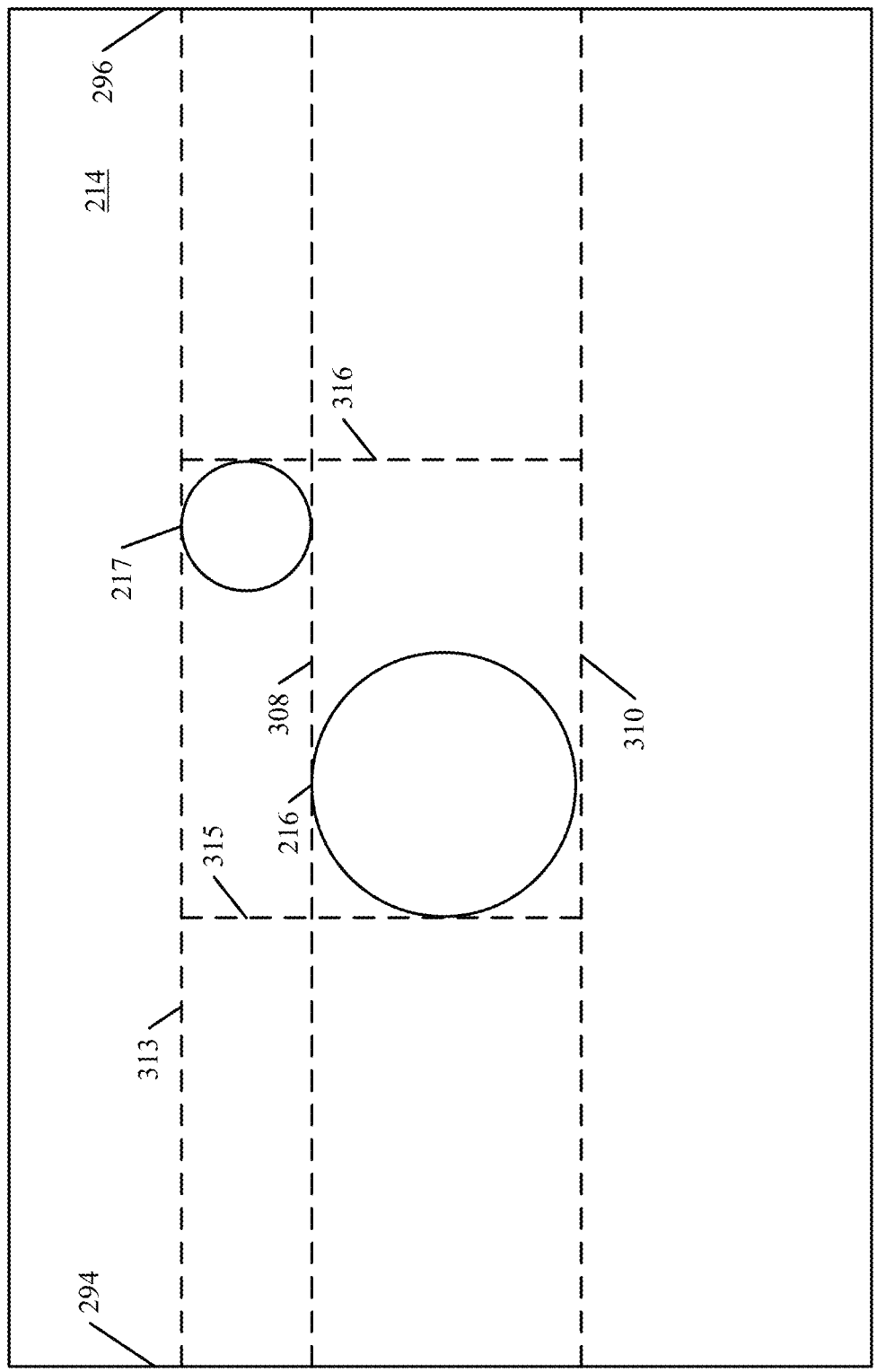
Figure 5E:
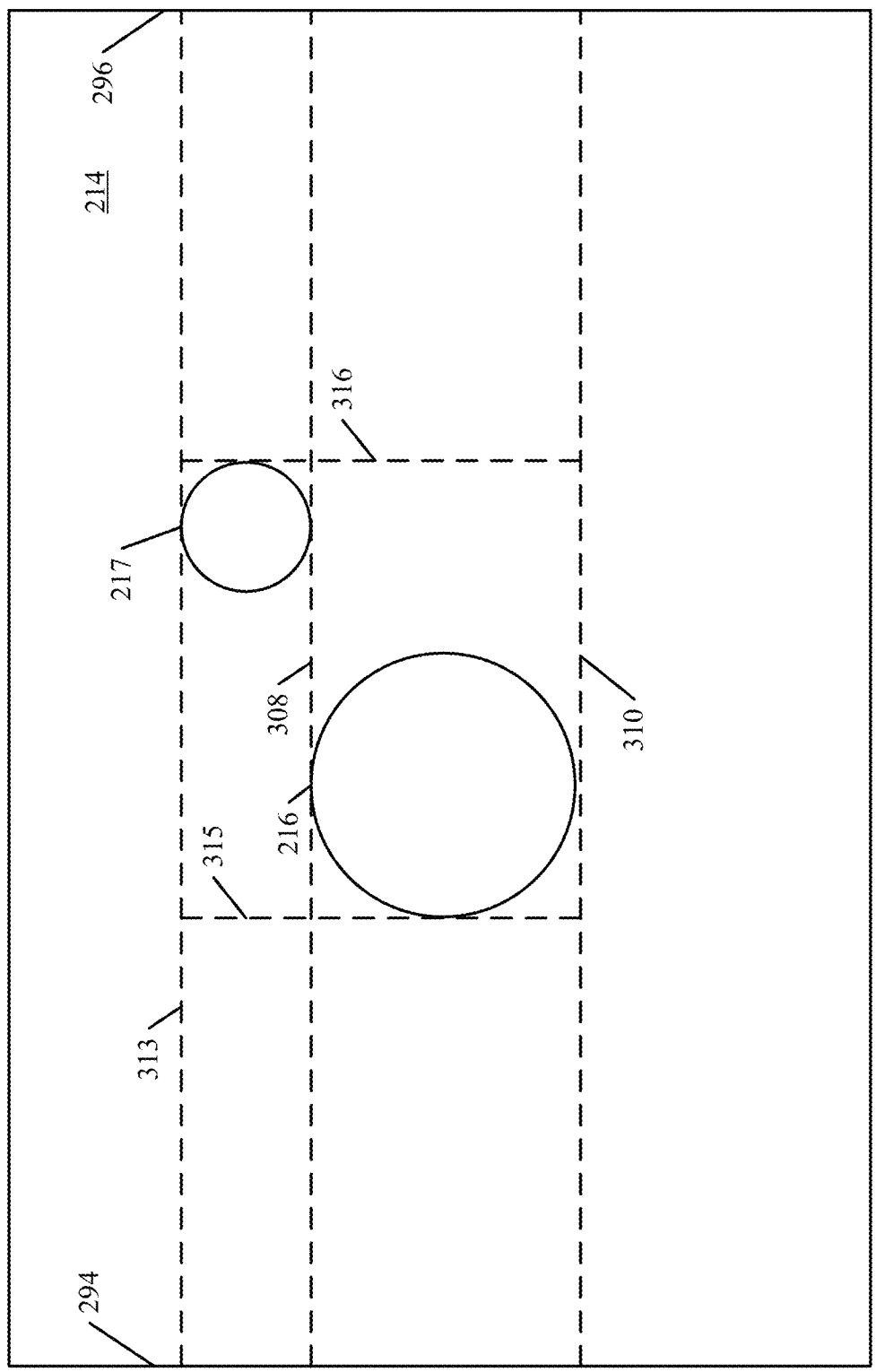

FIGS. 5C-5E show examples of how the triggers are detected for aligning to the vertical slide edges 294 and 296. It can be seen in FIG. 5C that the horizontal plane of the object being moved (object 216) is defined by dashed lines 308 and 310. The area between objects 216 and 217, and their respective closest vertical slide edges 294 and 296, that must be clear of other objects is indicated by areas 312 and 314, respectively.

FIG. 5D is similar to FIG. 5C, and similar items are similarly numbered. However, it can be seen in FIG. 5D that the horizontal plane of the object being moved is defined by dashed lines 308 and 310, but the area that must be clear of objects is now defined by dashed lines 310, 313 and 315 (for object 216), and dashed lines 310, 313 and 316 (for object 217). It spans the height of both objects.

FIG. 5E is similar to FIG. 5D, and similar items are similarly numbered. However, it can be seen now that object 216 just touches the horizontal plane of object 217. Therefore, this is still a trigger, because object 217 at least touches the horizontal plane of object 216. However, if object 217 were moved any higher in the vertical direction, then the trigger would no longer exist.

Figure 5F:
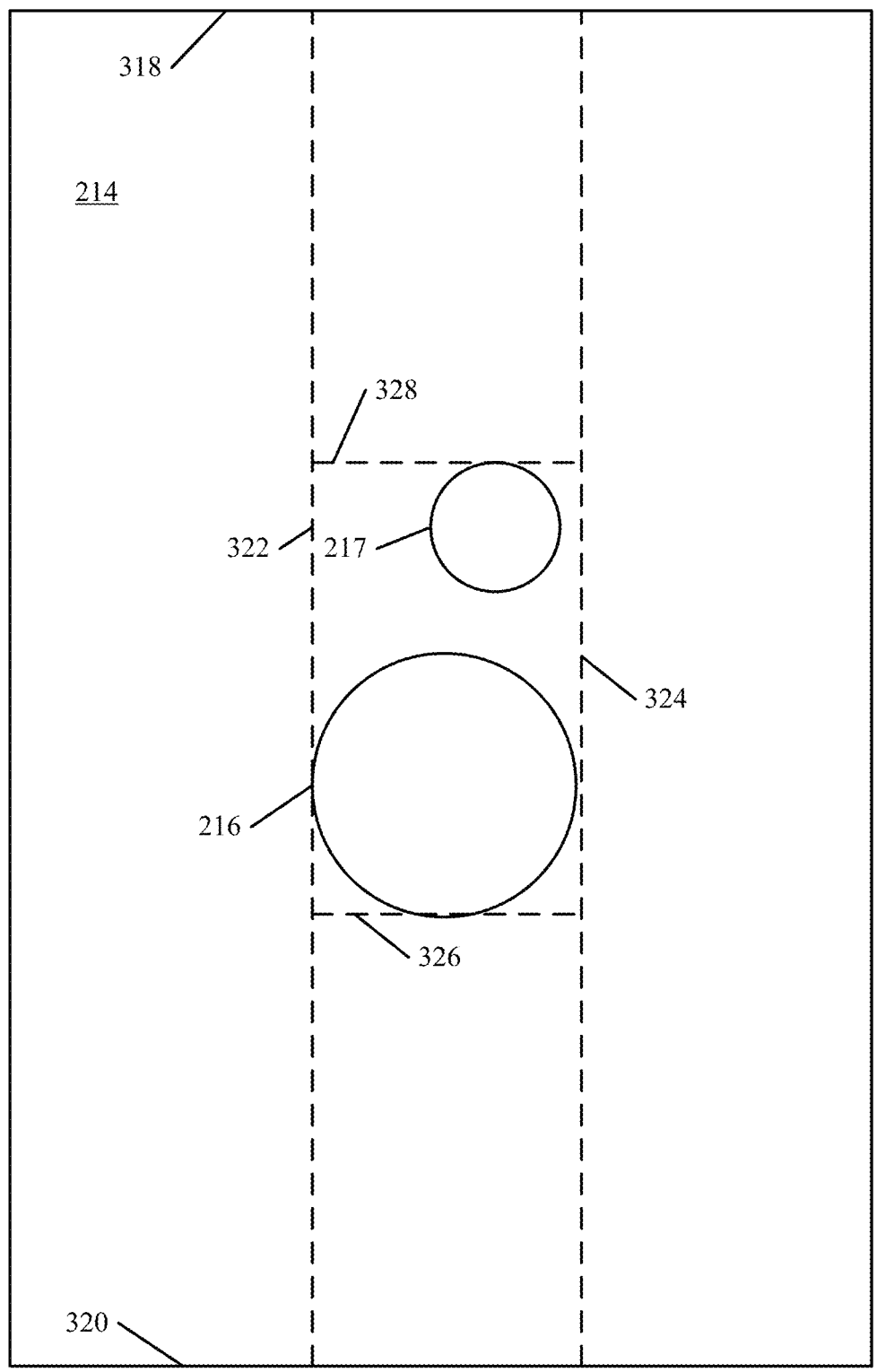
Figure 5G:
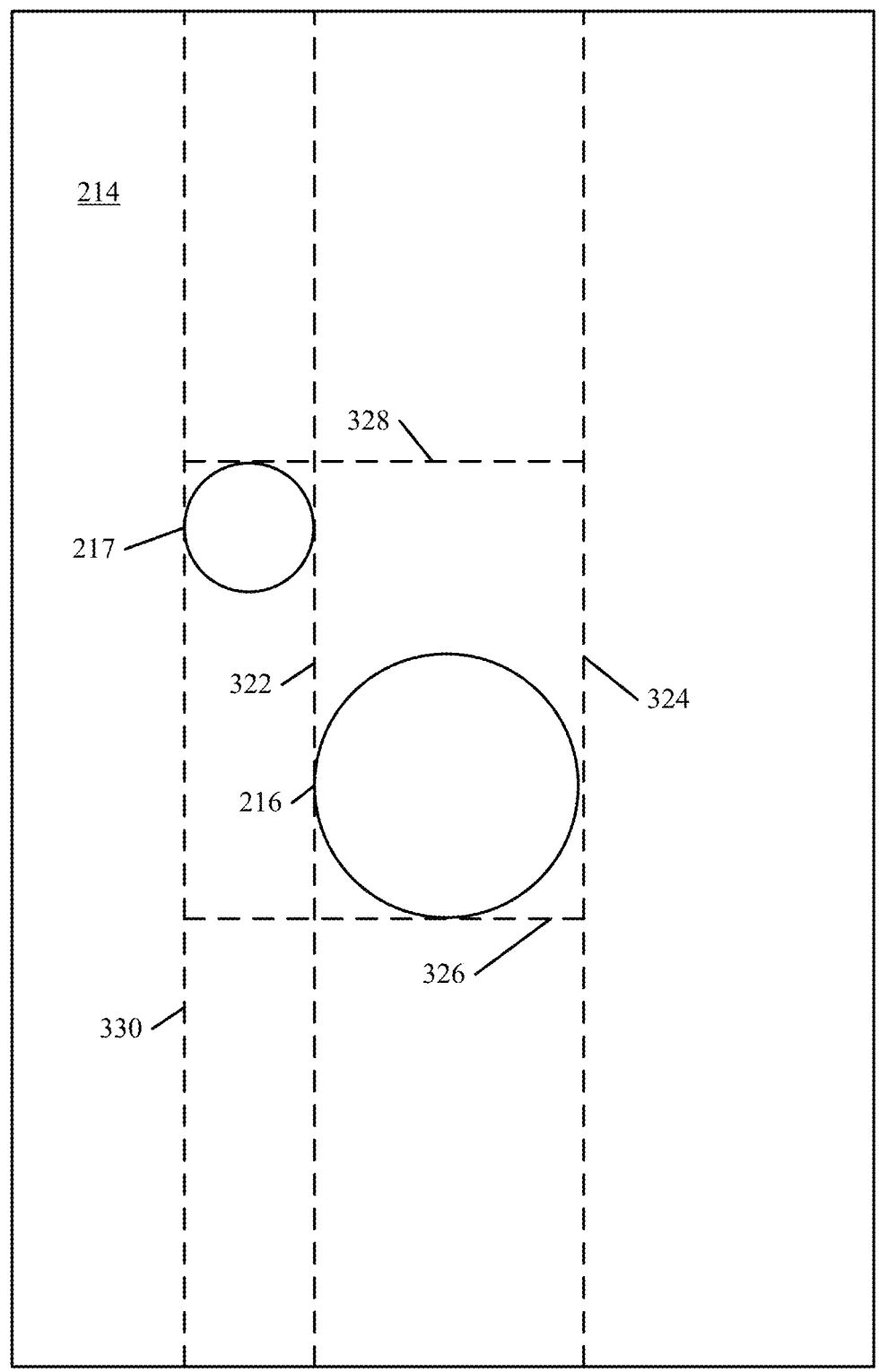

FIGS. 5B, 5F and 5G are similar to FIGS. 5C and 5E, except that they show alignment with respect to the horizontally oriented slide edges 318 and 320 of slide 214. Thus, the area between objects 216 and 217 that must be clear of other objects in FIG. 5F is defined by lines 322, 324 and 326 (for object 216), and lines 322, 324 and 328 (for object 217). In FIG. 5G, however, the area is defined by lines 324, 326 and 330 (for object 216) and 324, 328 and 330 (for object 217).

Figure 5H:
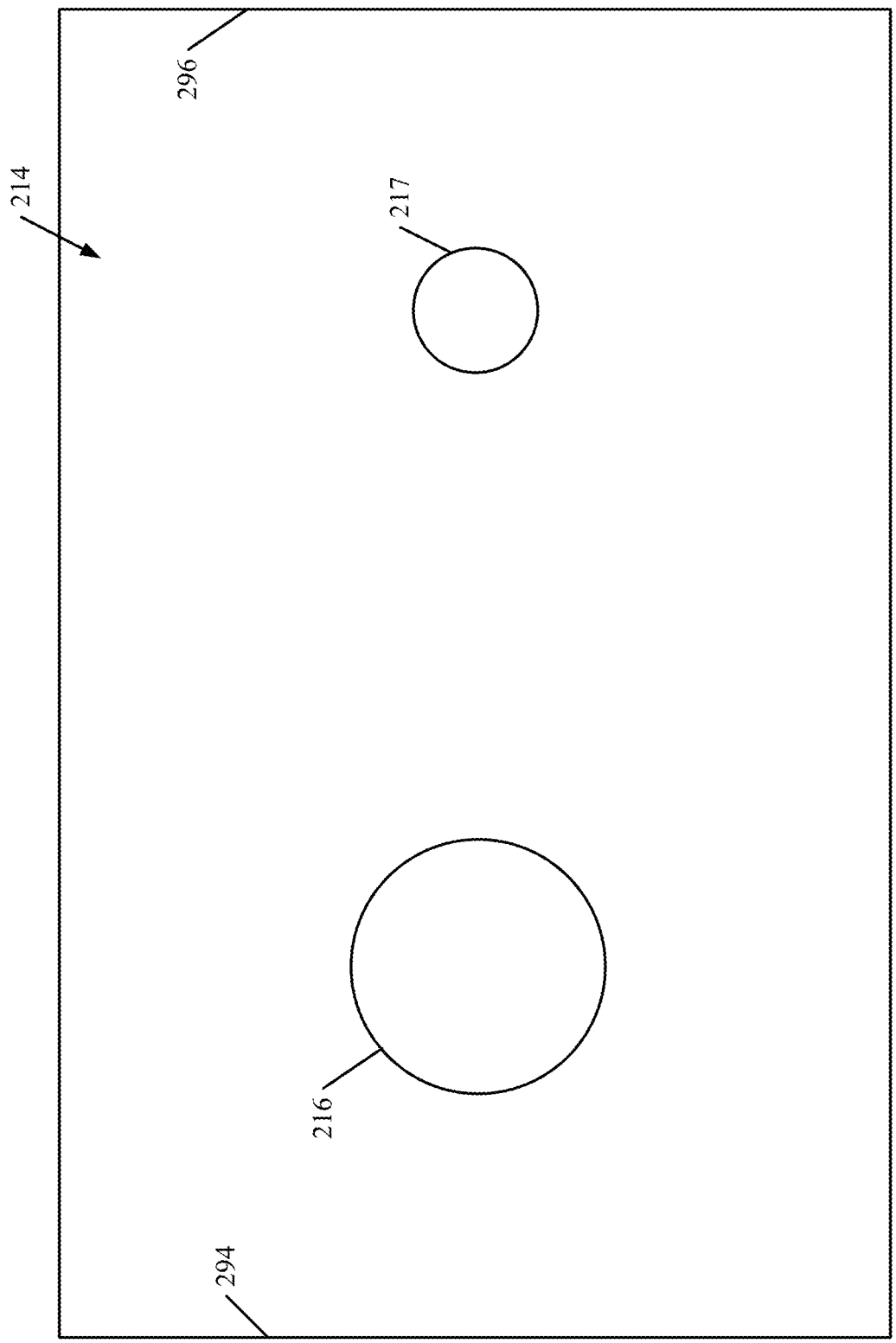
Figure 5I:
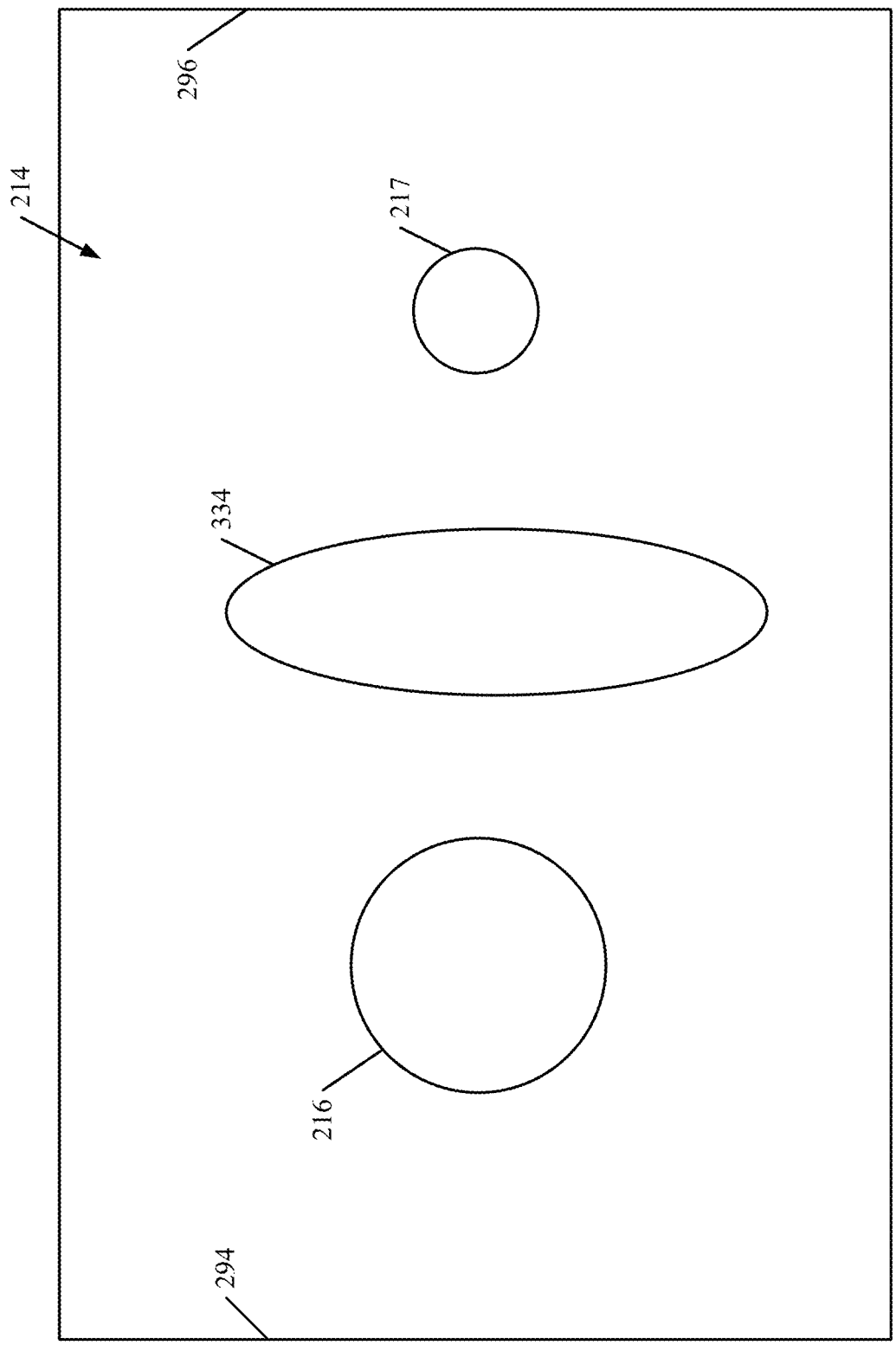

FIG. 5H shows one embodiment of the slide 214, where all of the trigger conditions are met so that system 120 will display the guides (not shown in FIG. 5H) allowing user 104 to identify that objects 216 and 217 are equidistant from their corresponding vertical slide edges 294 and 296. The same is true of slide 214 in FIG. 5I. Even though an object 334 is disposed between objects 216 and 217, all the trigger conditions are still met.

Figure 5J:
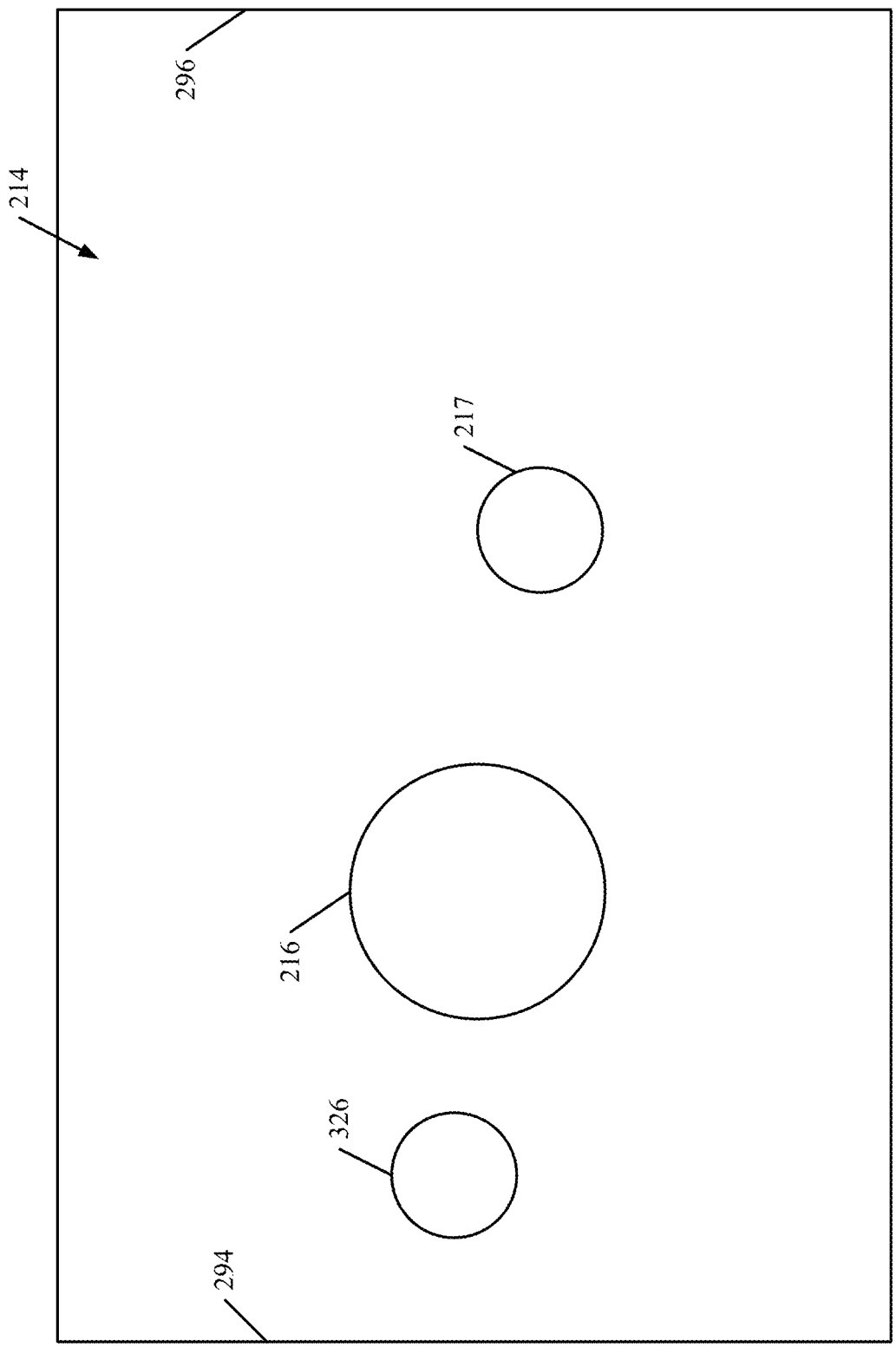
Figure 5K:
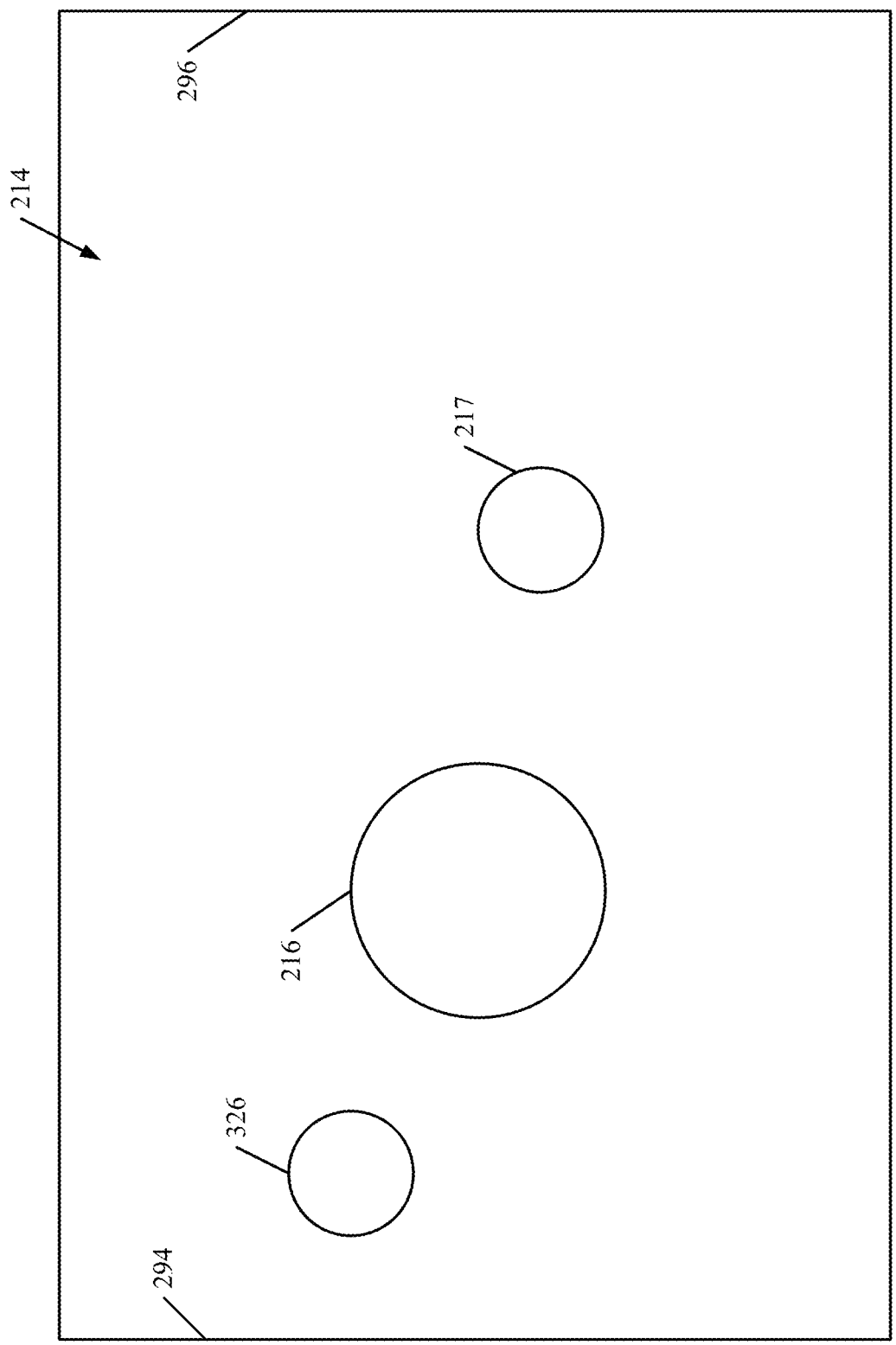

In FIG. 5J, however, the trigger conditions are not met. This is because object 326 is interposed in the area between object 216 and its vertical side edge 294. Thus, system 120 does not generate the guides. In FIG. 5K, object 326 only partially blocks the area between object 216 and its corresponding slide edge 294. However, the trigger is not generated. In FIG. 5L, object 326, again, partially blocks the area between object 217 and its corresponding vertical slide edge 296, within the horizontal plane of object 216. Thus, the trigger is not met.

Figure 5L:
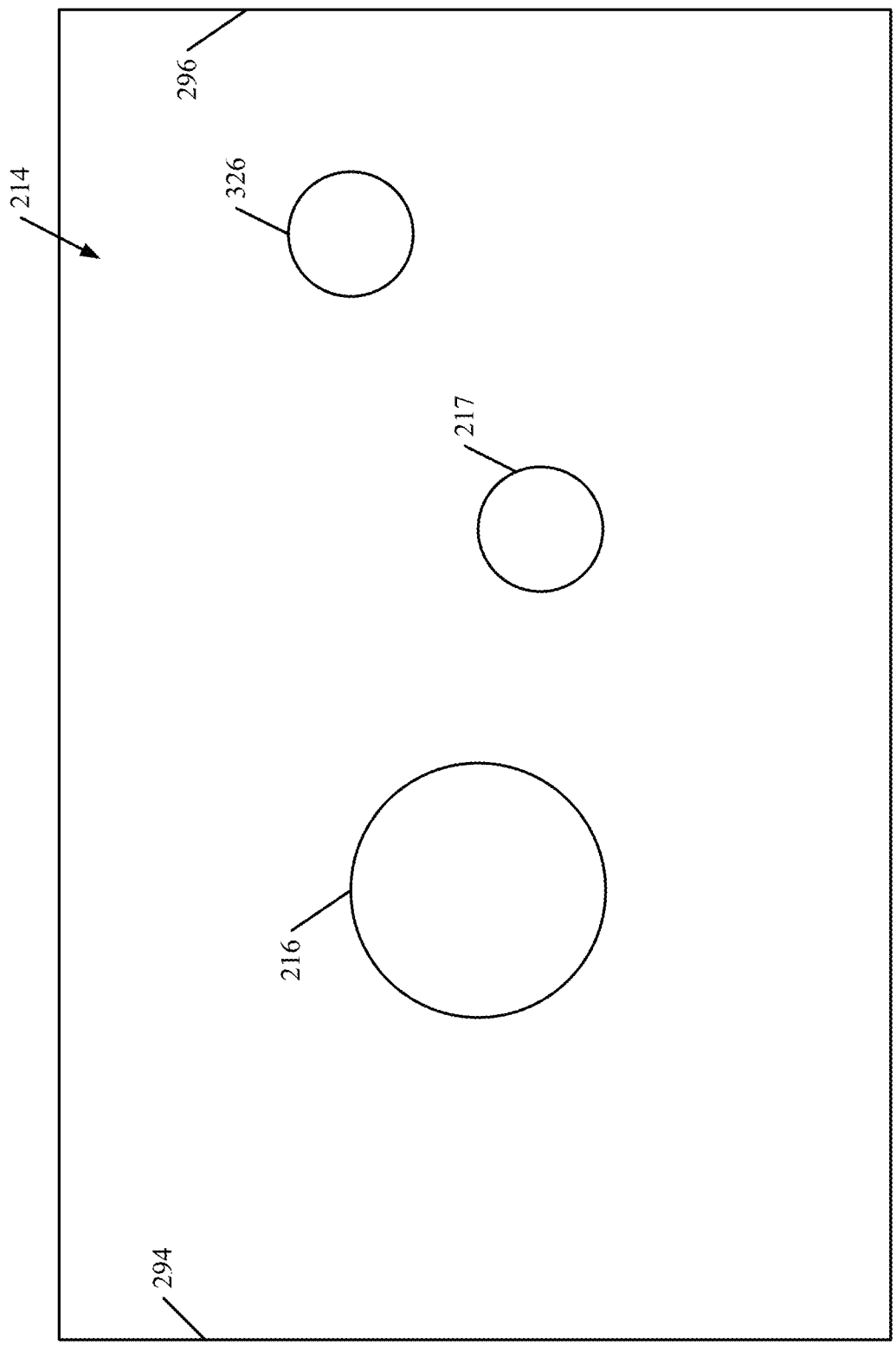
Figure 5M:
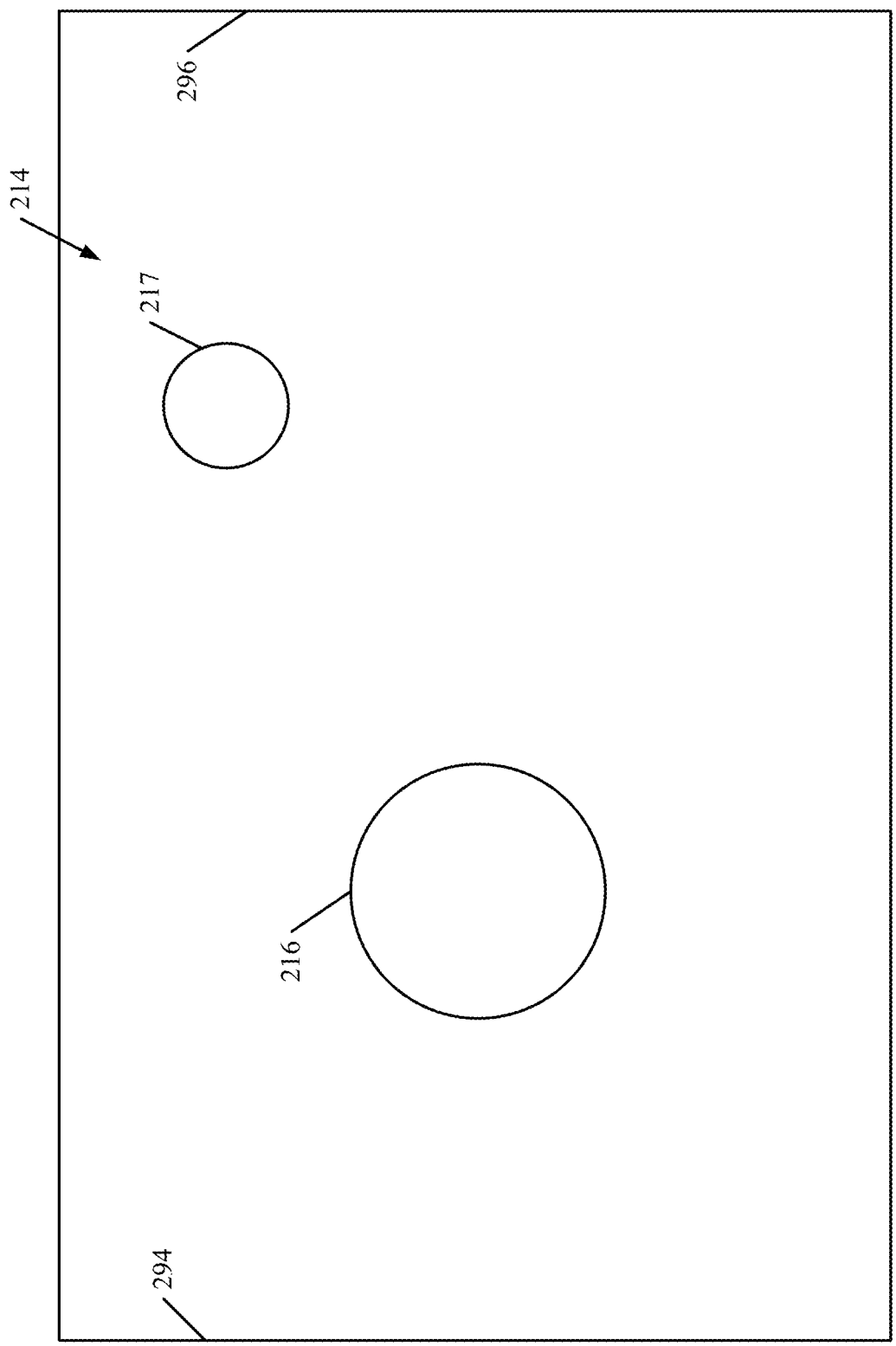

As with FIG. 5L, FIG. 5M shows a scenario where the trigger conditions are not met. This is because object 217 is not in the same horizontal plane (or at least does not touch the same horizontal plane) as the object 216 that the user is interacting with.

Figure 5N:
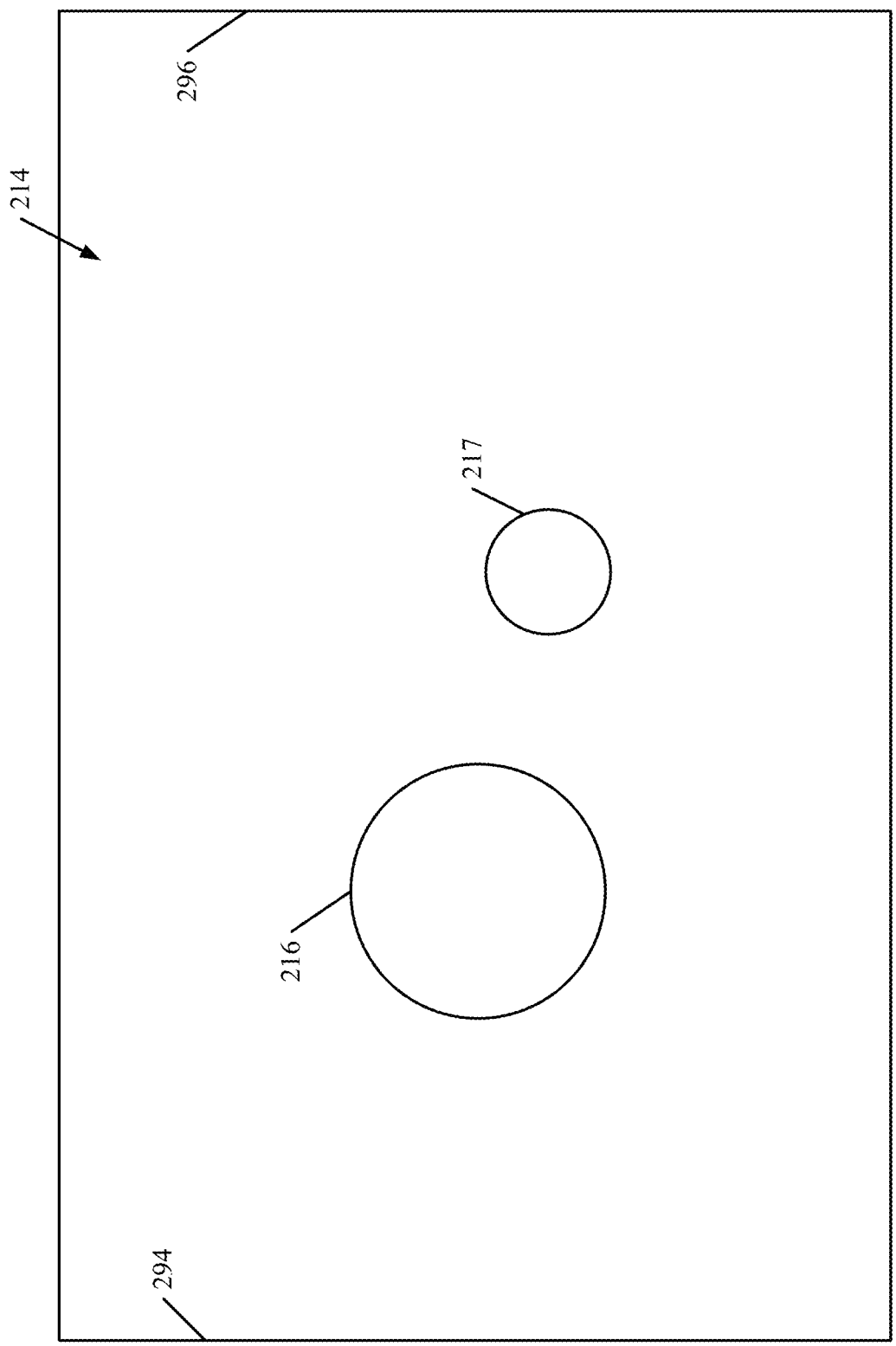
Figure 50:
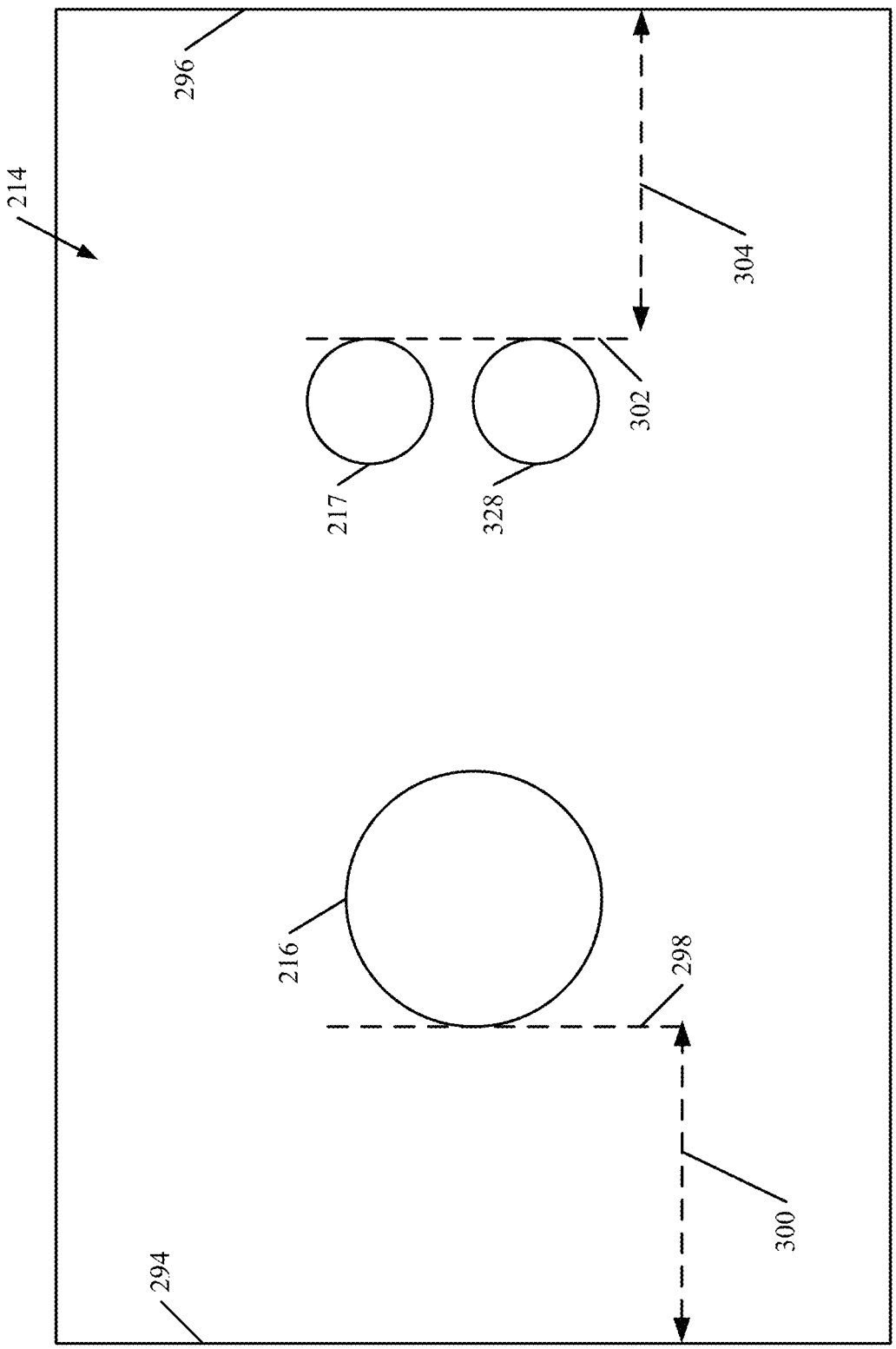

Similarly, in FIG. 5N, the trigger conditions are not met. This is because the distances between objects 216 and 217, and their corresponding slide edges 294 and 296, are not equal.

Figure 5P:
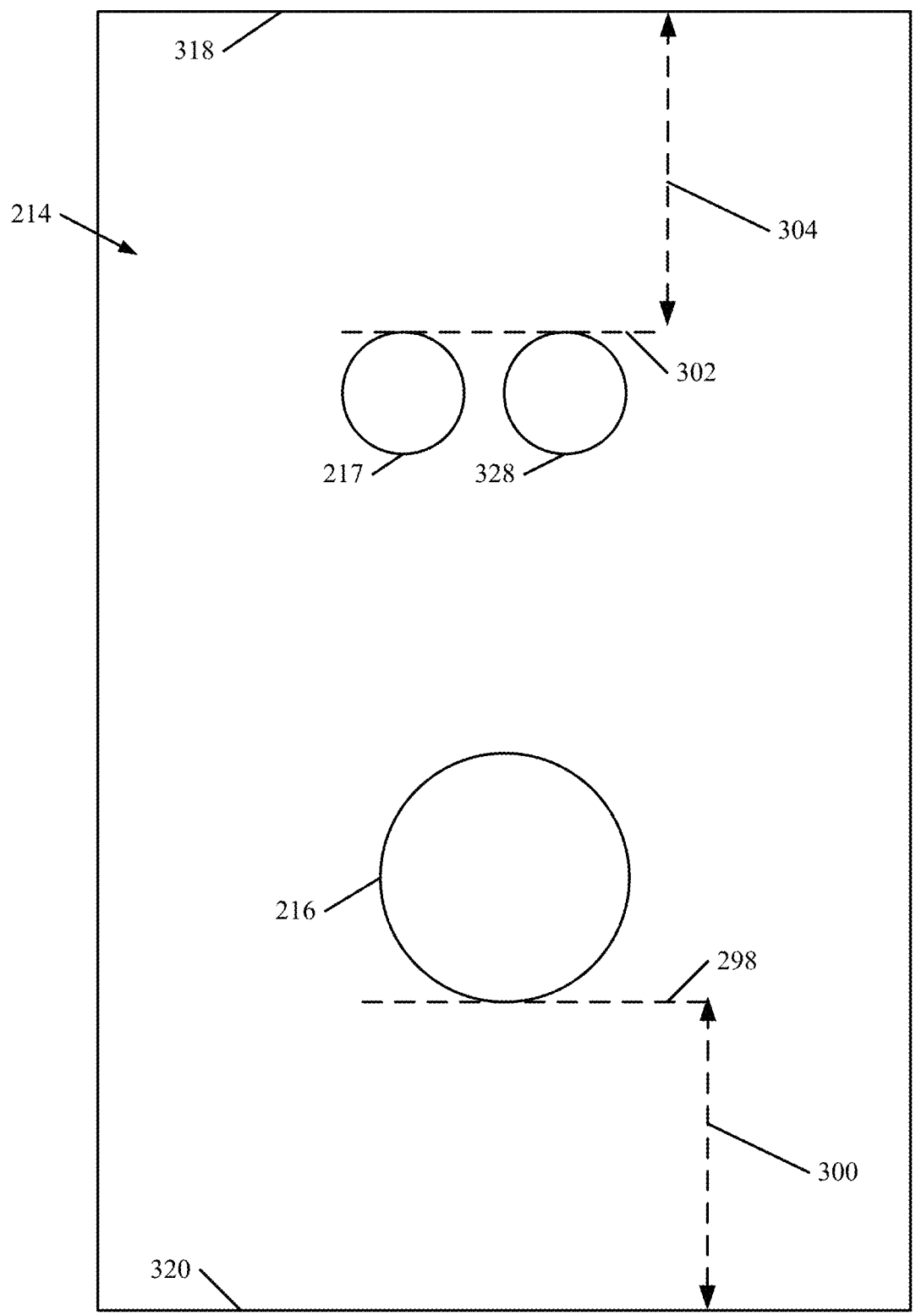

FIG. 5O shows that more than two objects (objects 216, 217 and 328) are aligned with the vertical slide edges 294 and 296. Therefore, line 302 indicates this. It is drawn from a position below the lowest object 328 to a position above the highest object 217. FIG. 5P is similar to FIG. 5O, except that it displays alignment guides with respect to the horizontal slide edges 318 and 320.

Figure 6:
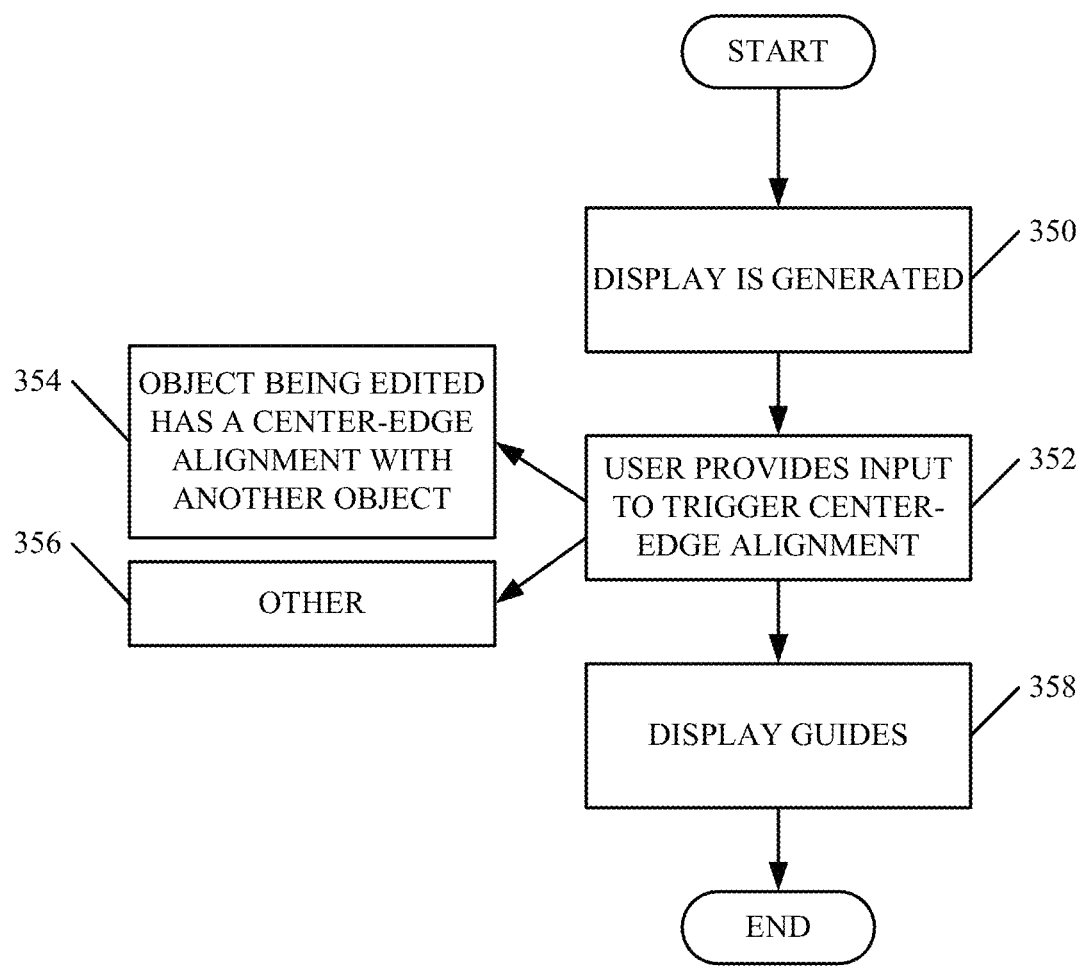
FIG. 6 is a flow diagram illustrating one embodiment of the system shown in FIG. 1 in aligning a center of one object to an edge of another object.

FIG. 6 is a flow diagram illustrating one embodiment of the operation of center-edge guide system 122 in displaying guides indicating to user 106 that the center of one object is aligned with the edge of another object on display 214. It is first assumed that user 106 has provided content to generate a display. This is indicated by block 350 in FIG. 6.

Trigger detection system 126 then detects that the user has provided an input to trigger the center-edge alignment system 122 to generate alignment guides. This is indicated by block 352.

In one embodiment, for instance, the object being edited (e.g., object 216) has a center-edge alignment with another object. That is, either its center or its edge is aligned with the center or edge of another object. This is indicated by block 354. The trigger can be other inputs as well, as indicated by block 356. When the trigger is received, system 126 displays the center-edge alignment guides. This is indicated by block 358.

Figure 6A:
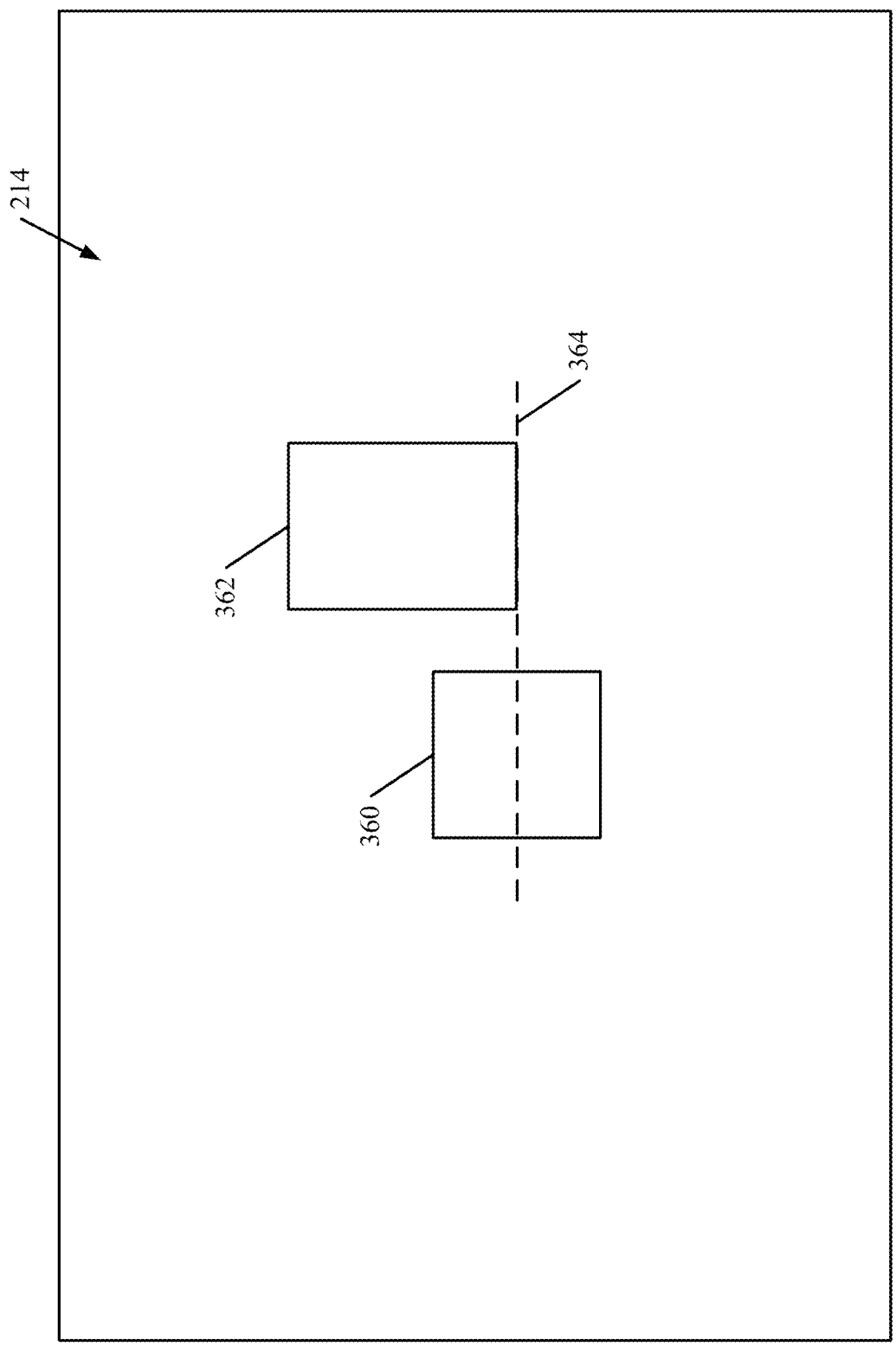
FIGS. 6A-6D show examples of performing center-edge alignment of objects.

FIG. 6A shows one embodiment of this. It can be seen that, on user interface display 214 in FIG. 6A, object 360 is being interacted with by user 106. When the center of object 360 is aligned with the edge of another object 362 on display 214, this triggers system 122 to a display alignment guide 364. In one embodiment, the guide 364 is generated regardless of the relative distance between objects 360-362, and even if they are located outside of the slide boundaries. The alignment guide 364 illustratively traverses the area between objects 360 and 362 and extends slightly beyond each object 360 and 362.

Figure 6B:
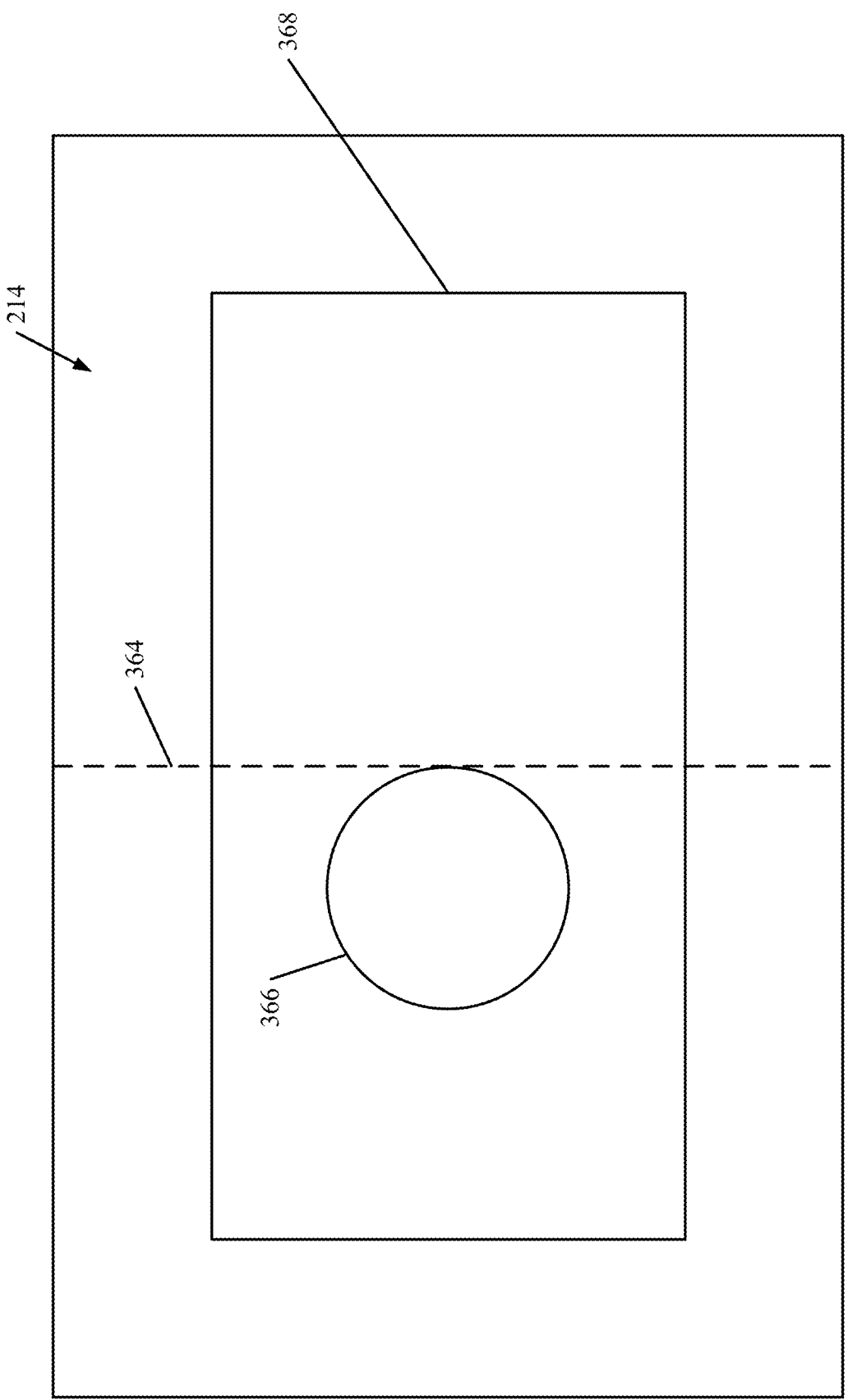

FIG. 6B illustrates that the center-edge alignment guide 364 can also be generated, even if the two objects 366 and 368 have a center-edge alignment, with one of the objects (in this case, object 366) being located within the bounds of the other object (in this case, object 368).

Figure 6C:
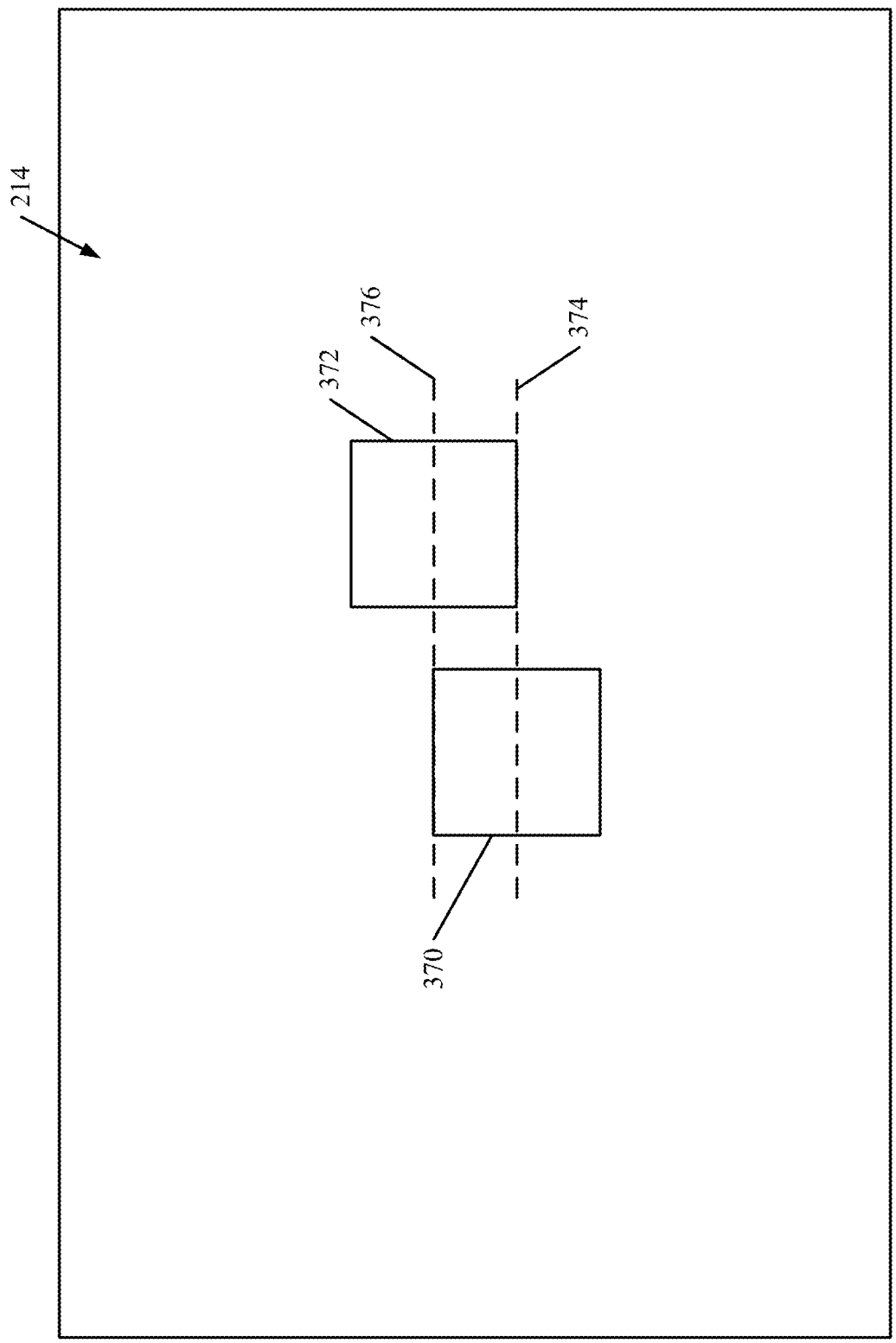

FIG. 6C shows that two objects 370 and 372 have two different center-edge alignments. In one alignment, the center of object 370 is aligned with the edge of object 372. In that case, system 122 displays alignment guide 374. However, the center of object 372 is also aligned with the edge of object 370. Therefore, system 122 also displays alignment guide 376.

Figure 6D:
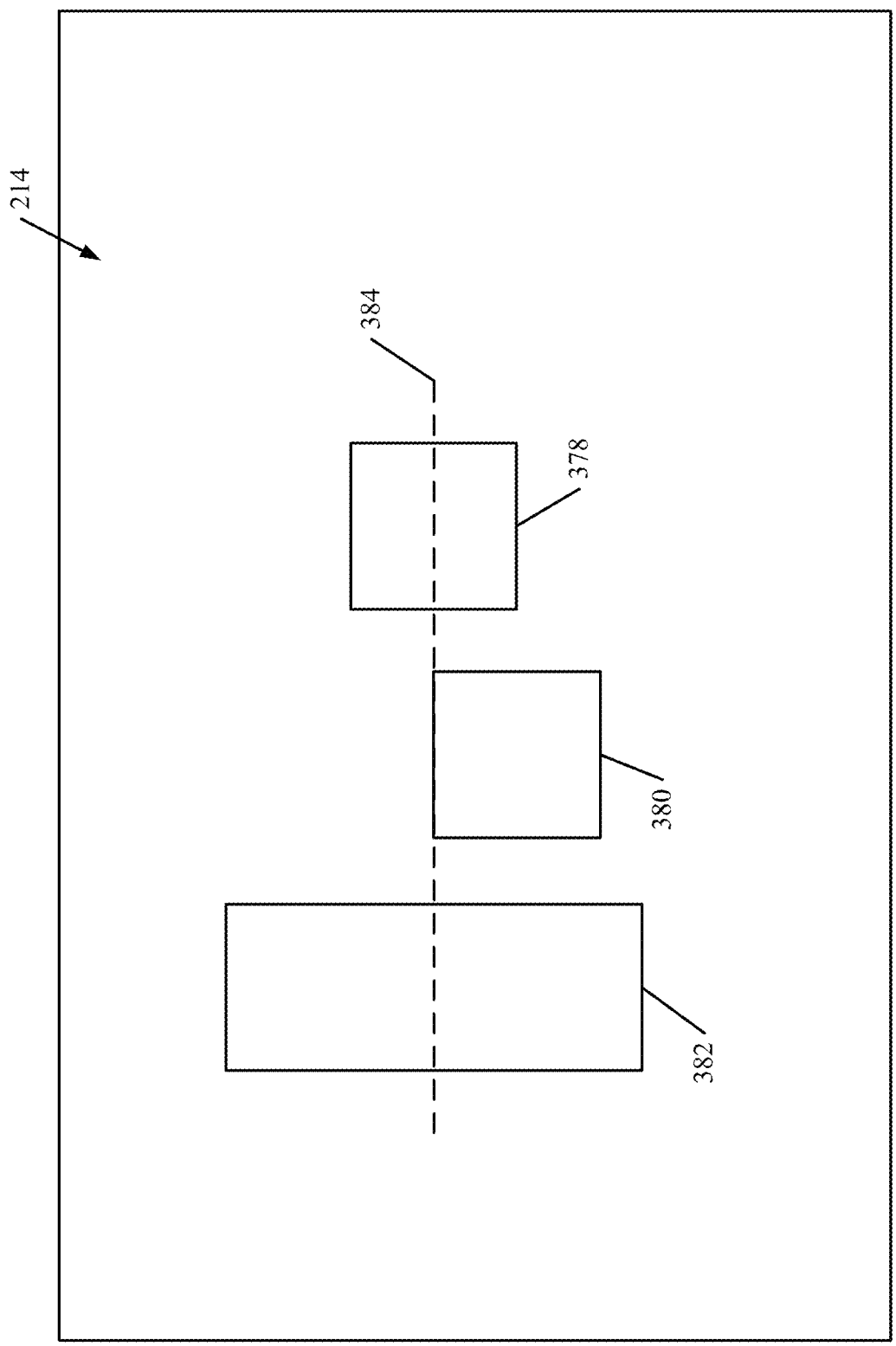

FIG. 6D shows another embodiment in which multiple different objects all meet the requirements for center-edge alignment. All of the objects 378, 380 and 382 meet the center-edge alignment trigger. Therefore, guide 384 is displayed with respect to all three objects.

Figure 7:
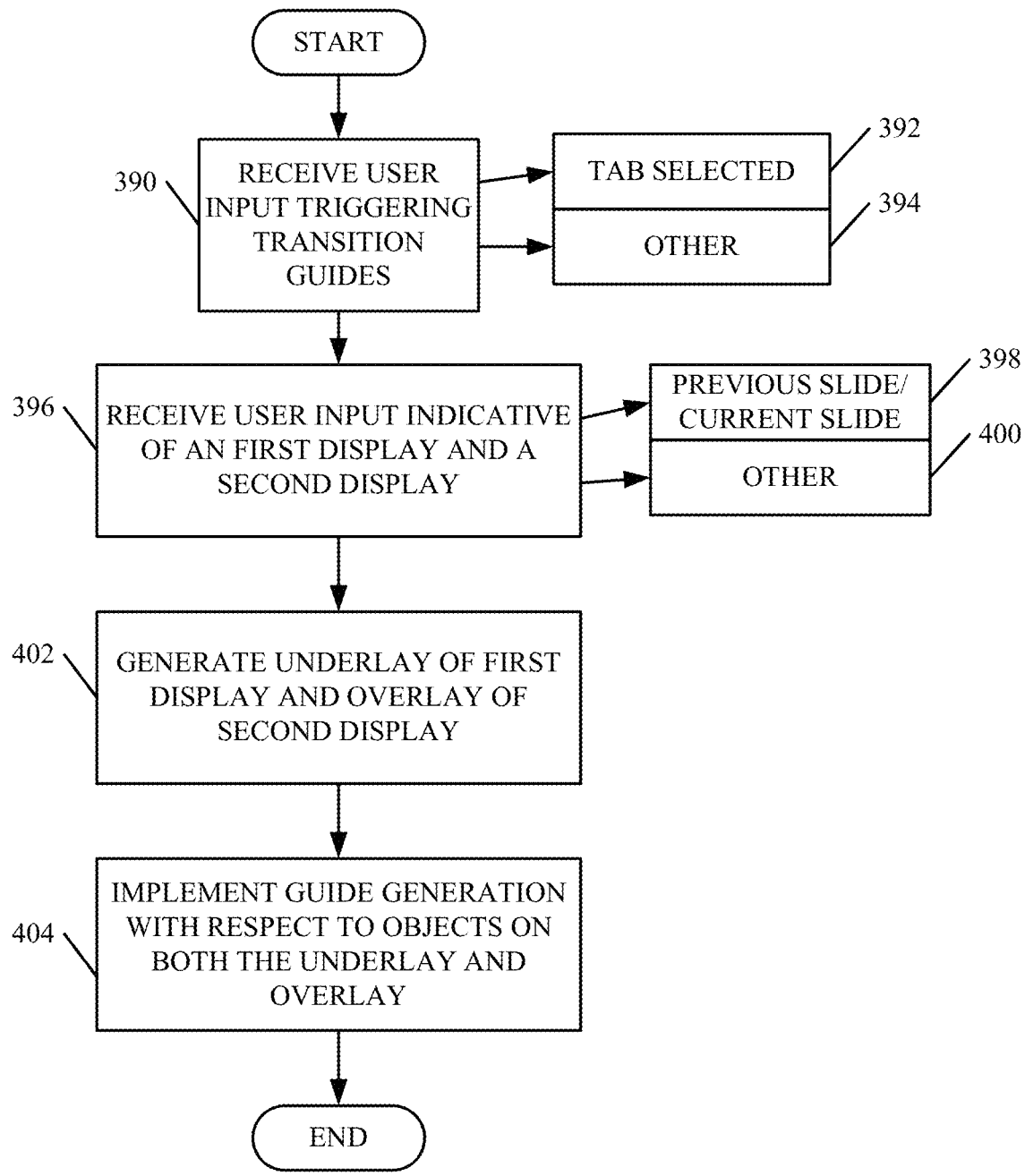
FIG. 7 is a flow diagram illustrating one embodiment of the operation of the system shown in FIG. 1 in generating transition guides.

FIG. 7 is a flow diagram illustrating one embodiment of the operation of transition guide system 124 in generating guides that assist user 106 in aligning objects between different slides. It is first assumed that the user has authored content on multiple different user interface displays (such as on multiple different slides). Trigger detection system 126 then receives a user input triggering transition guide system 124 to generate transition guides. This is indicated by block 390 in FIG. 7. In one case, user 106 can simply select a transition guides tab from the user interface display generated by visual content generation system 100. Selecting a tab or other user interface mechanism is indicated by block 392. The user input can trigger transition guide system 124 in other ways as well, and this is indicated by block 394.

System 114 then receives a user input indicative of a first display and a second display. That is, user 106 provides an indication of an original slide, and a second slide where objects on the second slide are to be aligned with objects on the original slide. This is indicated by block 396 in FIG. 7. In one embodiment, the first or original slide (to which objects on the second slide are to be aligned) is the previous slide in a slide presentation. The second slide (the one where the guides are to be displayed and objects are to be moved by user 106) is a current slide being authored. This is indicated by block 398. It may be, however, that the user identifies other first and second displays as well, and this is indicated by block 400. Once the two slides are identified by user 106, transition guide system 124 generates an underlay of the first display and an overlay of the second display. That is, the first display is displayed beneath the second display where the user is going to be moving objects. This is indicated by block 402 in FIG. 7.

This can be done in a wide variety of different ways. For instance, in one embodiment, the underlay is a semi-transparent display of the first slide that will transition to the second slide. In such an embodiment, it may be that system 100 does not allow the user to modify content on the underlay. However, all of the guides mentioned above, and at times other guides, are displayed with respect to not only the objects on the overlay display, but also with respect to all of the objects on the underlay display. Implementing guide generation with respect to objects on both the underlay and overlay is indicated by block 404 in FIG. 7.

Thus, in one embodiment, instead of seeing a normal slide canvas, user 106 sees a substantially transparent underlay of the slide that will transition to the current slide. The display may also include a thumbnail for the selected, current slide, which does not change. The underlay looks exactly like the previous slide (including objects on the slide as well as the slide background and design), but it is displayed at an 85% transparency level. The underlay appears under the objects on the current slide, but above the current slide background, so the slide background can be seen through the transparent underlay. Of course, this is only one embodiment for displaying the underlay, and the overlay. Other ways of displaying it can be used as well.

Figure 7A:
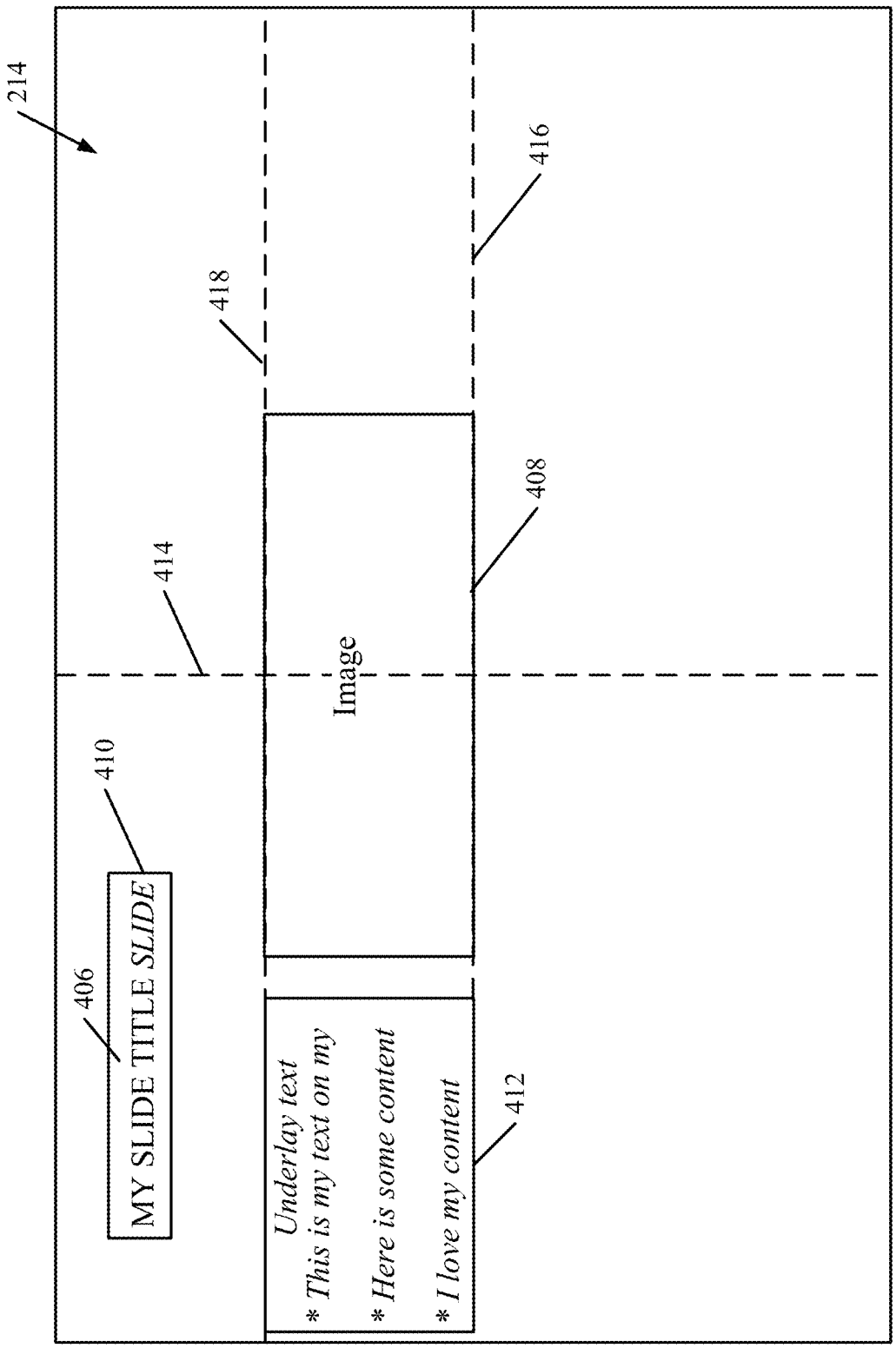
FIGS. 7A-7B show examples of transition guides.

FIG. 7A shows one example of such a display 214. It can be seen that the user's current slide 214 has a title 406 and a picture 408. The user's previous slide (seen on the underlay) has a title 410 and a place holder 412, with text. User 106 is thus able to align the top and bottom of the picture 408 with the text 412 on the previous slide and center it on the slide using alignment guides. That is, alignment guide 414 allows user 106 to center picture 408 on the current slide, and guides 416 and 418 allow user 106 to align the top and bottom of picture 408 with the top and bottom of the textual section 412 on the underlay.

Figure 7B:
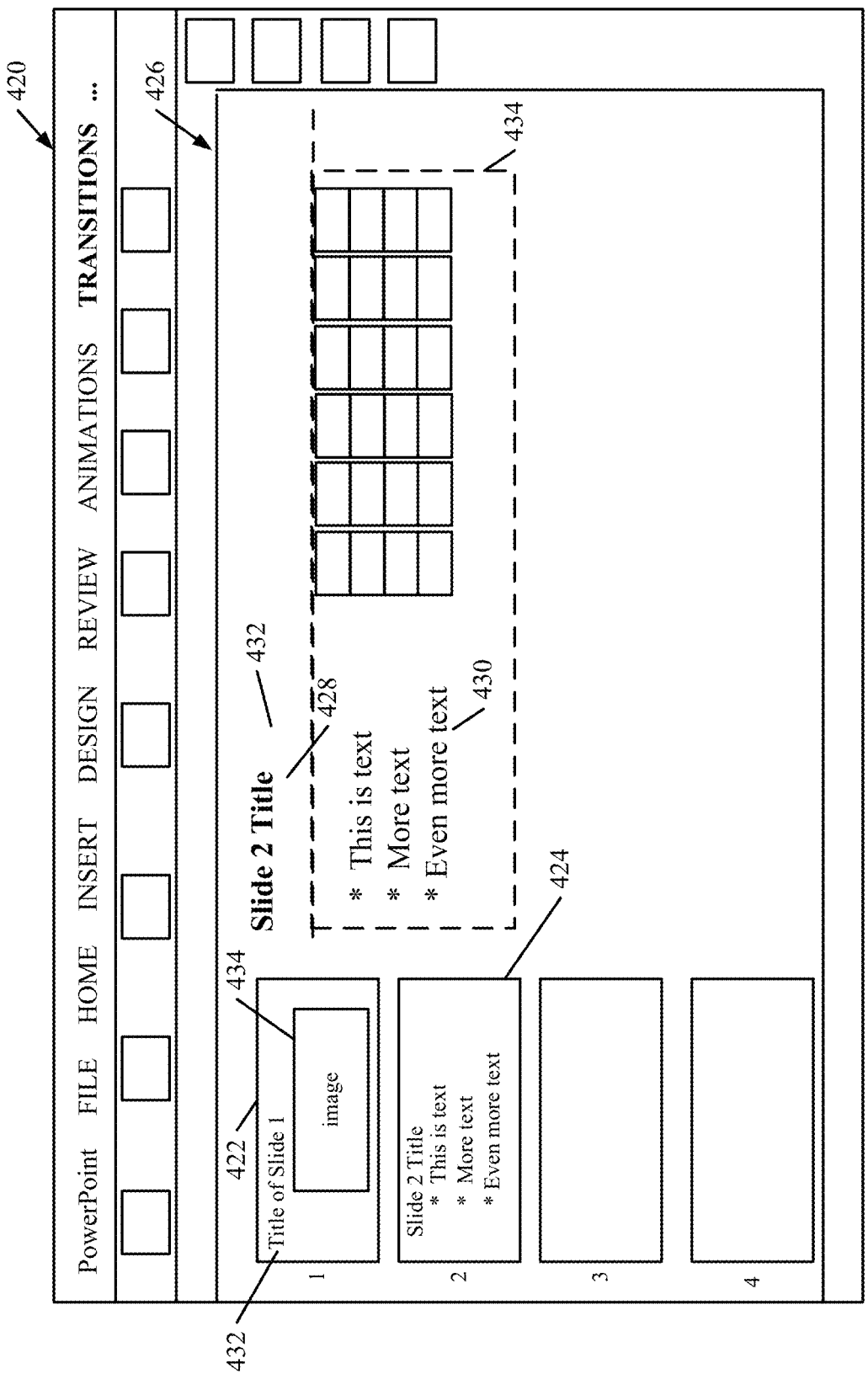

FIG. 7B shows yet another embodiment of a user interface display 420. Display 420 illustratively has a thumbnail of the underlay slide 422 and the overlay slide 424. It can be seen on canvas section 426 that the overlay has a title 428 and text 430. The underlay also has a title section 432 and picture 434. Thus, user 106 can align the title sections with one another and can generally align the top edge of textual section 430 with the picture 434 on the underlay.

It will also be noted that the present guide generation can be applied to many different types of objects. For instance, they can be applied to tables, charts, art, shapes, text boxes, group shapes, multiple selected objects, place holders, pictures, clip arts, etc.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 8:
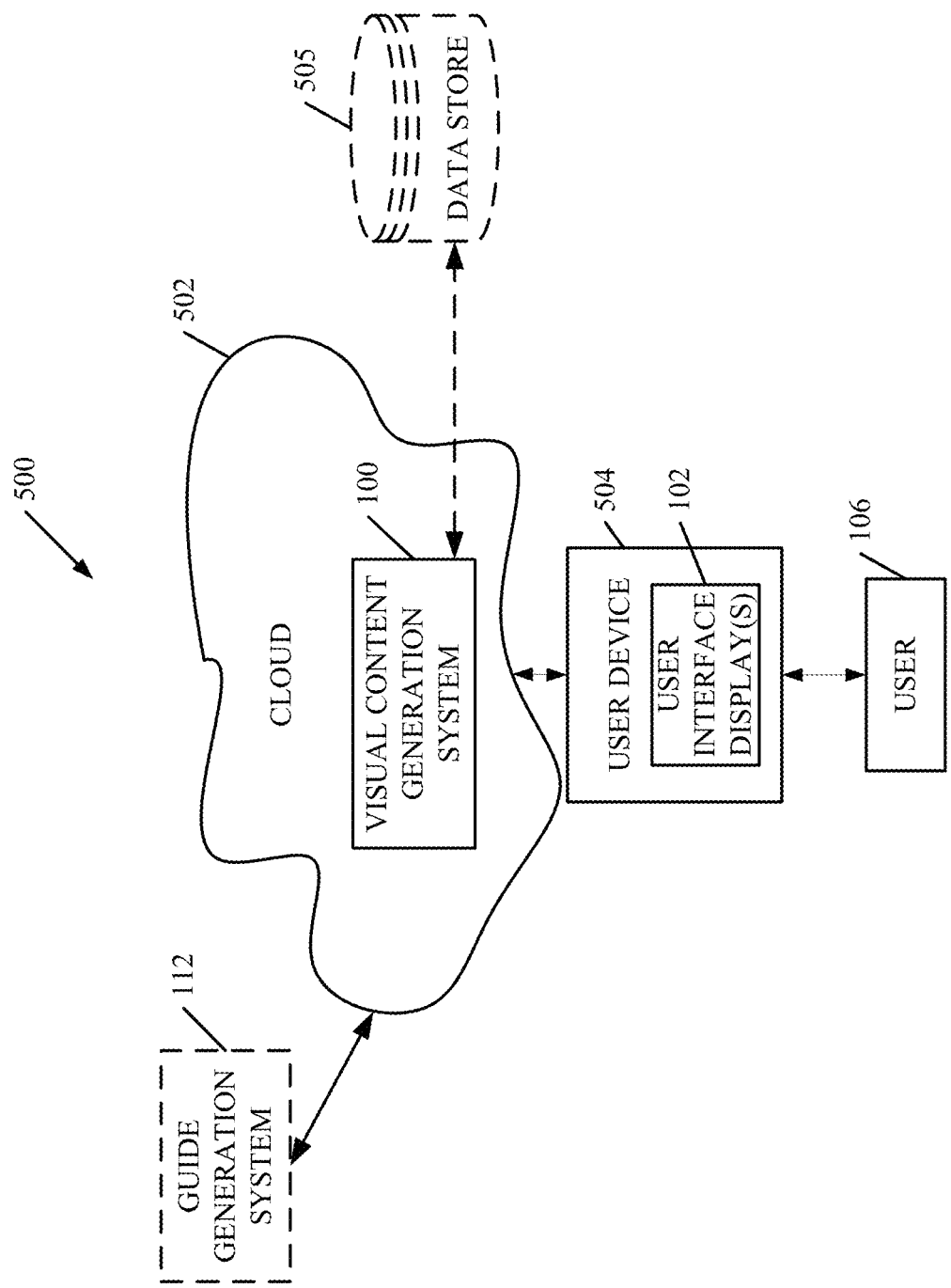
FIG. 8 shows one embodiment of the system shown in FIG. 1 in a cloud computing architecture.

FIG. 8 is a block diagram of system 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of system 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 8, some items are similar to those shown in FIG. 1 and they are similarly numbered. FIG. 8 specifically shows that is located in cloud 502 (which can be public, private, or a combination where portions are public while others are private). Therefore, user 106 uses a user device 504 to access those systems through cloud 502.

FIG. 8 also depicts another embodiment of a cloud architecture. FIG. 8 shows that it is also contemplated that some elements of system 100 can be disposed in cloud 502 while others are not. By way of example, a data store 505 can be disposed outside of cloud 502, and accessed through cloud 502. In another embodiment, guide generation system is also outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that system 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 9:
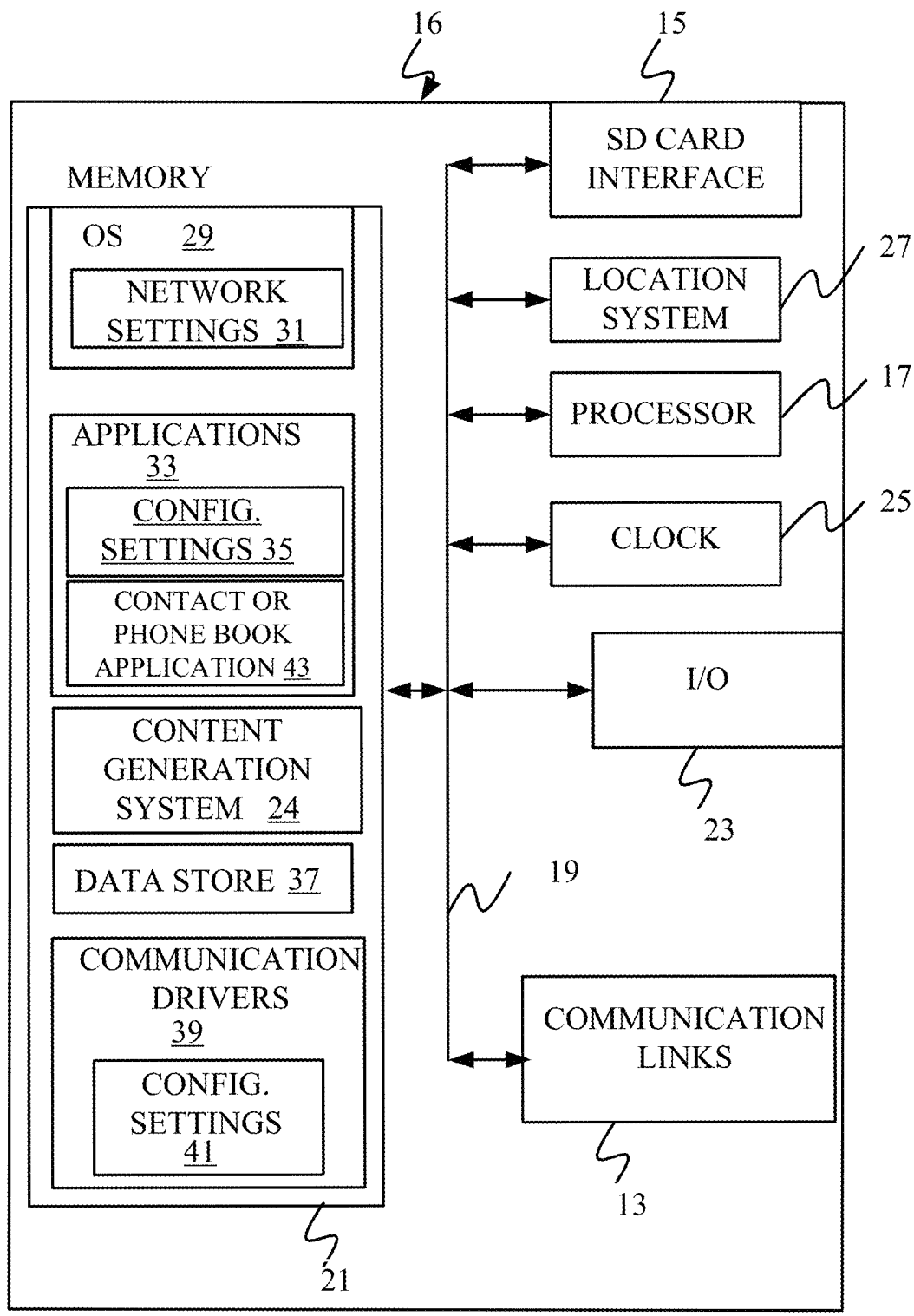
FIGS. 9-13 show embodiments of mobile devices.

FIG. 9 is a simplified block diagram of one illustrative embodiment of a handheld or mobile computing device that can be used as a user's or client's hand held device 16, in which the present system (or parts of it) can be deployed. FIGS. 10-13 are examples of handheld or mobile devices.

FIG. 9 provides a general block diagram of the components of a client device 16 that can run components of system 100 or that interacts with system 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processor 108 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, communication configuration settings 41, and contact or phone book application 43. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Applications or the items, for example, can reside in memory 21. Similarly, device 16 can have a content generation system 24 which can run various applications or embody parts or all of system 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 10:
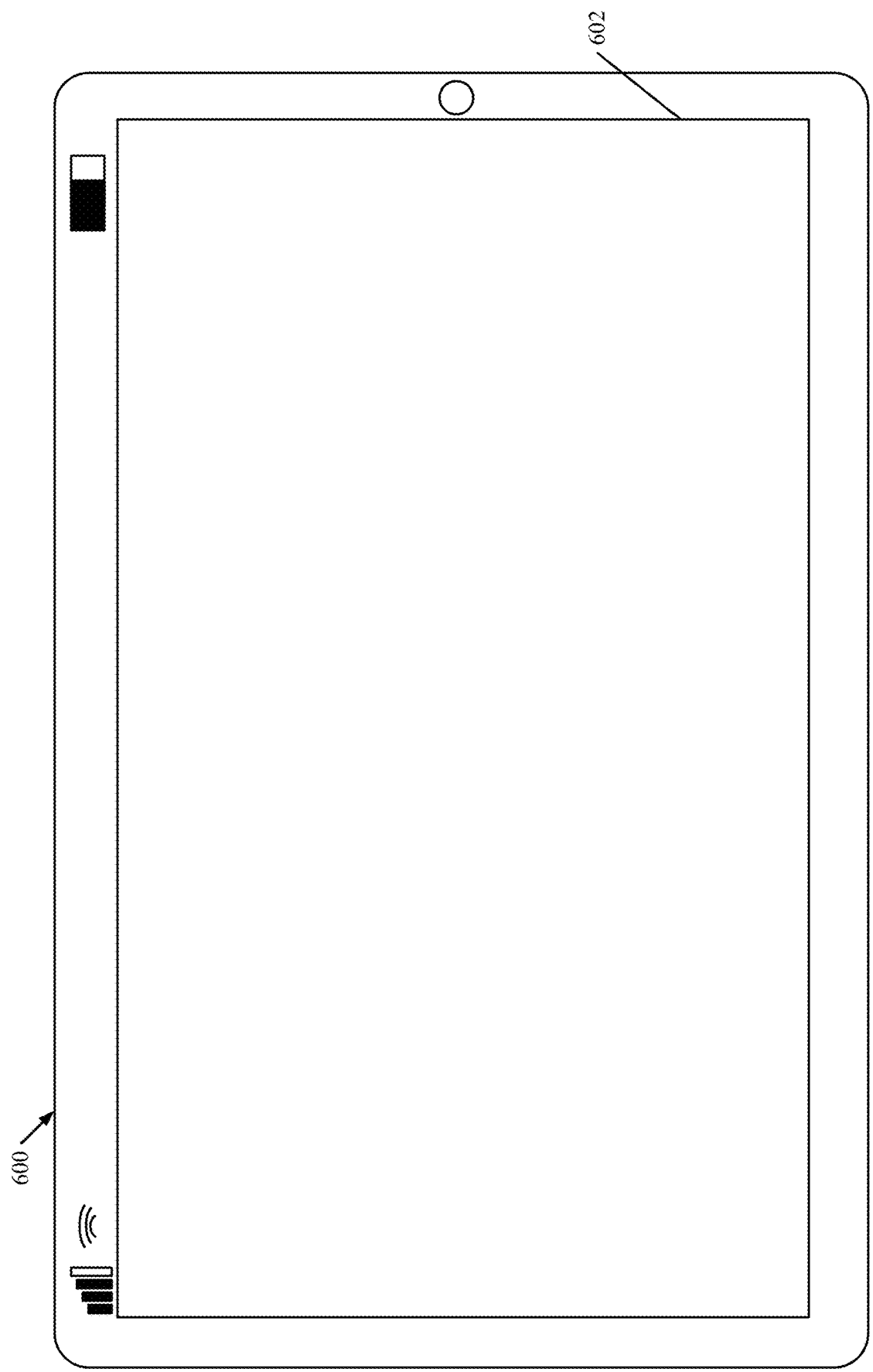

FIG. 10 shows one embodiment in which device 16 is a tablet computer 600. In FIG. 10, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 11:
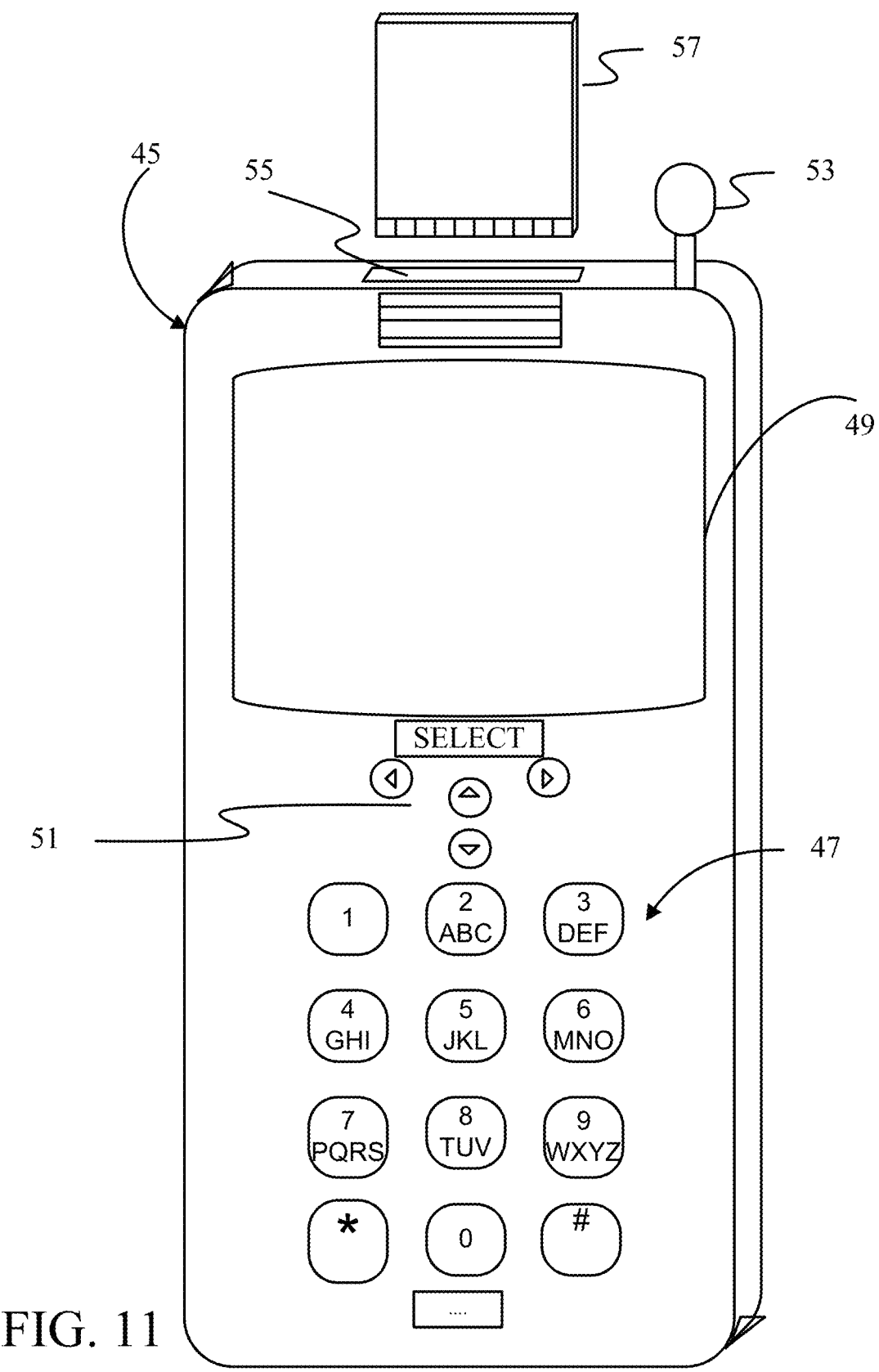
Figure 12:
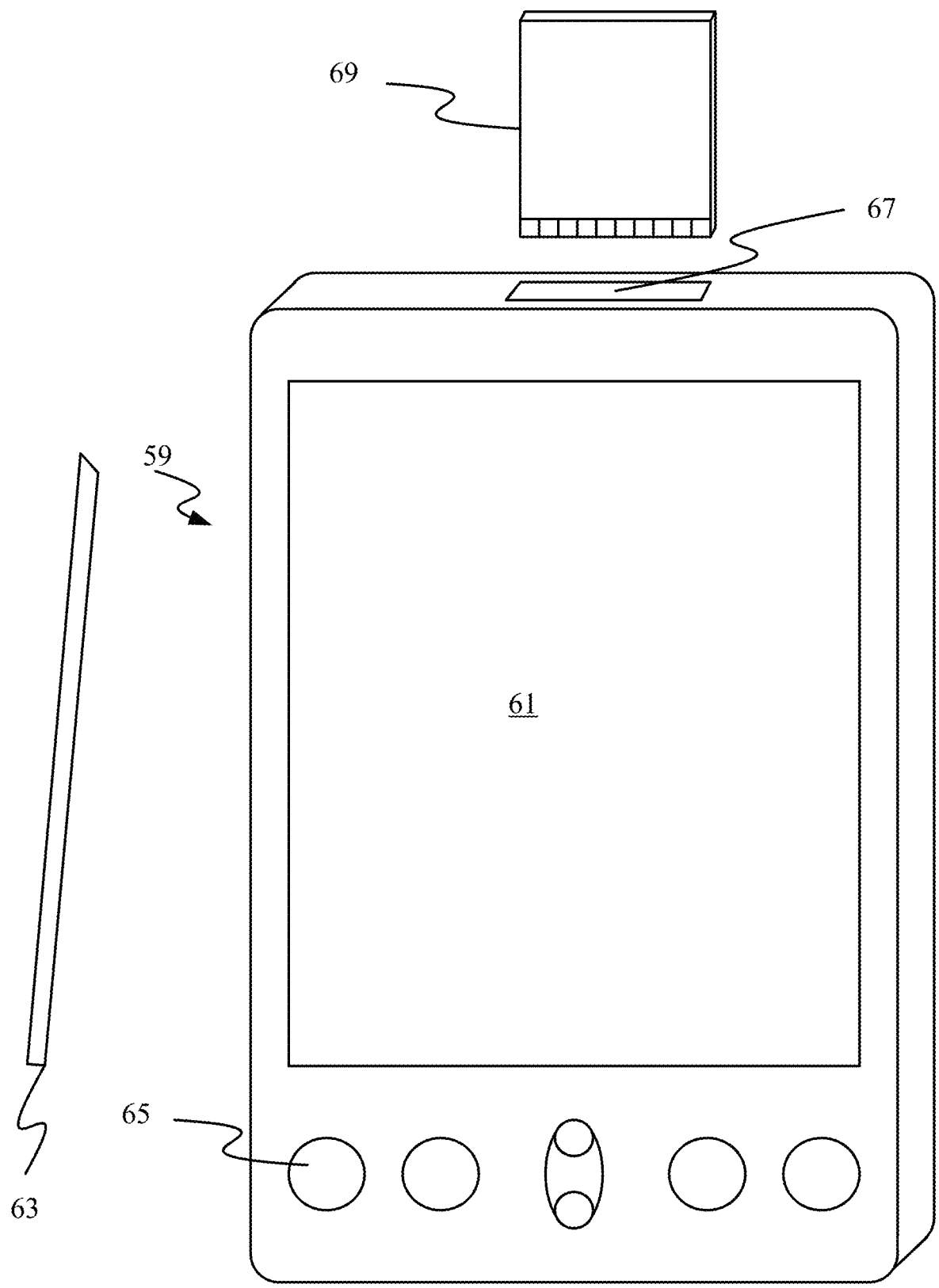

FIGS. 11 and 12 provide additional examples of devices 16 that can be used, although others can be used as well. In FIG. 11, a feature phone, smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1Xrtt, and Short Message Service (SMS) signals. In some embodiments, phone 45 also includes a Secure Digital (SD) card slot 55 that accepts a SD card 57.

The mobile device of FIG. 12 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Figure 13:
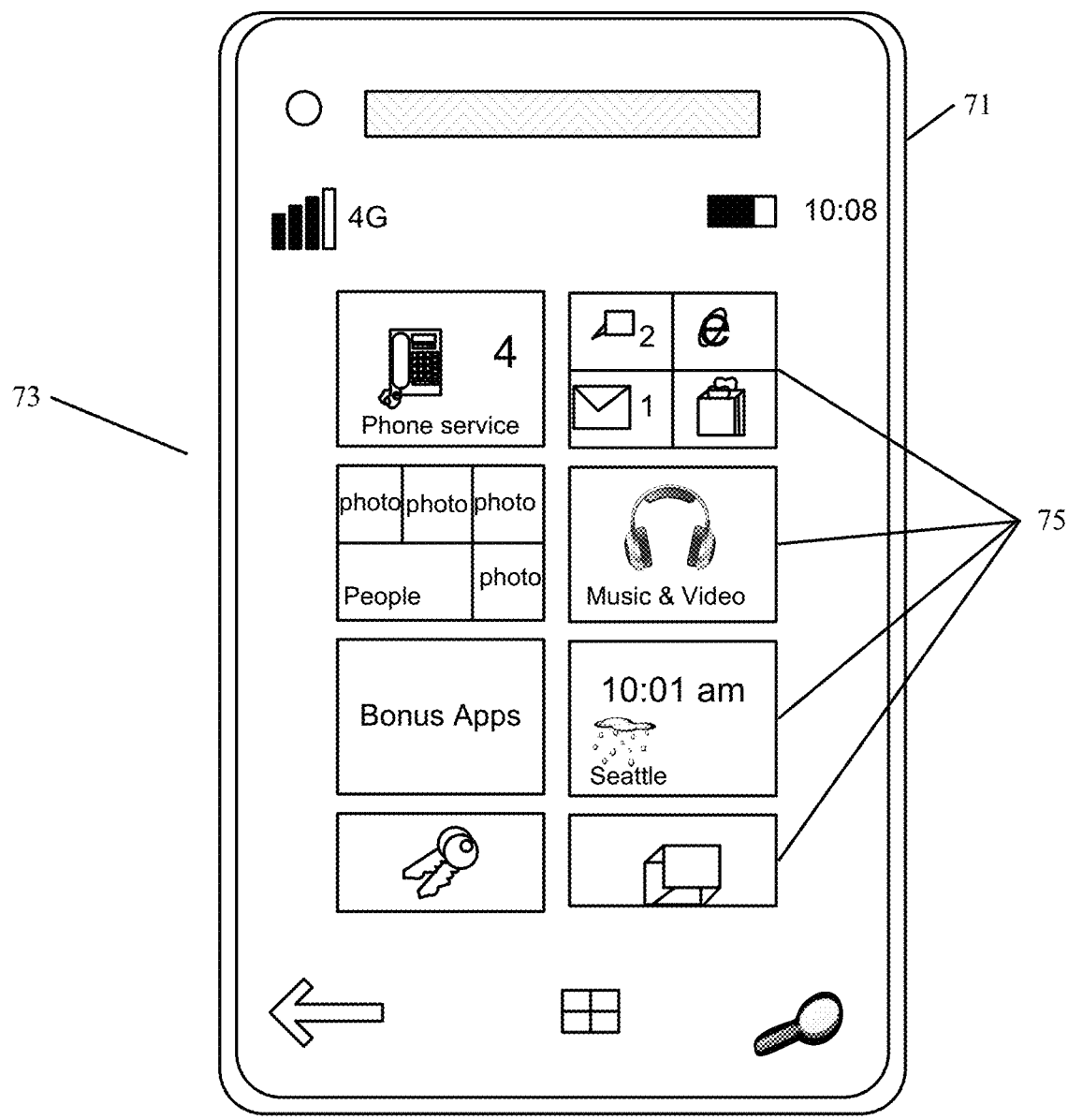

FIG. 13 is similar to FIG. 11 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 14:
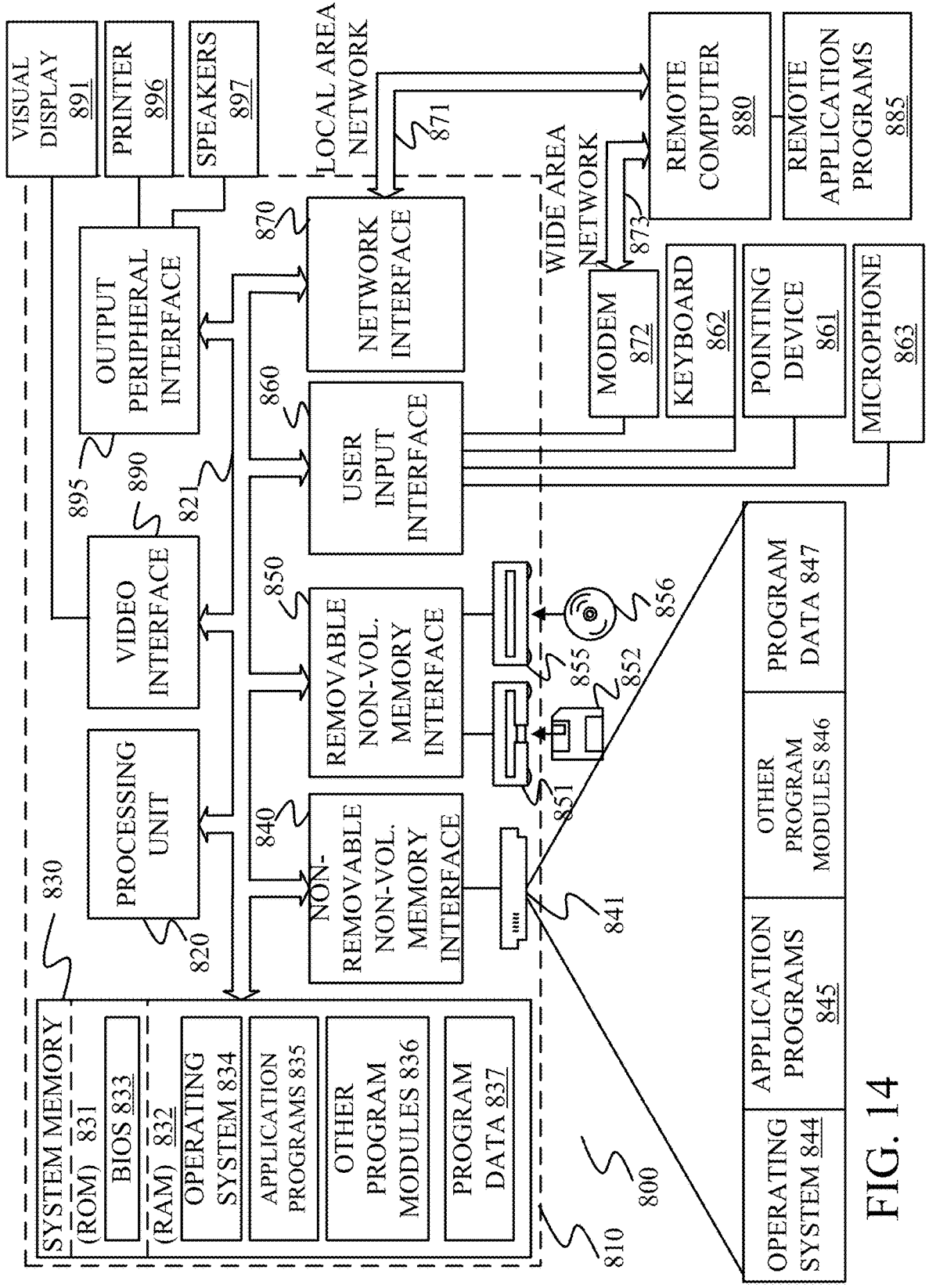
FIG. 14 is a block diagram of one embodiment of a computing environment.

FIG. 14 is one embodiment of a computing environment in which system 100, or parts of it, (for example) can be deployed. With reference to FIG. 14, an exemplary system for implementing some embodiments includes a general-purpose computing device in the form of a computer 810. Components of computer 810 may include, but are not limited to, a processing unit 820 (which can comprise processor 108), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 14.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 14 illustrates operating system 834, application programs 835, other program modules 836, and program data 837.

The computer 810 may also include other removable/non-removable volatile/nonvolatile computer storage media. By way of example only, FIG. 14 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 14, provide storage of computer readable instructions, data structures, program modules and other data for the computer 810. In FIG. 14, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 10 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 14 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
    displaying an object on a user interface display, wherein the object is elongate along an axis of the object;
    identifying a predefined orientation on the user interface display;
    receiving a user input that rotates the object to change an angular orientation of the axis of the object on the user interface display;
    based on determining that the changed angular orientation of the axis of the object is within a threshold angular distance of the predefined orientation, triggering visual guide functionality that automatically modifies the user interface display by adding a first visual guide indicative of the predefined orientation; and
    displaying a second visual guide to indicate when the object and another object are equally spaced from a center of the user interface display.

2. The computer-implemented method of claim 1, wherein the predefined orientation comprises one of a horizontal orientation or a vertical orientation, and wherein adding the first visual guide comprises:

displaying the first visual guide to indicate that the axis of the object is oriented horizontally, or vertically on the user interface display.

3. The computer-implemented method of claim 1, wherein the first visual guide is not displayed on the user interface display when the angular orientation of the axis of the object is outside the threshold angular distance.

4. The computer-implemented method of claim 1, and further comprising:
displaying a user-actuatable move handle that is visually associated with the object and receives the user input that rotates the object on the user interface display; and
displaying the first visual guide at a location on the user interface display that is spaced apart from the user-actuatable move handle.

5. The computer-implemented method of claim 1, and further comprising:
displaying a third visual guide to indicate when a center or edge of the object is aligned with either a horizontal center or vertical center of the user interface display.

6. The computer-implemented method of claim 1, and further comprising:
displaying a third visual guide to indicate when the object and the other object are equally spaced from opposite edges of the user interface display.

7. The computer-implemented method of claim 1, wherein displaying the second visual guide to indicate when the object and the other object are equally spaced from a center of the user interface display comprises:
displaying the second visual guide to indicate when the object and the other object are equally spaced from a horizontal center of the user interface display.

8. The computer-implemented method of claim 1, wherein displaying the second visual guide to indicate when the object and the other object are equally spaced from a center of the user interface display comprises:
displaying the second visual guide to indicate when the object and the other object are equally spaced from a vertical center of the user interface display.

9. A computer-implemented method, comprising:
determining a first position of a first object displayed on a first user interface display;
based on a user interaction input with a second object displayed on a second user interface display, moving the second object to a second position on the second user interface display, wherein the second user interface display comprises an overlay that is separate from, and visually displayed over, the first user interface display; and
automatically triggering a visual guide display that automatically adds a visual guide to indicate when a distance between the first object and an edge of the first user interface display is equal to a distance between the second object and an edge of the second user interface display that is opposite the edge of the first user interface display.

10. The computer-implemented method of claim 9, wherein the first user interface display comprises an active display that allows input to manipulate the first user interface display and the second user interface display comprises an inactive display that disallows input to manipulate the second user interface display.

11. The computer-implemented method of claim 9, wherein the visual guide is displayed on the second user interface display.

12. A computer-implemented method, comprising:
determining a first position of a first object displayed on a first user interface display;
based on a user interaction input with a second object displayed on a second user interface display, moving the second object to a second position on the second user interface display, wherein the second user interface display comprises an overlay that is separate from, and visually displayed over, the first user interface display; and
automatically triggering a visual guide display that automatically adds a visual guide to indicate when a distance between the first object and a center of the first user interface display is equal to a distance between the second object and a center of the second user interface display.

13. A computer-implemented method, comprising:
displaying first and second objects on a user interface display;
determining a first distance between the first object and a particular portion of the user interface display, the particular portion of the user interface display comprising one of:
opposite edges of the user interface display; or
a center of the user interface display;
based on a user interaction input with the second object on the user interface display, moving the second object from a first position to a second position on the user interface display;
determining a second distance between the second object and the particular portion of the user interface display; and
based on a comparison of the determined first and second distances, triggering visual guide functionality that automatically modifies the user interface display by adding a visual guide to the user interface display, the visual guide indicating that each of the first and second objects are equally spaced from the particular portion of the user interface display.

14. The computer-implemented method 13, wherein the particular portion of the user interface display comprises opposite edges of the user interface display, wherein the visual guide comprises:
a first visualization that indicates a distance of the first object from a first edge of the user interface display; and
a second visualization that indicates a distance of the second object from a second edge of the user interface display, that is opposite the first edge.

15. The computer-implemented method 13, wherein the particular portion of the user interface display comprises the center of the user interface display.

\* \* \* \* \*